(12) United States Patent
Kim

(10) Patent No.: US 8,306,706 B2
(45) Date of Patent: Nov. 6, 2012

(54) STORAGE CONTAINER LOADING/UNLOADING AND TRANSPORTING APPARATUS

(76) Inventor: Hyuk-Ki Kim, Seoul (KR)

( * ) Notice: Subject to any disclaimer, the term of this patent is extended or adjusted under 35 U.S.C. 154(b) by 583 days.

(21) Appl. No.: 12/501,293

(22) Filed: Jul. 10, 2009

(65) Prior Publication Data

US 2011/0010057 A1    Jan. 13, 2011

(51) Int. Cl.
*B60P 1/00* (2006.01)
(52) U.S. Cl. .......................................... 701/50; 280/6.15
(58) Field of Classification Search ................... 701/50; 280/6.15, 6, 151, 6.156, 6.157, 43.17, 43.23, 280/124.128, 124.157, 124.16, 124.161, 280/86.5; 180/22, 209; 414/480, 474, 476
See application file for complete search history.

(56) References Cited

U.S. PATENT DOCUMENTS

| | | | | |
|---|---|---|---|---|
| 4,437,807 A * | 3/1984 | Perrott | | 414/620 |
| 4,519,737 A * | 5/1985 | Barry | | 414/337 |
| 4,946,328 A * | 8/1990 | Barry | | 414/334 |
| 5,505,586 A * | 4/1996 | Lichti | | 414/800 |
| 7,931,431 B2 * | 4/2011 | Benedict et al. | | 414/281 |

* cited by examiner

*Primary Examiner* — Dalena Tran
(74) *Attorney, Agent, or Firm* — John K. Park; Park Law Firm

(57) ABSTRACT

Disclosed is a storage container loading/unloading and transporting apparatus, which loads one storage container or a plurality of storage containers on a loading table of a vehicle, transports the storage container(s) to a designated place, and then unloads the storage container(s).

53 Claims, 56 Drawing Sheets

Fig. 24

STORAGE CONTAINER LOADING/UNLOADING AND TRANSPORTING APPARATUS

BACKGROUND OF THE INVENTION

1. Field of the Invention

The present invention relates to a storage container loading/unloading and transporting apparatus, which loads one storage container or a plurality of storage containers on a loading table, transports the storage container(s) to a designated place, and then unloads the storage container(s).

2. Description of the Related Art

In general, many apparatuses, each of which is obtained by installing a loading and unloading device on a vehicle to load or unload a container into or from the vehicle, have been proposed.

For example, Korean Patent Registration No. 10-0536515 entitled "Container loading device for container car and automatic loading method" discloses a method, in which when a container is unloaded from a container car, the container is slightly lifted from the container car and is rotated by an angle of 90°, and then is placed on the ground using a traveling-type fork lift installed on the container car, and when a container on the ground is loaded into the container car, the fork lift is operated such that the container is mounted on the fork lift, and then the container is loaded into the container car in reverse order of the unloading of the container from the container car, thereby allowing a driver alone to be easily achieve loading and unloading of goods including containers at any place.

Further, Korean Patent Registration No. 10-0578946 entitled "Device for carrying article into and from container, method for introducing and discharging article into and from container, and pallet for carrying article" discloses an article carrying apparatus having a loading device including a stage, a first raising and lowering sliding unit to support a pallet loaded with an article with rising the article from the bottom of the stage so as to horizontally move the pallet, and a second raising and lowering sliding unit to contain the pallet from the first raising and lowering sliding unit and drop the pallet to the bottom of the container, and an unloading device including the stage, the second raising and lowering sliding unit to support a pallet loaded with an article with rising the article from the bottom of the container so as to horizontally move the pallet, and the first raising and lowering sliding unit to contain the pallet from the second raising and lowering sliding unit. However, the above carrying apparatus has a complicated configuration and is not convenient to use. Further, the overall height of the carrying apparatus is increased due to the high raising and lowering height.

SUMMARY OF THE INVENTION

Therefore, the present invention has been made in view of the above problems, and it is an object of the present invention to provide a storage container loading/unloading and transporting apparatus, which properly loads storage containers from a storage place or the ground into a transport vehicle or unloads the storage containers from the transport vehicle, and allows the transport vehicle to transport the loaded storage containers to a designated place.

It is another object of the present invention to provide a storage container loading/unloading and transporting apparatus, which loads/unloads and transports storage containers having different sizes, for example, one sixteen-foot storage container and two seven-foot storage containers.

It is another object of the present invention to provide a storage container loading/unloading and transporting apparatus, in which a transfer cart installed on a loading table of a transport vehicle reciprocates in the longitudinal direction of the loading table.

It is another object of the present invention to provide a storage container loading/unloading and transporting apparatus, in which fork arms clamping both sides of a storage container are raised and lowered by an ascending and descending unit installed on a transfer cart, and thus achieves loading and unloading of the clamped storage container.

It is another object of the present invention to provide a storage container loading/unloading and transporting apparatus, in which fork arms are horizontally spread out or drawn in by a pair of projectable and retractable cylinders horizontally installed symmetrically, and thus achieves clamping and unclamping of a storage container.

It is another object of the present invention to provide a storage container loading/unloading and transporting apparatus, in which projectable and retractable cylinders are respectively operated, and thus clamp a storage container and then achieve centering of the clamped storage container even though the position of the storage container is deviated from the original clamped position.

It is another object of the present invention to provide a storage container loading/unloading and transporting apparatus, in which tilting of fork arms (or tilting of a storage container clamped to the fork arms) is achieved directly by tilting cylinders.

It is another object of the present invention to provide a storage container loading/unloading and transporting apparatus, in which a pair of chains to reciprocate a transfer cart is raised and lowered by a plurality of cylinders, and when two seven-foot storage containers are used, a storage container located at the front is moved by the ascent of the pair of chains and a storage container located at the rear is moved by clamping using forks of fork arms.

It is another object of the present invention to provide a storage container loading/unloading and transporting apparatus, in which guide bars are installed under chains to move a transfer cart such that rollers of the chains perform rolling motion (or rolling contact) along the guide bars to drastically reduce the coefficient of friction of the chains, and thus achieve smooth movement of the transfer cart even though the live load of the storage container is applied to the chains.

It is another object of the present invention to provide a storage container loading/unloading and transporting apparatus, in which, when a seven-foot storage container having a narrow width is used, auxiliary forks are connected to the front ends of forks of fork arms to achieve length compensation during clamping of the seven-foot storage container.

It is another object of the present invention to provide a storage container loading/unloading and transporting apparatus, in which a storage container loaded on a loading table is firmly fixed to a frame of a transport vehicle using binding units to prevent movement of the storage container or separation of the storage container from the frame during traveling of the vehicle.

It is another object of the present invention to provide a storage container loading/unloading and transporting apparatus, which loads one storage container or plural storage containers using a pair of left and right multi-joint arms, each of which is provided with forks, transports the storage container(s) to a designated place, and then unloads the container(s).

It is another object of the present invention to provide a storage container loading/unloading and transporting apparatus, which includes fork arms installed at both sides of a transfer cart installed on a vehicle, and first and second arms to raise and lower a storage container clamped by the fork arms, an ascending and descending unit including a plurality of cylinders to rotate the first and second arms to designated angles, and a horizontal moving unit to horizontally spread out or draw in the fork arms to clamp or unclamp the storage container.

It is another object of the present invention to provide a storage container loading/unloading and transporting apparatus, in which a horizontal moving unit includes a pair of fixed bodies installed at both sides of the upper part of a transfer cart, a pair of projectable and retractable cylinders to horizontally project and retract moving bodies connected to the fixed members, and support members, to which the ascending and descending unit is fixed, installed at the outer surfaces of the moving bodies, and both fork arms are horizontally spread out or drawn in to achieve clamping and unclamping of a storage container.

It is another object of the present invention to provide a storage container loading/unloading and transporting apparatus, in which fixed bodies and moving bodies connected thereto are formed in a rectangular pipe shape.

It is another object of the present invention to provide a storage container loading/unloading and transporting apparatus, in which sliding bearings are installed on surface contact parts between fixed bodies and moving bodies, and are fixed to any one of the fixed bodies and the moving bodies.

It is a further object of the present invention to provide a storage container loading/unloading and transporting apparatus, in which support members on which an ascending and descending unit is installed are protruded more downward than fixed bodies to reduce the overall height and operating height of the ascending and descending unit.

In accordance with one aspect of the present invention, the above and other objects can be accomplished by the provision of a storage container loading/unloading and transporting apparatus including a frame (mounting frame), on which most components are mounted, a transfer cart to move an ascending and descending unit to raise and lower at least one storage container forward and backward (in the longitudinal direction of a loading table of a vehicle), the ascending and descending unit to raise and lower the at least one storage container, a pair of fork arms (lateral arms) to clamp/unclamp and tilt the at least one storage container, leveling supports to keep the level of the vehicle in case of loading and unloading the at least one storage container, and a hydraulic device and a controller.

The storage container loading/unloading and transporting apparatus may be easily mounted on a frame (chassis frame) of the vehicle to load/unload and transport the at least one storage container, and have enough strength to raise/lower and firmly fix heavy storage containers.

The storage container loading/unloading and transporting apparatus may load/unload and transport storage containers having different sizes, for example, one sixteen-foot storage container or two seven-foot storage containers, and the transfer cart installed on the frame of the vehicle may reciprocate in the longitudinal direction of the loading table.

Loading and unloading of the at least one storage container may be achieved by the raising and lowering of the fork arms with the ascending and descending unit installed on the transfer cart, clamping and unclamping of the at least one storage container may be achieved by horizontally spreading out and drawing in the fork arms with a pair of the projectable and retractable cylinders horizontally installed symmetrically, and tilting of the fork arms and the at least one storage container clamped by the fork arms may be achieved with tilting cylinders.

Chains to reciprocate the transfer cart may be raised and lowered by a plurality of cylinders, and in order to transfer two seven-foot storage containers, one storage container located at the front may be lifted up to be transferred along the chins, and the other storage container located at the rear may be clamped by the plurality of forks of the fork arms to be transferred and unloaded. Then, the storage container transferred to the rear end of the loading table may be unloaded by the fork arms. Loading of the storage containers may be achieved in reverse order of the unloading operation.

The chains to reciprocate the transfer cart having a long length may be respectively supported by chain brackets installed under the chains, both sides of the chain brackets may be protruded to prevent separation of the chains from the chain brackets, and the chains may roll on guide bars to greatly reduce the coefficient of friction of the chains and thus achieve smooth movement of the at least one storage container.

The transfer cart may include a pair of front and rear rollers installed on the frame of the vehicle, a hydraulic motor rotated in a regular direction and a reverse direction, and a power transmission unit, and reciprocate in the longitudinal direction of the loading table of the vehicle. The power transmission unit may reduce power transmitted from the hydraulic motor with a reducer, and transmit the power to both chains installed in the longitudinal direction of the loading table to achieve the reciprocating motion of the transfer cart. The chains may be installed in parallel and provided in a pair, and both ends of the chains may be fixed to the transfer cart.

The ascending and descending unit may include vertical fixed members fixed to both sides of the transfer cart, a pair of cylinders journalled between the vertical fixed members, a horizontal connection member installed at ends of rods of the cylinders, and chain sprockets journalled to both sides of the horizontal connection member, and ends of chains connected to chain sprockets may be installed on the bottom of the transfer cart, and the other ends of the chains connected to the chain sprockets may be installed at a horizontal ascending and descending member. Therefore, the chain sprockets and the chains installed at both sides of the horizontal connection member may be operated using the principle of a pulley, and thus an ascending and descending stroke of the cylinders may be reduced by about half and the overall height and the ascending and descending stroke of the ascending and descending unit may be reduced.

The horizontal ascending and descending member may be formed in a rectangular pipe shape, projectable and retractable members may be installed at both sides of the horizontal ascending and descending member, and vertical members may be respectively installed at the ends of the projectable and retractable members. The projectable and retractable members may be horizontally drawn in by a pair of guide rods and a pair of projectable and retractable cylinders horizontally installed to clamp the storage container, and be horizontally spread out by the pair of guide rods and the pair of projectable and retractable cylinders to unclamp the at least one storage container.

The projectable and retractable cylinders may be operated simultaneously or individually to achieve the clamping of the at least one storage container and then adjust centering of the at least one storage container, thereby achieving smooth clamping and loading of the at least one storage container.

For example, a storage container to be loaded is closer to one of the fork arms, one of the projectable and retractable cylinders is operated to make separation distances between the storage container and the fork arms equal, and thus correct clamping of the storage container is achieved.

The fork arms may be journalled at the lower parts of the vertical members, and the tilting cylinders may be installed between the front ends of the fork arms protruded from the front ends of the vertical members and the vertical members to adjust the slope of the fork arms and move in the width direction to clamp and unclamp the storage container. Further, the tilting cylinders may adjust the leveled state and the slope of the fork arms.

The positions of the plural forks installed on the fork arms may be changed in consideration of the clamped position of the storage container, and then be fixed. When the width of the storage container is narrow, auxiliary forks of a detachable type may be respectively connected to the front ends of the forks to achieve length compensation, thereby achieving clamping and unclamping of the narrow storage container.

In case that a seven-foot storage container is used, the auxiliary forks may be respectively connected to the front ends of the forks to achieve length compensation, thereby clamping the seven-foot storage container having a narrow width.

The storage container loaded on the loading table may be firmly bound to the frame of the vehicle using binding units, and thus movement of the storage container or separation of the storage container from the frame of the vehicle during traveling of the vehicle is prevented.

The leveling supports installed at both sides of the rear part of the vehicle may stably keep the level of the loading table in loading and unloading the storage container, and may be operated simultaneously or individually and thus be properly protruded according to the slope of the surface of a road to stably keep the level of the loading table.

A hydraulic pump to drive the hydraulic motor may obtain driving force using a separate gasoline engine or an engine installed in the vehicle.

The hydraulic device and the controller (control panel) may be installed on the upper part or the side part of the transfer cart or around the transfer cart such that a user may easily manipulate the hydraulic device and the controller while observing the loading or unloading state of the storage container, and solenoid valves or a solenoid valve block and electric parts may be mounted on the frame and/or the transfer cart.

The controller may be manipulated with a control panel installed on the transfer cart and/or the frame and a wired remote controller of a detachable type.

Preferably, the wired remote controller may be detachably installed on the frame and/or the control panel or a box at the rear end of the vehicle, and be connected thereto with a wire having a designated length to move to a position, at which the user can conveniently use the wired remote controller.

In order to stop the operation of the apparatus in emergency, an emergency stop switch may be installed at each of the control panel, the wired remote controller, and both sides of the rear end of the vehicle.

Power supplied to the controller may be power of a storage battery for exclusive use separately installed or power of a charger mounted on the vehicle.

In accordance with another aspect of the present invention, there is provided a storage container loading/unloading and transporting apparatus including fork arms installed at both sides of a transfer cart installed on the vehicle and first and second arms to raise and lower at least one storage container clamped by the fork arms, an ascending and descending unit including a plurality of cylinders to rotate the first and second arms to designated angles, and a horizontal moving unit to horizontally spread out or draw in the fork arms to clamp or unclamp the at least one storage container.

The horizontal moving unit may include a pair of fixed bodies installed at both sides of the upper part of the transfer cart, a pair of projectable and retractable cylinders to horizontally project and retract moving bodies connected to the fixed members, and support members, to which the ascending and descending unit is fixed, installed at the outer surfaces of the moving bodies, and the fork arms may be horizontally spread out or drawn in to achieve clamping and unclamping of the at least one storage container.

The fixed bodies and the moving bodies connected thereto may be formed in a rectangular pipe shape, sliding bearings may be installed on surface contact parts between the fixed bodies and the moving bodies and be fixed to the fixed bodies or the moving bodies, and the support members may be protruded more downward than the fixed bodies to reduce the overall height and the operating height of the ascending and descending unit.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
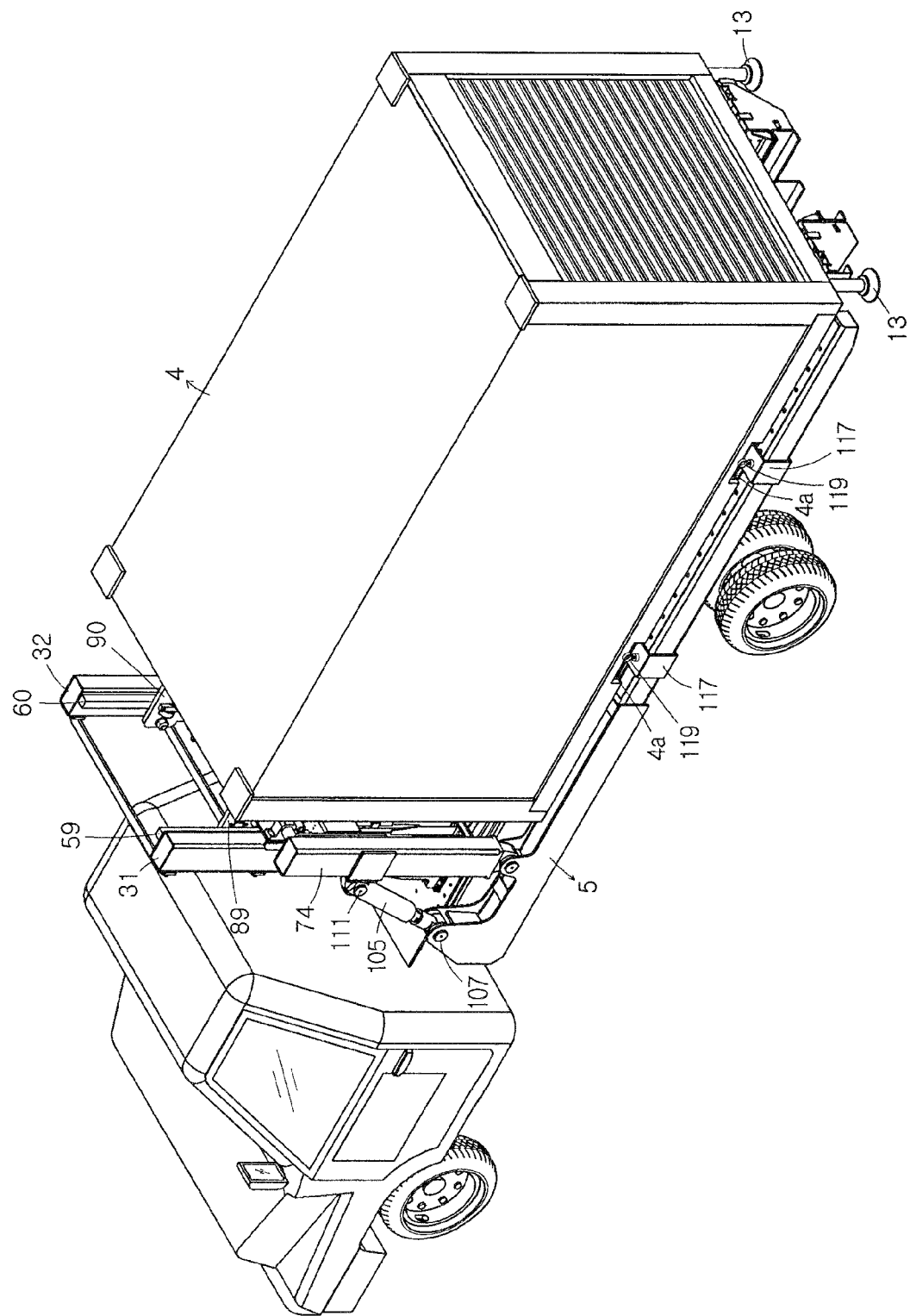
FIG. 1 is a perspective illustrating a loaded state of a storage container loading/unloading and transporting apparatus in accordance with one embodiment of the present invention.

Now, preferred embodiments of the present invention will be described in detail with reference to the annexed drawings. In the following description of the embodiments of the present invention, like reference numerals refer to like elements throughout, and a detailed description of known functions and configurations incorporated herein will be omitted when it may make the subject matter of the present invention rather unclear.

Figure 2:
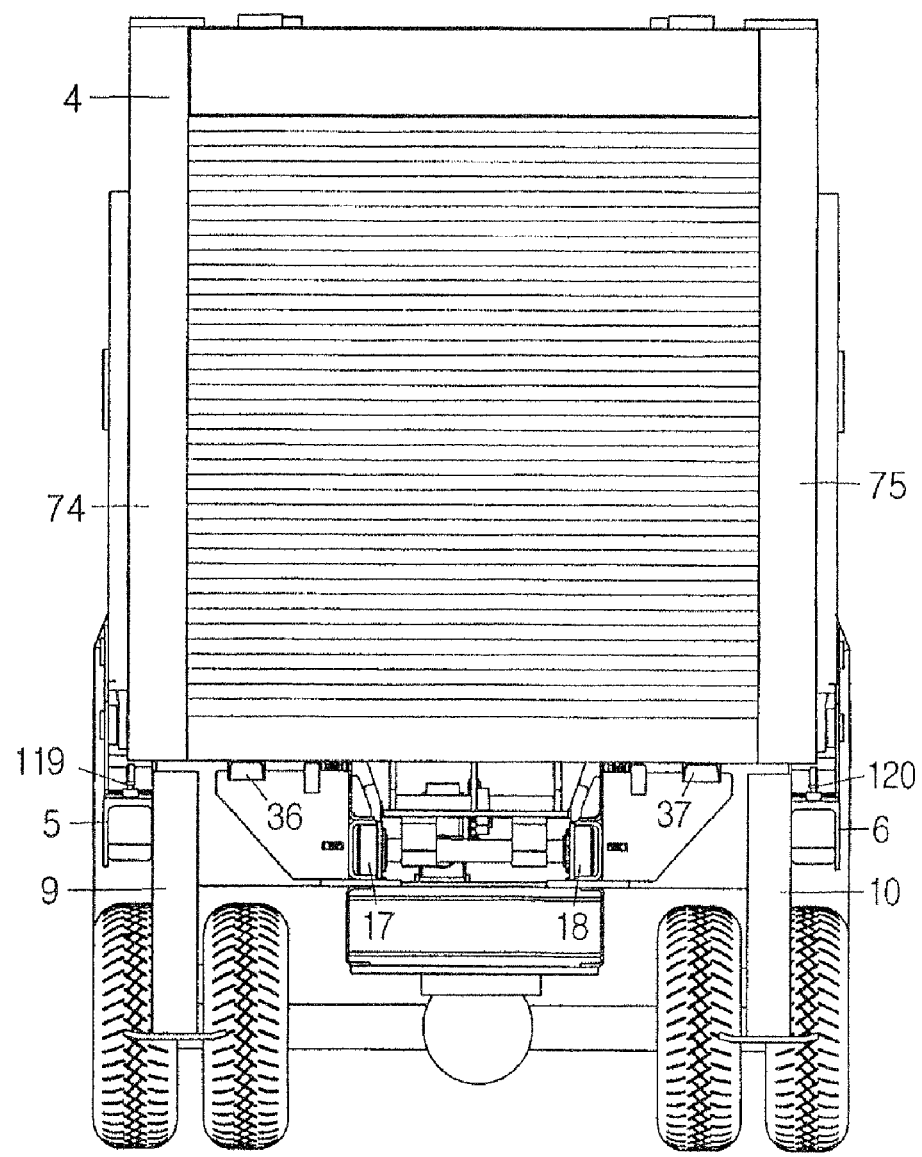
FIG. 2 is a rear view of FIG. 1.
Figure 3:
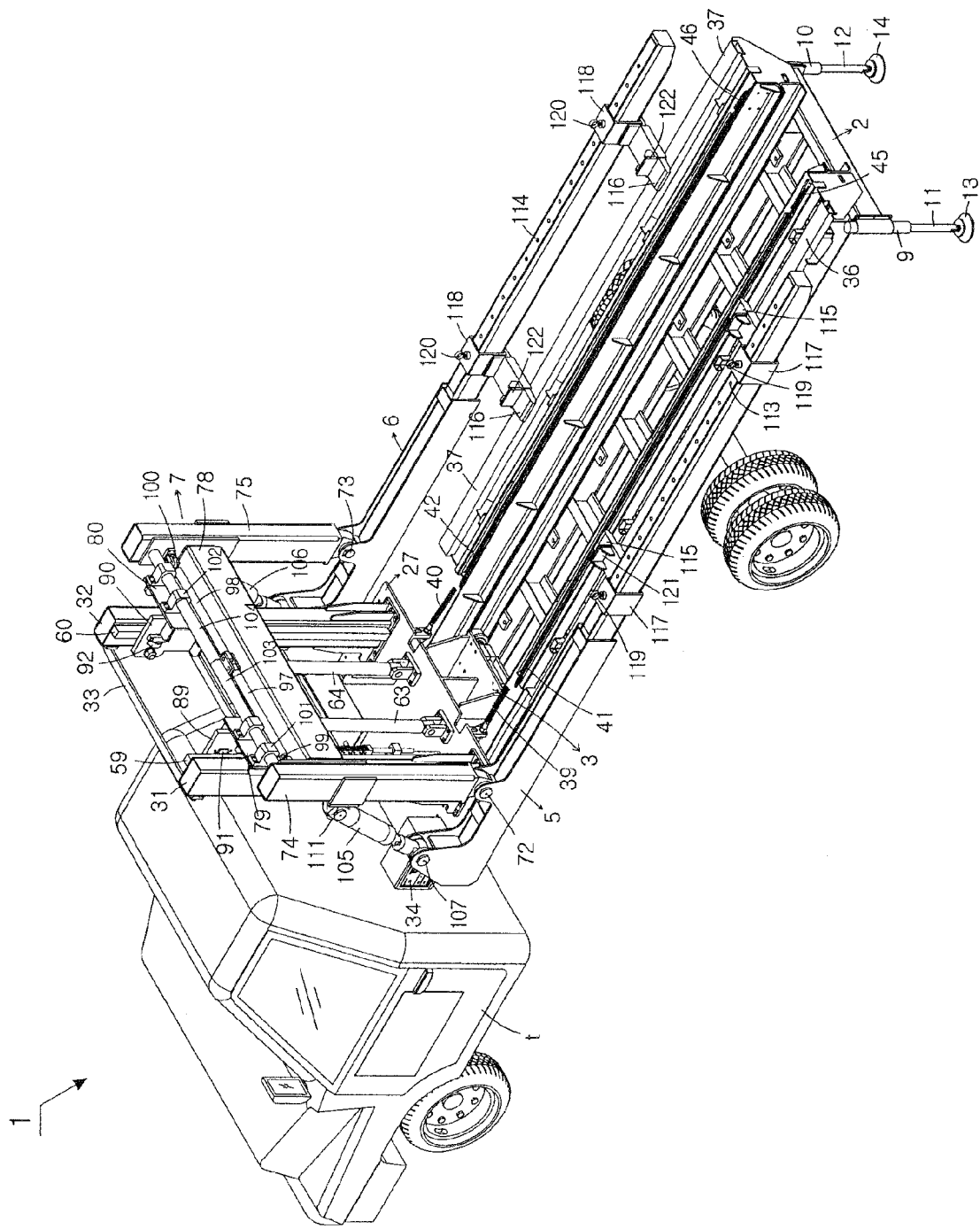
FIG. 3 is a perspective view of the apparatus in accordance with the embodiment of the present invention.
Figure 4:
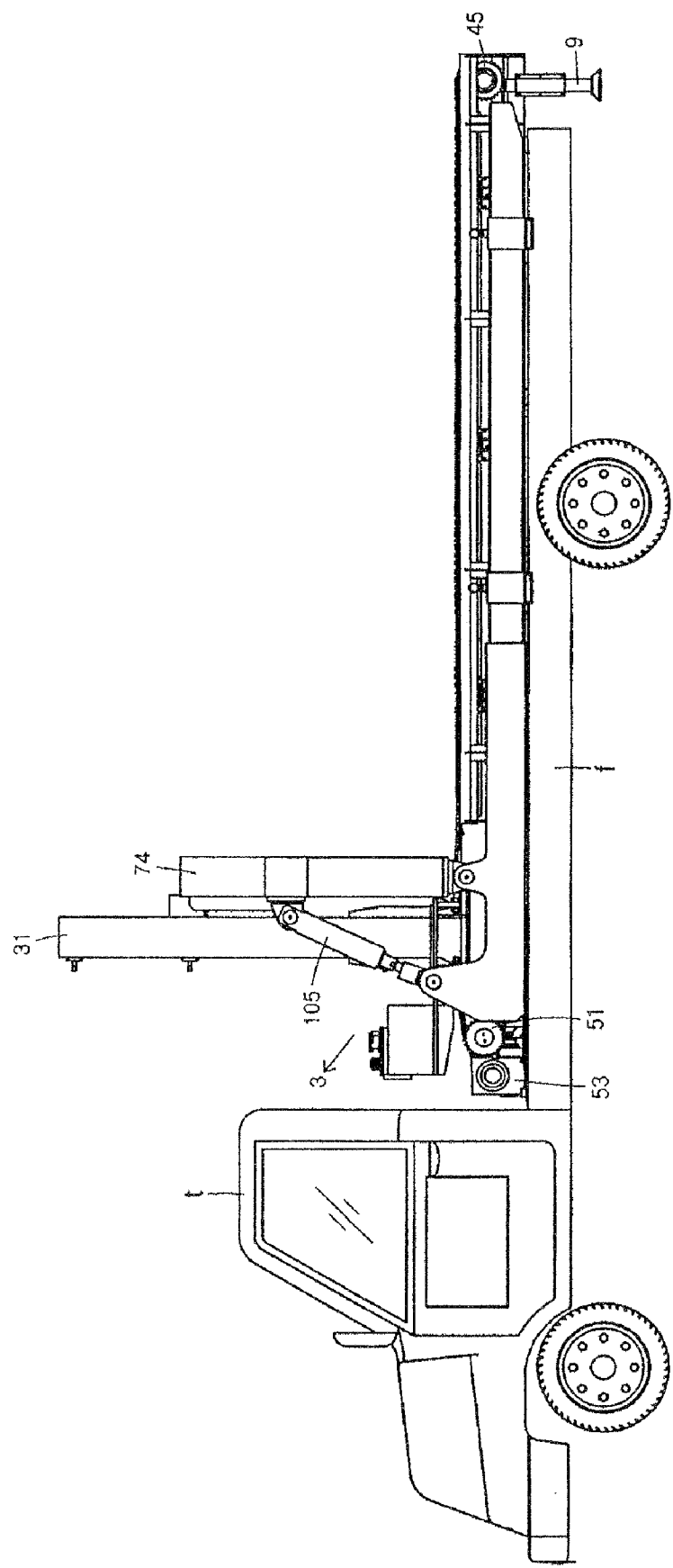
FIG. 4 is a side view of FIG. 3.
Figure 5:
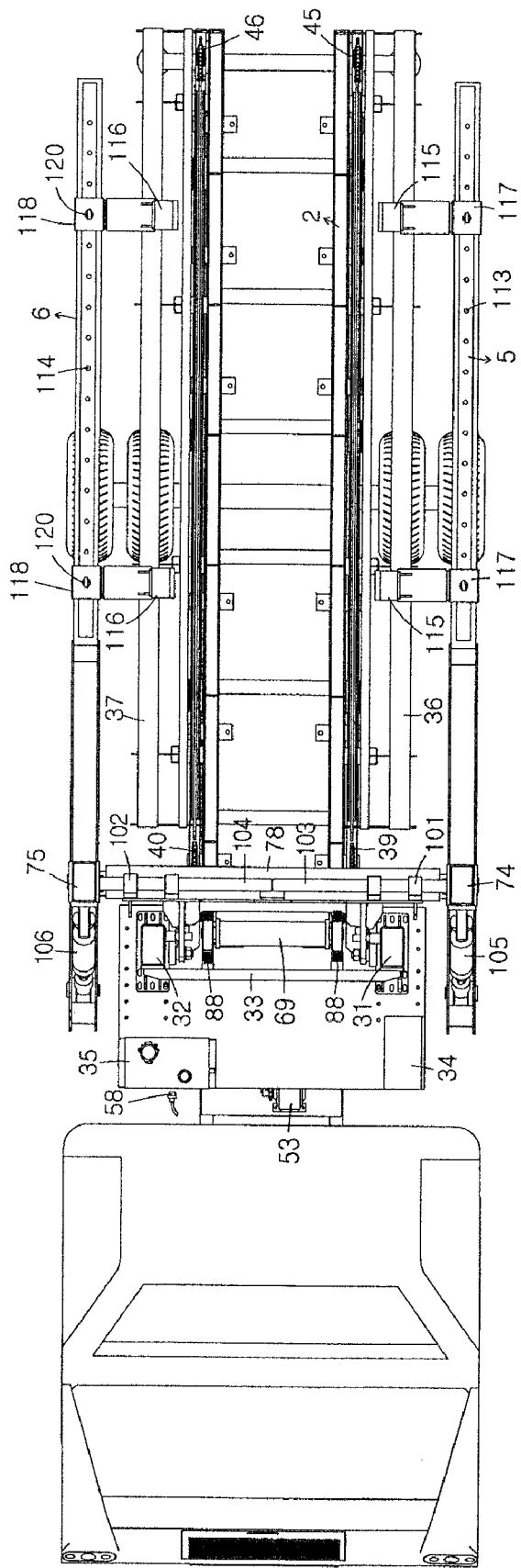
FIG. 5 is a plan view of FIG. 3.
Figure 6:
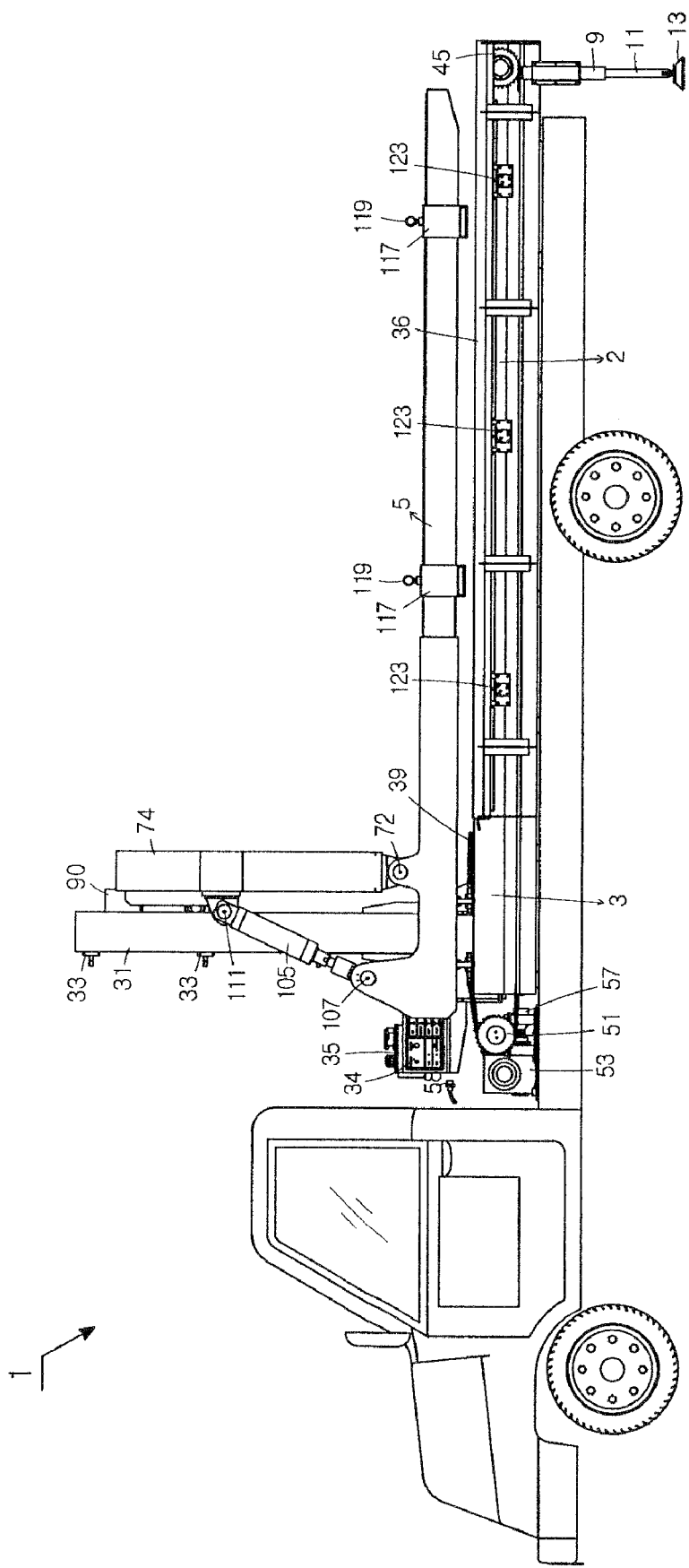
FIG. 6 is a side view illustrating an ascending state of fork arms of the apparatus in accordance with the embodiment of the present invention.

FIG. 1 is a perspective illustrating a storage container loading/unloading and transporting apparatus 1 in accordance with one embodiment of the present invention in a state in which a storage container 4 is loaded on a loading table 2 of a vehicle t, FIG. 2 is a rear view of FIG. 1, FIG. 3 is a perspective view of the apparatus 1 in a state in which the storage container 4 is not loaded on the loading table 2, FIG. 4 is a side view of FIG. 3, FIG. 5 is a plan view of FIG. 3, and FIG. 6 is a side view illustrating an ascending state of left and right fork arms 5 and 6 by an ascending and descending unit 7.

The storage container loading/unloading and transporting apparatus 1 in accordance with this embodiment of the present invention includes a transfer cart 3 installed on the frame f of the vehicle t and reciprocating in the longitudinal direction of the loading table 2 by a driving unit and a power transmission unit, the ascending and descending unit 7 installed on the transfer cart 3 to raise and lower a storage container(s), a pair of the fork arms 5 and 6 journalled at both sides of the ascending and descending unit 7 and horizontally spread out and drawn in to clamp and unclamp both sides of one storage container or plural storage containers, tilting cylinders 105 and 106 to directly tilt the fork arms 5 and 6 to a proper angle, leveling supports 11 and 12 installed at both sides of the rear end of the vehicle t to keep the level of the vehicle t when the storage container(s) is/are loaded or unloaded, a chain ascending and descending unit to raise the chains 39 and 40 to move a storage container, which is not clamped by the fork arms using the chains 39 and 40 when the plural storage containers are loaded and unloaded, a plurality of forks, the positions of which are changed and fixed, installed on the fork arms 5 and 6 to clamp the storage container(s), auxiliary forks connected to the front ends of the forks to clamp a storage container having a narrow width, a hydraulic device, and a controller.

Figure 33:
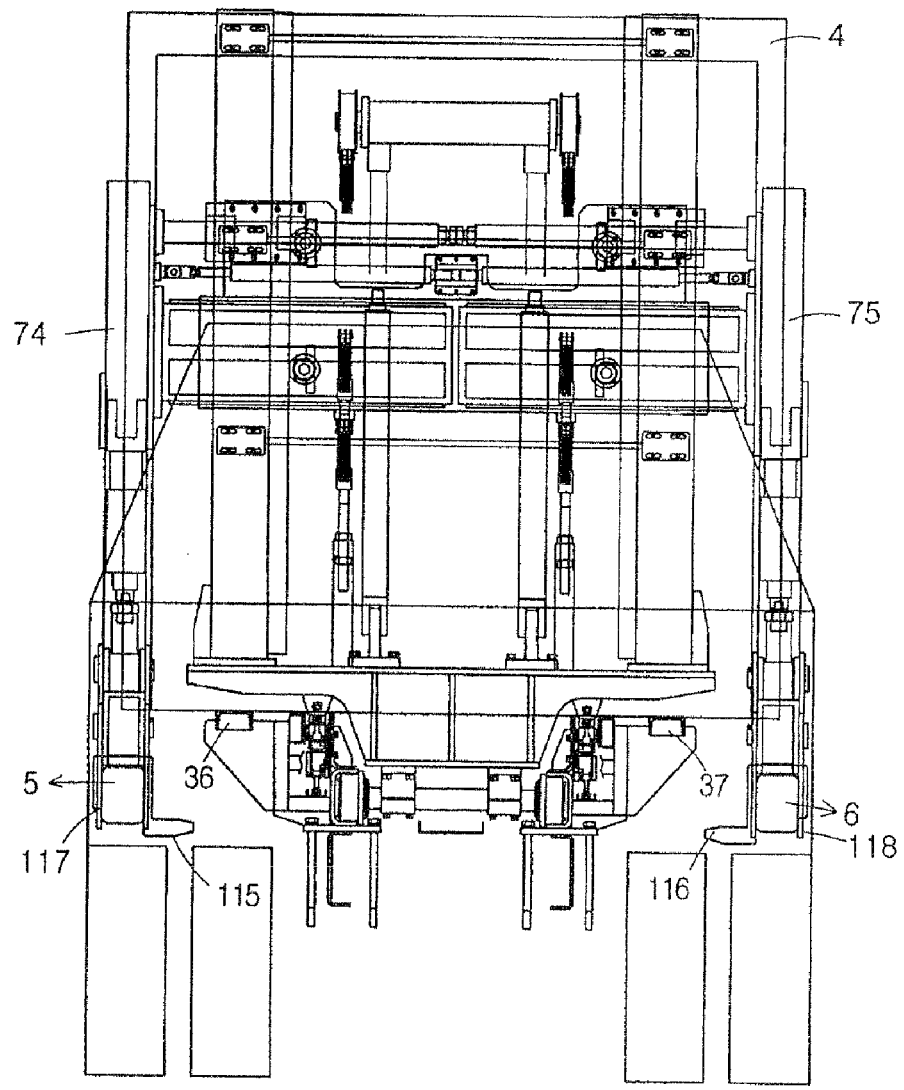
FIG. 33 is a rear view of the apparatus in accordance with the embodiment of the present invention in an initial state in which the fork arms come within a vehicle width.

The fork arms 5 and 6 are parallel structures protruded backward around pins 72 and 73 connected with vertical members 74 and 75 to clamp a storage container 4 or storage containers 143 and 144. The fork arms 5 and 6 are spread out to have a larger width than the width of the storage container 4 or the storage containers 143 and 144. When the storage container 4 or the storage containers 143 and 144 are not clamped, the fork arms 5 and 6 respectively move to initial positions, and maintain a smaller width than the overall width of the vehicle t so as not to interrupt traveling of the vehicle t, as shown in FIGS. 4 and 33.

Hereinafter, the configuration of the transfer cart 3 will be described.

The transfer cart 3 includes the frame f installed in parallel in the longitudinal direction of the loading table 2, a pair of left and right guide rails 15 and 16 symmetrically installed on the frame f, two pairs of wheels 17, 18, 19, and 20 respectively connected to front and rear parts of the left and right guide rails 15 and 16 and performing a rolling motion, a shaft 21, to which the wheels 17 and 18 are connected, another shaft 22, to which the wheels 19 and 20 are connected, brackets 23, 24, 25, and 26 installed at both sides of the shafts 21 and 22, a base 27 installed on the brackets 23, 24, 25, and 26, a driving unit, and a power transmission unit.

Lower parts of the wheels 17, 18, 19, and 20 perform rolling motion on the guide rails 15 and 16, and upper parts of the wheels 17, 18, 19, and 20 do not contact the guide rails 15 and 16. A separation distance between the front wheels 17 and 18 and the rear wheels 19 and 20 has an enough value to properly disperse load, transmitted to the wheels 17, 18, 19, and 20 during loading/unloading, to the guide rails 15 and 16.

The base 27 includes a lower plate 29, to which the brackets 23, 24, 25, and 26 are fixed, a plurality of side plates 28 vertically fixed to the upper surface of the lower plate 29, and a flat-type upper plate 30 installed on the upper surfaces of the side plates 28.

The upper plate 30 maintains designated dimensions, and thus provides a space for installing or sufficiently receiving vertical fixed members 31 and 32 and respective components of the ascending and descending unit 7. A control panel 34 of the controller to control the overall apparatus 1 is installed at one side of the upper surface (or the lower surface) of the upper plate 30, and an oil tank 35, a hydraulic pump P, a hydraulic motor 57, and a plurality of solenoid valves, a plurality of flow control valves, and a hydraulic pipe, which are not shown, are installed at the other side of the upper surface (or the lower surface) of the upper plate 30.

Hereinafter, the driving unit and the power transmission unit to reciprocate the transfer cart 3 will be described.

A shaft 47 is located at the front end of the frame f, both sides of the shaft 47 are journalled to the frame f by brackets 48 and 49, and chain brackets 50, 51, and 52 are respectively installed at the center and both ends of the shaft 47. A chain bracket 54 is fixed to an output shaft of a reducer 53 fixed to the front end of the frame f, and the chain bracket 54 of the reducer 53 and the chain bracket 50 of the shaft 47 are connected by a chain 55, and an input shaft of the reducer 53 and a rotary shaft of the hydraulic motor 57 is connected by a coupler 56 to transmit the reduced rotary force of the hydraulic motor 57 to the chain brackets 51 and 52. Further, a pair of chain brackets 45 and 46 separated from each other is installed at both sides of the rear end of the frame f. Here, a separation distance between the chain brackets 51 and 52 located at the front end of the frame f and a separation distance between the chain brackets 45 and 46 located at the rear end of the frame f are equal.

Figure 7:
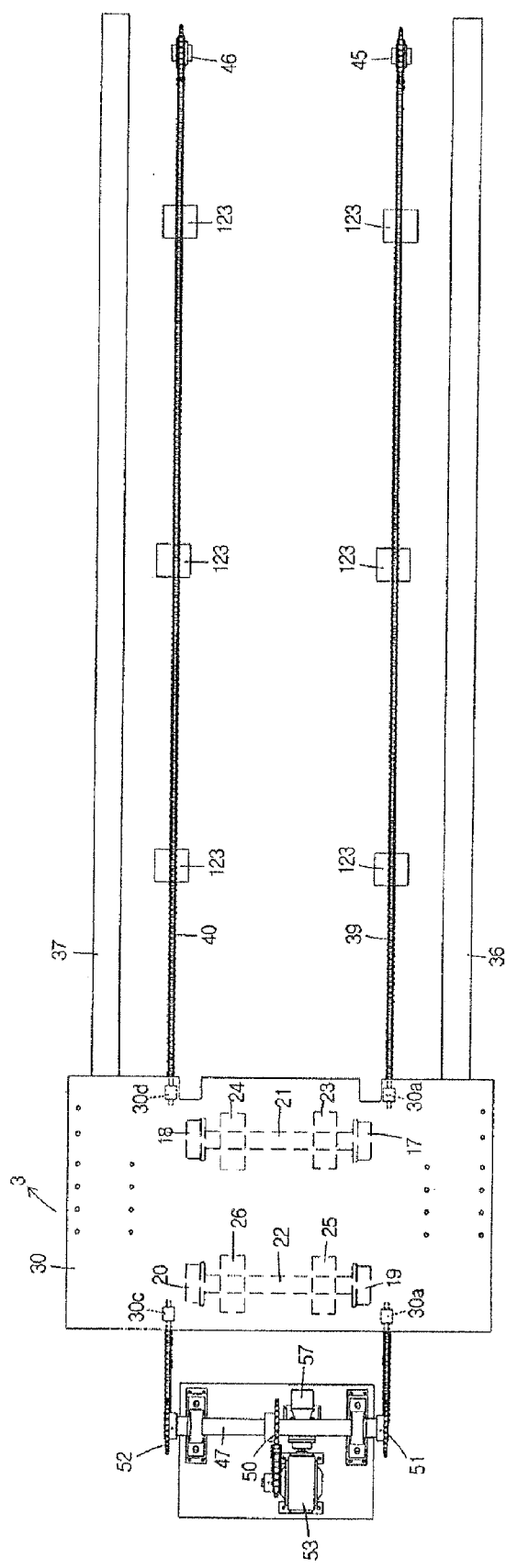
FIG. 7 is a schematic view illustrating power transmission of a transfer cart of the apparatus in accordance with the embodiment of the present invention.

The chain bracket 51 located at the front end of the frame f and the chain bracket 45 located at the rear end of the frame f are connected by a chain 39, as shown in FIG. 7, and both ends of the chain 39 are respectively connected to brackets 30a and 30b installed at both sides of the lower surface of the upper plate 30 of the transfer cart 3, as shown in FIGS. 7, 9, 10, and 11. The chain bracket 52 located at the front end of the frame f and the chain bracket 46 located at the rear end of the frame f are connected by another chain 40, and both ends of the chain 39 are respectively connected to brackets 30c and 30d installed at both sides of the lower surface of the upper plate 30 of the transfer cart 3. Here, the chains 39 and 40 are parallel with each other.

Figure 8:
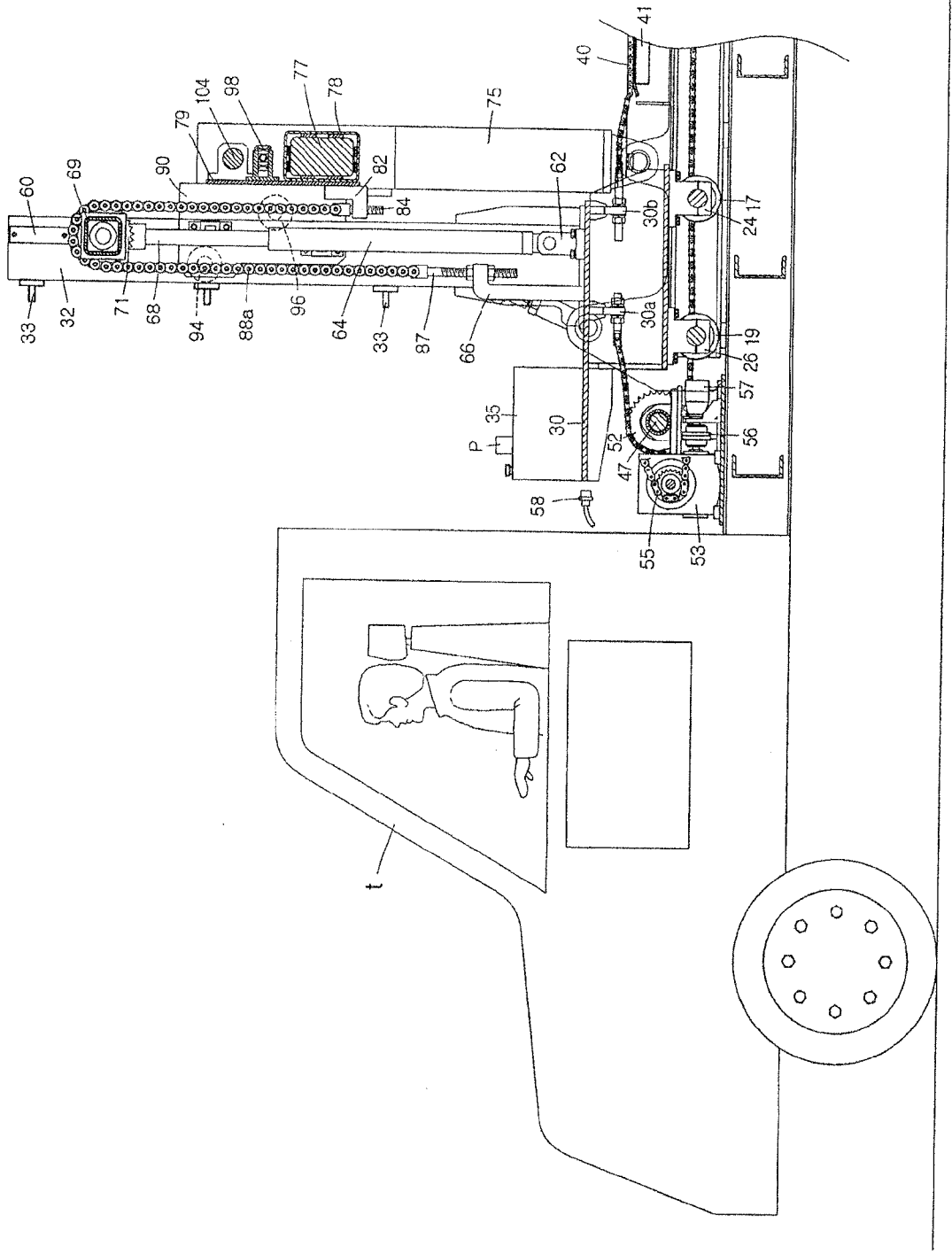
FIG. 8 is a partial sectional view of the transfer cart and an ascending and descending unit of the apparatus in accordance with the embodiment of the present invention in a state in which the elevating unit is located at an initial position.

Bolts are respectively installed at the ends of the chains 39 and 40, as shown in FIGS. 7 and 8. The bolts are respectively connected with the brackets 30a, 30b, 30c, and 30d, and are respectively fixed with plural nuts, thus properly adjusting the tensions of the chains 39 and 40.

When the shaft 47 is rotated in a regular direction or a reverse direction by the regular-directional rotation or the reverse-directional rotation of the hydraulic motor 57, the chains 39 and 40 move forward or backward, the transfer cart 3 also moves forward or backward due to the traction power of the chains 39 and 40, and the wheels 17, 18, 19, and 20 roll along the guide rails 15 and 16 and guide movement of the transfer cart 3.

The hydraulic motor 57 is rotated in a regular direction or a reverse direction by the hydraulic pump P and the solenoid valves SV7, which will be described later, and the hydraulic pump P is rotated by an engine for exclusive use or an engine mounted on the vehicle t and supplies oil the hydraulic motor 57 and the respective cylinders. The engine may be an engine using fossil fuels or other fuels or a motor using electric energy.

Figure 9:
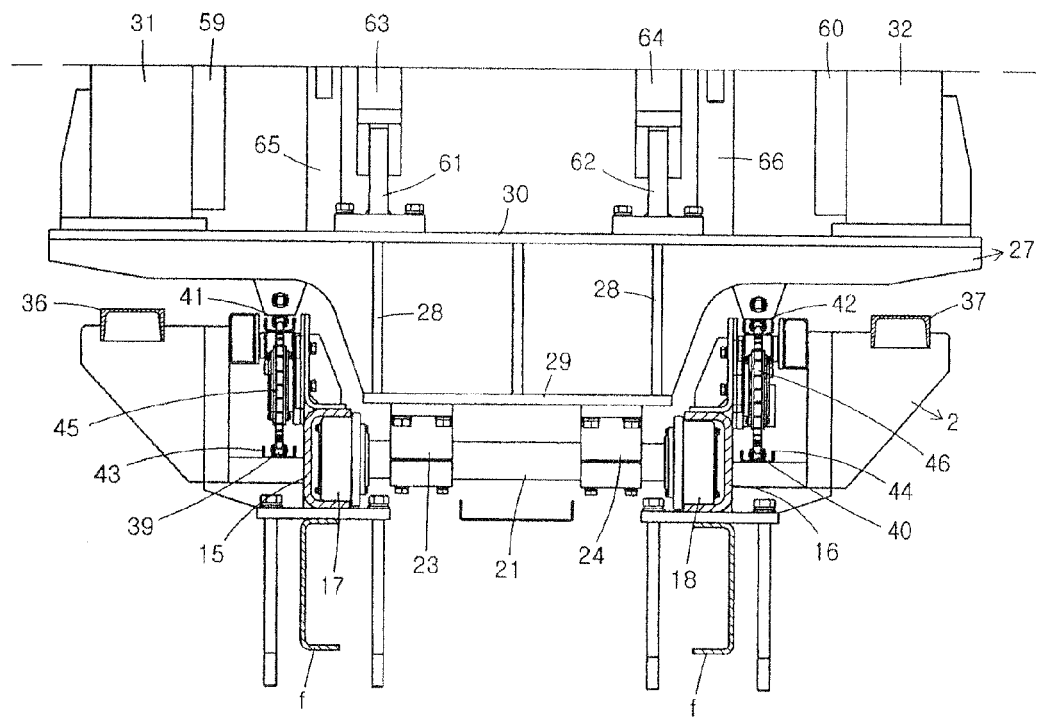
FIG. 9 is a partial sectional view of the transfer cart of the apparatus in accordance with the embodiment of the present invention.
Figure 10:
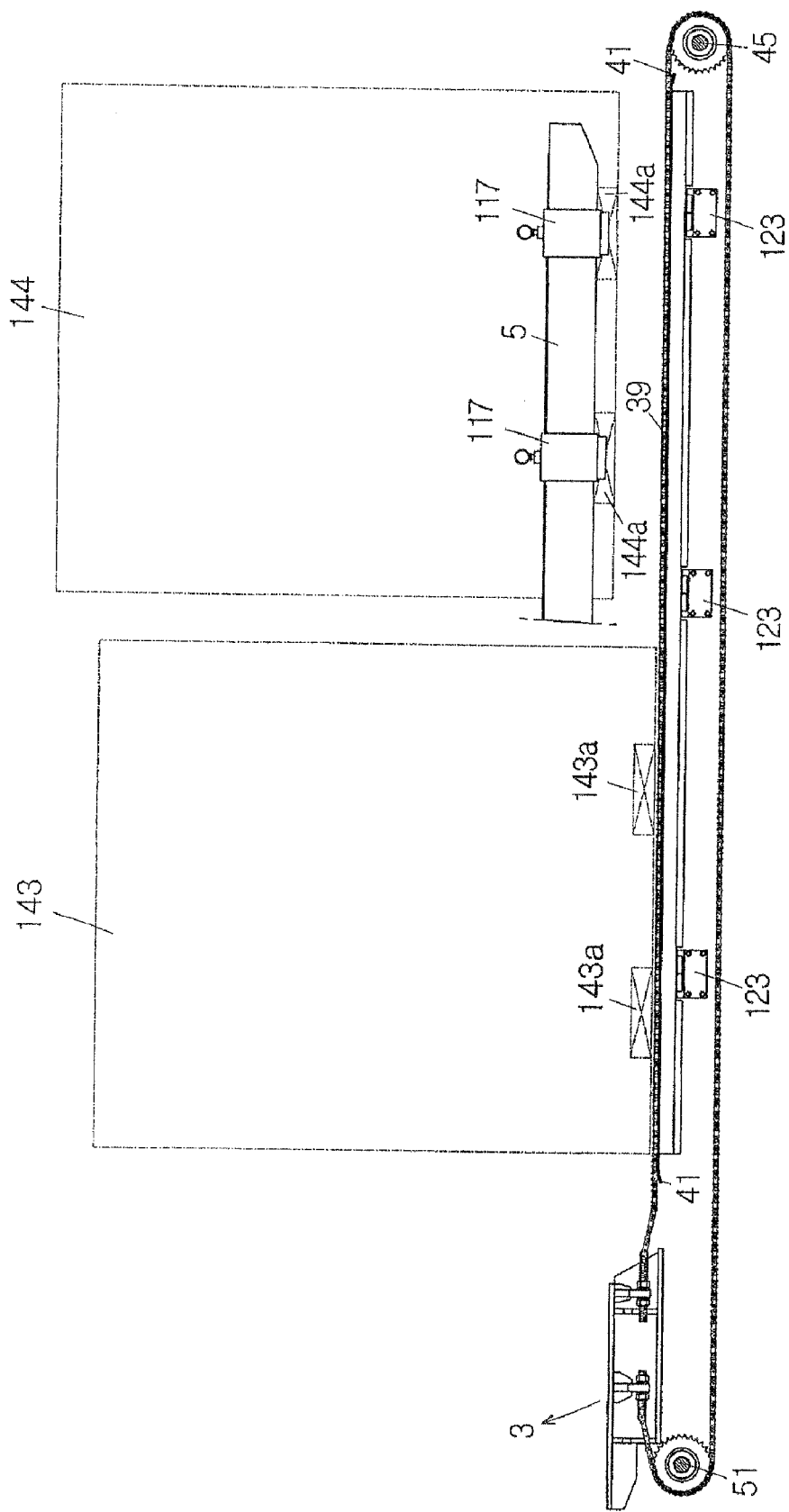
FIG. 10 is a side view illustrating a descending state of chains of the apparatus in accordance with the embodiment of the present invention.
Figure 12:
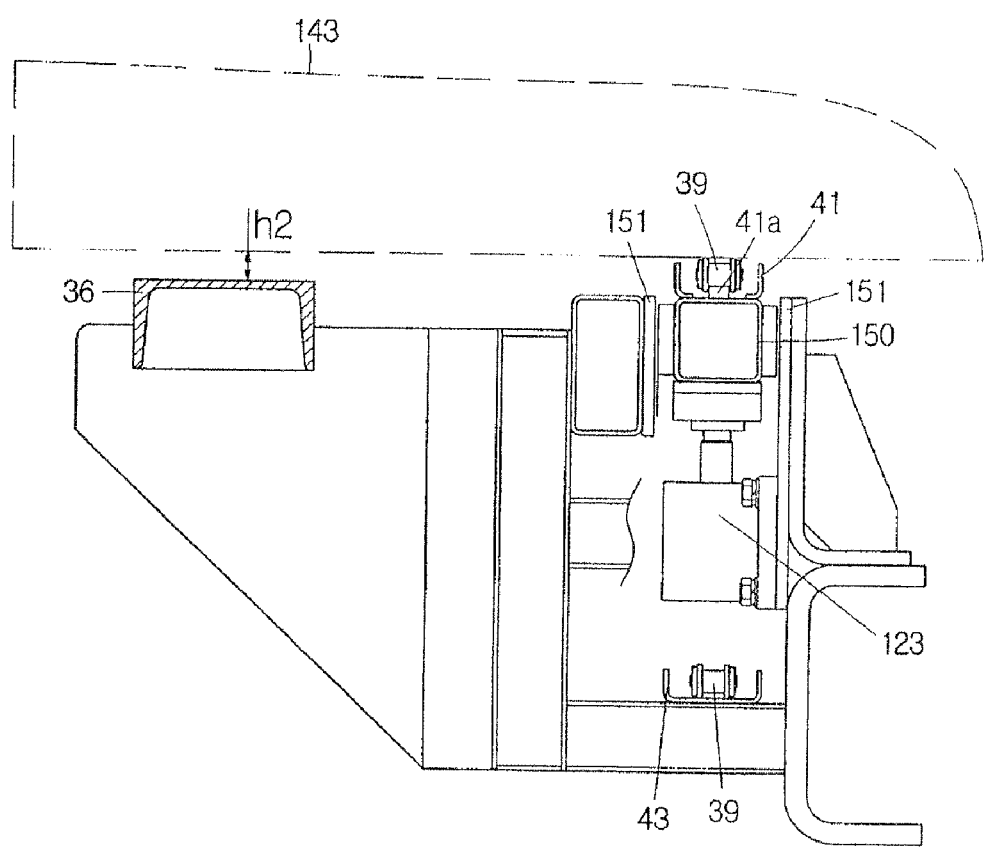
FIG. 12 is a schematic view of a chain ascending and descending unit of the apparatus in accordance with the embodiment of the present invention in a state in which a storage container is raised by the ascent of the chains.
Figure 13:
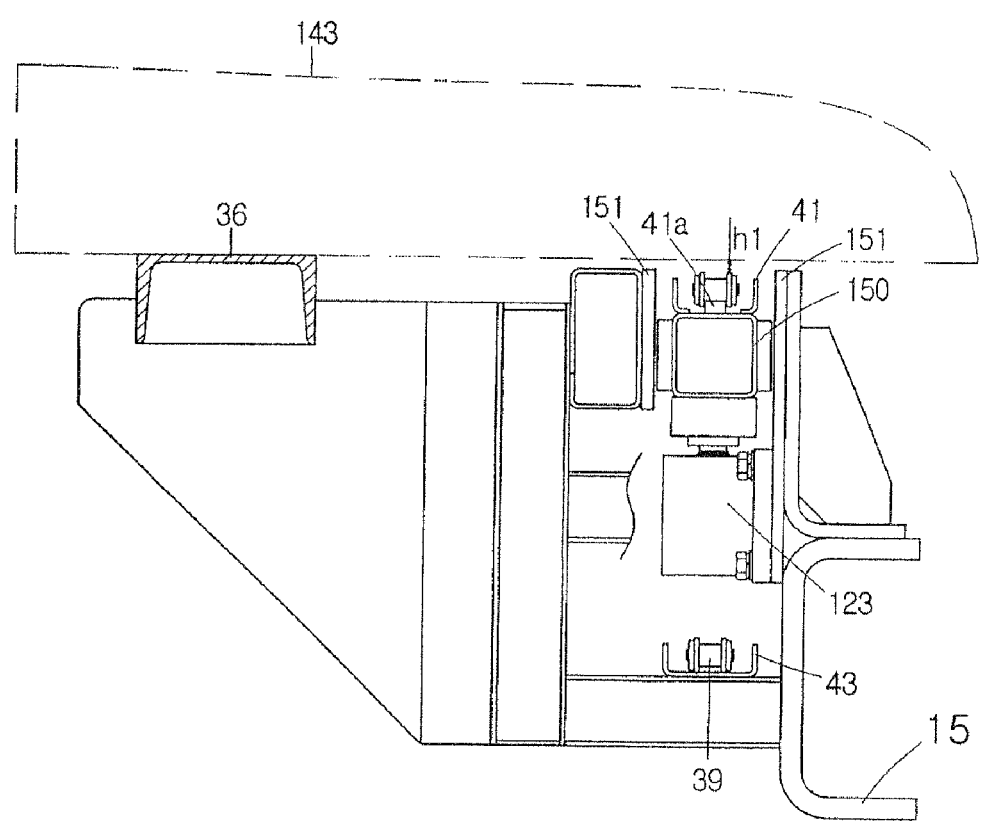
FIG. 13 is a schematic view of the chain ascending and descending unit of the apparatus in accordance with the embodiment of the present invention in a state in which the storage container is lowered by the descent of the chains.
Figure 14:
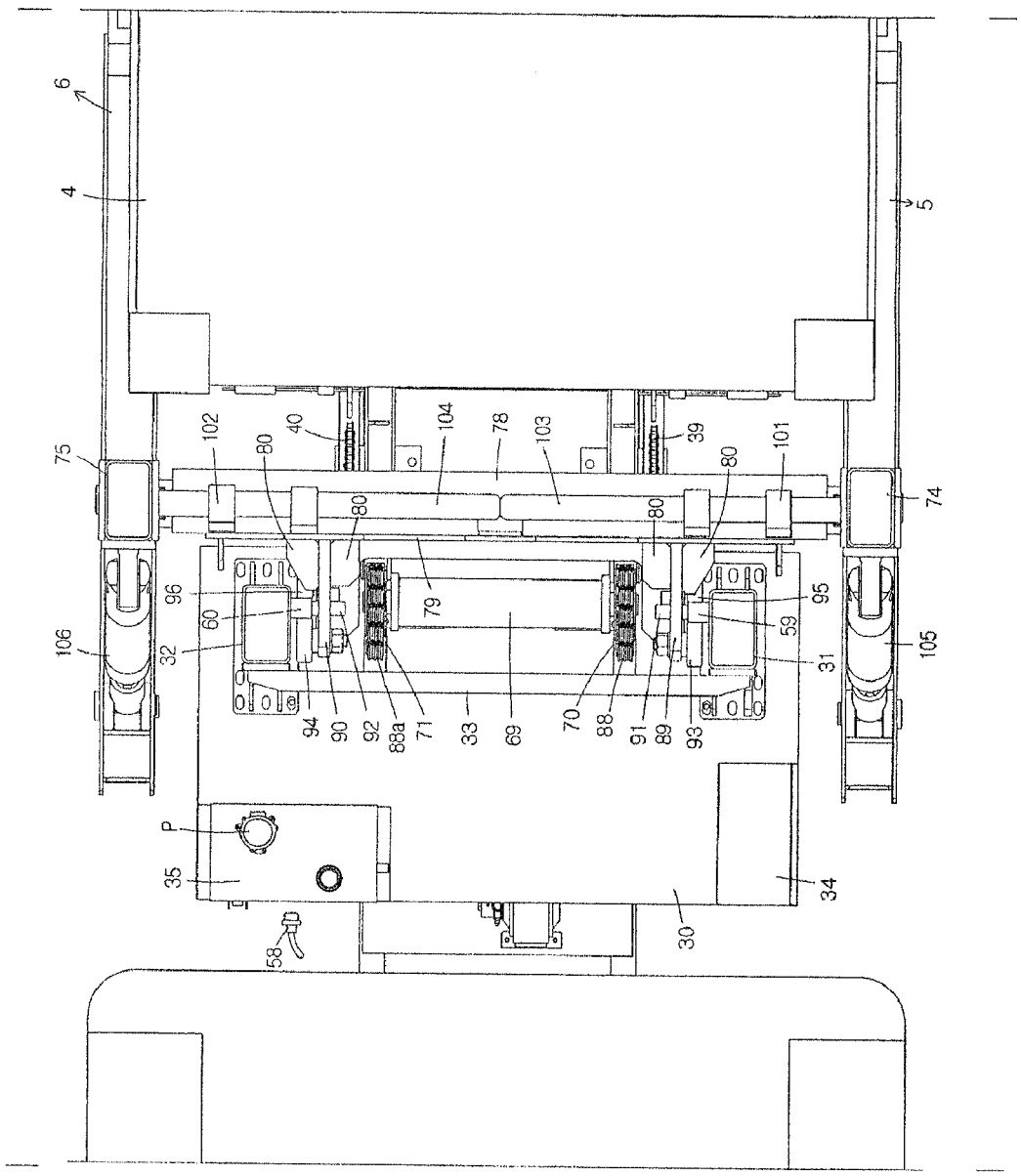
FIG. 14 is a partial sectional view of the ascending and descending unit of the apparatus in accordance with the embodiment of the present invention.

Chain brackets 41, 42, 43, and 44 are respectively installed just under the chains 39 and 40, as shown in FIGS. 9, 12, and 13, and prevent sagging of chains 39 and 40 and guide movement of the chains 39 and 40. Further, both sides of the chain brackets 41, 42, 43, and 44 are bent upwardly, thus improving the strength of the chain brackets 41, 42, 43, and 44 and preventing separation of the chains 39 and 40 from original positions or tracks when the chains 39 and 40 move.

Lower ends of both sides of the chain brackets 41, 42, 43, and 44 are bent downwardly or are respectively provided with downward sloping parts, thus inducing smooth entry of the chains 39 and 40 into the chain brackets 41, 42, 43, and 44 and greatly reducing friction caused by the entry of the chains 39 and 40 into the chain brackets 41, 42, 43, and 44.

Guide bars 41a to guide rolling motion (or rolling contact) of outer circumferential surfaces of rollers of the chains 39 and 40 are respectively installed on the bottom of the upper chain brackets 41 and 42 in the longitudinal direction. Since the guide bars 41a greatly reduce the coefficient of friction of the chains 39 and 40, even though the load of the storage container is directly applied to the chains 39 and 40, smooth movement of the chains 39 and 40 and the storage container is achieved.

Holding frames 36 and 37, on which both sides of the storage container are placed, are respectively located at outer regions separated from the chains 39 and 40 to some extent. The holding frames 36 and 37 are installed in parallel on the upper surface of the frame f such that the interval between the holding frames 36 and 37 is narrower than the width of the storage container to stably support the storage container, and maintain a designated strength and a designated width to sufficiently support the load of the loaded storage container.

The fork arms 5 and 6 are configured such that they clamp and load or unload one storage container 4 for the sake of safety. Therefore, in case that plural storage containers are loaded or unloaded, it is necessary to raise the storage container located at the front end of the loading table 2 and drop the storage container down to the holding frames 36 and 37 to move the storage container. Thus, in this case, the upper chain brackets 41 and 42 are raised and lowered using chain ascending and descending units, i.e., plural ascending and descending cylinders 123, installed at designated intervals along the chains 39 and 40, as shown in FIG. 7 and FIGS. 10 to 13.

Rectangular frames 150 are respectively fixed to the lower parts of the chain brackets 41 and 42, as shown in FIGS. 12 and 13, and the plural ascending and descending cylinders 123 are installed at the designated intervals below the frames 150 and thus raise and lower the chains 39 and 40. Guide members 151 to guide the raising and lowering of the frames 150 are respectively installed at both sides of the frames 150. The guide bars 41a are respectively installed on the upper surfaces of the chain brackets 41 and 42, and guide rolling motion of the outer circumferential surfaces of the rollers of the chains 39 and 40, thus greatly reducing the coefficient of friction of the chains 39 and 40 during the movement of the chains 39 and 40.

The chain brackets 41 and 42, the frames 150, the guide members 151, and the guide bars 41a have almost the same length, and are parallel with each other.

FIG. 13 illustrates a state in which the chain 39 is lowered by the descending operation of the chain ascending and descending cylinders 123, the first storage container 143 is placed on the holding frame 36, and the first storage container 143 and the chain 39 are separated from each other by a designated distance h1. FIG. 12 illustrates a state in which the frame 150, the chain bracket 41, and the chain 39 are raised by the ascending operation of the ascending and descending cylinder 123, the chain 39 pushes up the first storage container 143, and the first storage container 143 is raised from the holding frame 36 by a designated height h2. In the state of FIG. 12, when the chain 39 moves, the first storage container 143 on the chain 39 moves along the chain 39, and the rollers of the chain 39 contact the upper surface of the guide bar 41a and perform rolling motion, thereby greatly reducing the friction of the chain 39 with the chain bracket 41.

Although FIG. 7 and FIGS. 10 to 13 illustrate only the chain bracket 41 located at one side of the frame, the chain bracket 42 located at the other side of the frame, being symmetrical with the chain bracket 41, has the same structure.

A proximity sensor 58 to prevent the transfer cart 3 from excessively moving forward is installed at the front end of the frame 1, and another proximity sensor (not shown) to prevent the transfer cart 3 from excessively moving backward is installed at the rear end of the frame 1. The proximity sensors are connected to the controller to stop the hydraulic motor 57, or interrupt a clutch of the driving unit to cut off power, thereby preventing the transfer cart 3 from excessively moving forward or backward.

The ascending and descending unit 7 to raise and lower the fork arms 5 and 6 is installed on the transfer cart 3 such that the ascending and descending unit 7 can reciprocate in the longitudinal direction of the vehicle t. Hereinafter, the configuration of the ascending and descending unit 7 will be described.

The ascending and descending unit 7 includes a pair of left and right brackets 61 and 62 installed at the center of the upper surface of the upper plate 30 of the transfer cart 3, ascending and descending cylinders 63 and 64 journalled on the brackets 61 and 62 and provided with rods 67 and 68 facing upward, a horizontal connection member 69 installed at the ends of the rods 67 and 68 of the ascending and descending cylinders 63 and 64, chain sprockets 70 and 71 journalled at both ends of the horizontal connection member 69, a pair of vertical fixed members 31 and 32 fixed to the upper surface of the upper plate 30 at the outside of the brackets 61 and 62, a plurality of fixing members 33 firmly connecting the vertical fixed members 31 and 32 at a designated interval to prevent widening and movement of the vertical fixed members 31 and 32 and reinforce strength of the vertical fixed members 31 and 32, ascent and descent guide rails 59 and 60 vertically fixed to the longitudinal inner surfaces of the vertical fixed members 31 and 32, as shown in FIG. 7, a connection plate 79 fixed to a horizontal ascending and descending member 78, raising and lowering plates 89 and 90 fixed to both sides of the connection plate 79 at a right angle, guide rollers 93 and journalled to upper parts of the raising and lowering plates 89 and 90 and rolling on the front surfaces of the ascent and descent guide rails 59 and 60, guide rollers 95 and 96 installed at lower parts of the raising and lowering plates 89 and 90 and rolling on the rear surfaces of the ascent and descent guide rails 59 and 60, guide rollers 91 and 92 journalled to the raising and lowering plates 89 and 90, inserted into holes formed through the raising and lowering plates 89 and 90, contacting upper and lower parts of the side surfaces of the ascent and descent guide rails 59 and 60, and performing rolling motion, a plurality of brackets 80 firmly connecting the raising and lowering plates 89 and 90 and the connection plate 79, the horizontal ascending and descending member 78 formed in a rectangular pipe shape and fixed to the connection plate 79, projectable and retractable members 76 and 77 connected to both sides of the horizontal ascending and descending member 78 and having a horizontally projectable and retractable structure, vertical members 74 and 75 respectively fixed to the outer ends of the projectable and retractable members 76 and 77, a pair of the fork arms 5 and 6 journalled in parallel at the lower ends of the vertical members 74 and 75 by pins 72 and 73, tilting cylinders 105 and 106 journalled at the front ends of the fork arms 5 and 6 and the vertical members 74 and 75 with pins 107, 108, 111, and 112 to directly adjust the slope of the fork arms 5 and 6, chain fixing members 65 and 66 vertically installed at left and right sides of the upper surface of the upper plate 30, screw rods 86 and 87 screw-connected to the fixing members 65 and 66, brackets 81 and 82 installed at both sides of the connection plate 79, chains 88 and 89 wound on the chain sprockets 70 and 71 and provided with ends connected to the screw rods 83 and 84 and the other ends connected to the screw rods 86 and 87 of the fixing members 65 and 66, a pair of projectable and retractable cylinders 97 and 98 horizontally installed at the center of the connection plate 79, rods 99 and 100 of the projectable and retractable cylinders 97 and 98 installed on the vertical members 74 and 75 to allow the projectable and retractable members 76 and 77 to horizontally project and retract, and a pair of guide rods 103 and 104 horizontally fixed to the vertical members 74 and 75 and connected to guide members 101 and 102 installed on the connection plate 79 to assist projection and retraction of the projectable and retractable members 76 and 77.

Figure 19:
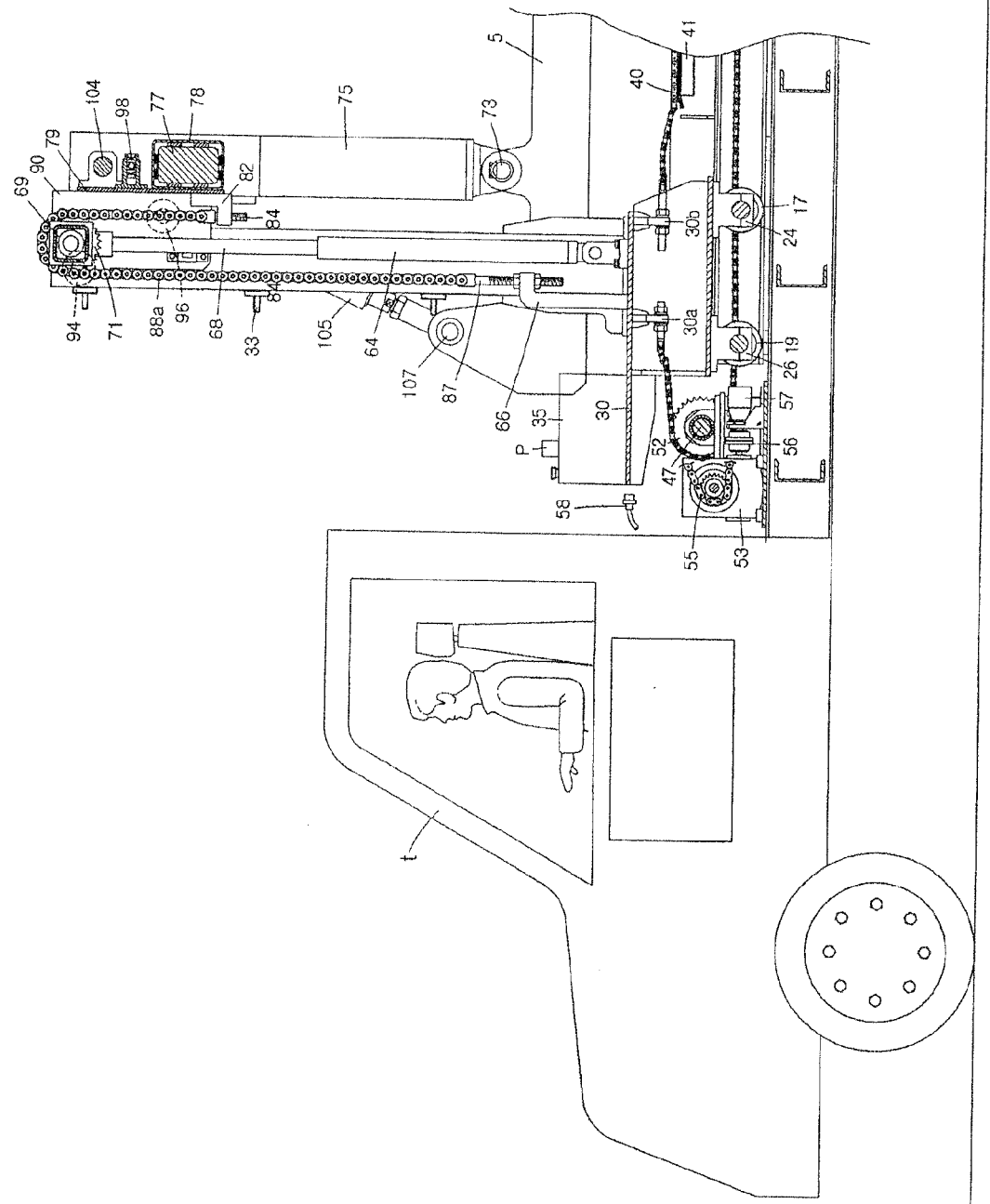
FIG. 19 is a sectional view illustrating an ascending state of the ascending and descending unit of the apparatus in accordance with the embodiment of the present invention.
Figure 20:
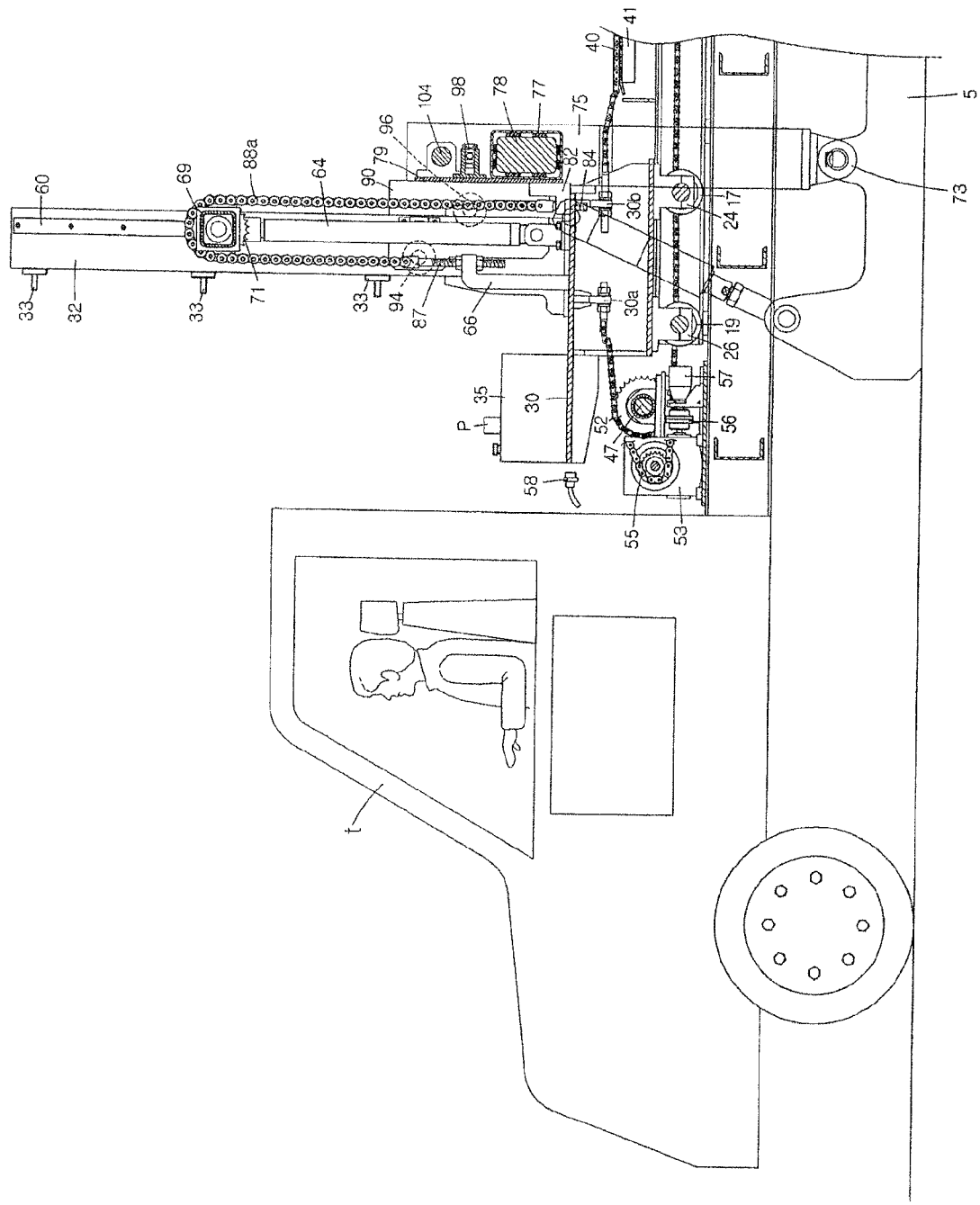
FIG. 20 is a sectional view illustrating a descending state of the ascending and descending unit of the apparatus in accordance with the embodiment of the present invention.

Preferably, sliding bearings are installed in spaces between the horizontal ascending and descending member 78 and the projectable and retractable members 76 and 77, and thus achieve smooth projection and retraction of the projectable and retractable members 76 and 77, as shown in FIGS. 8, 19, and 20. The sliding bearings are fixed horizontally, i.e., in the longitudinal direction of the horizontal ascending and descending member 78 and/or the projectable and retractable members 76 and 77.

Figure 15:
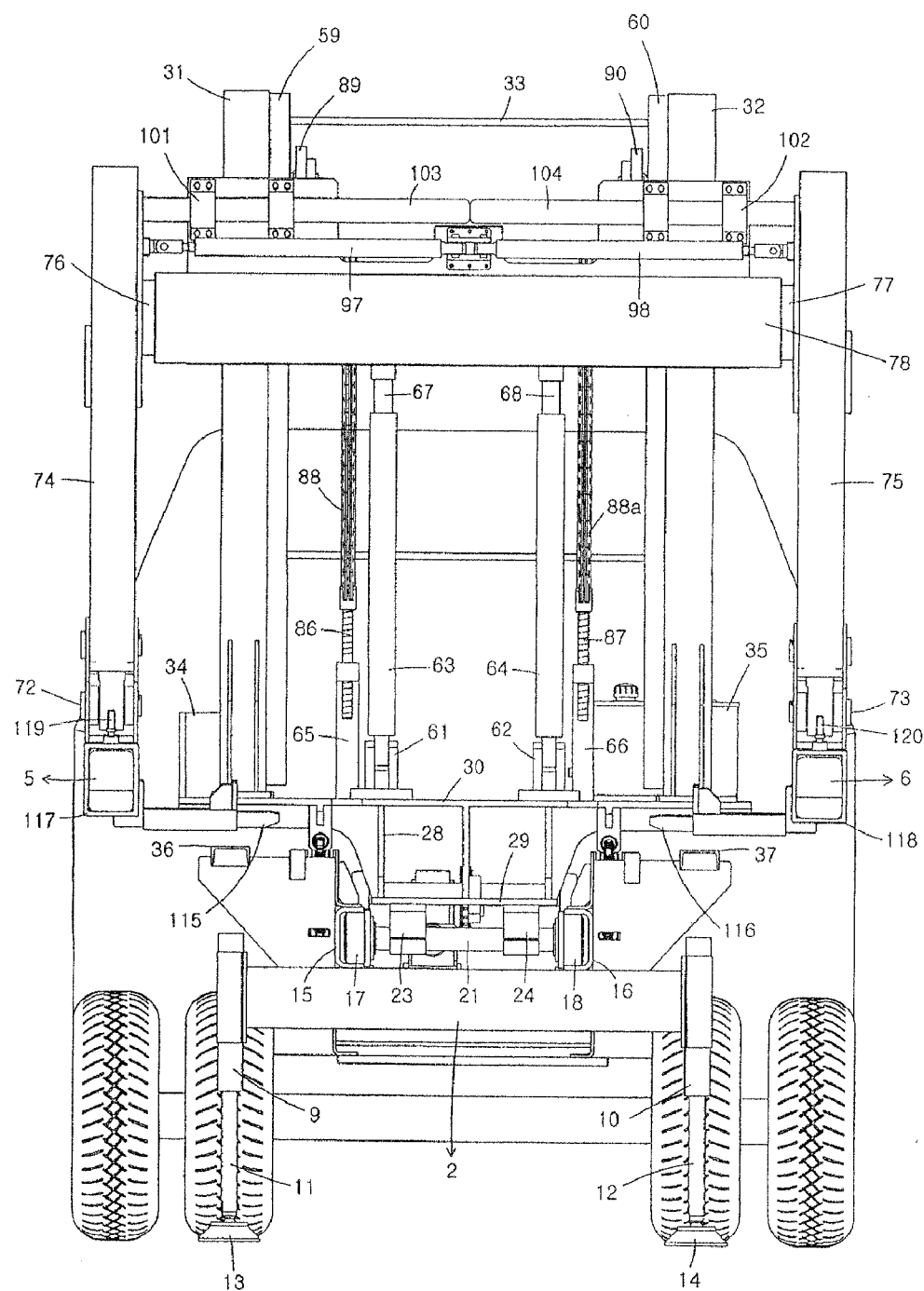
FIG. 15 is a rear view illustrating an ascending state of the ascending and descending unit of the apparatus in accordance with the embodiment of the present invention.
Figure 16:
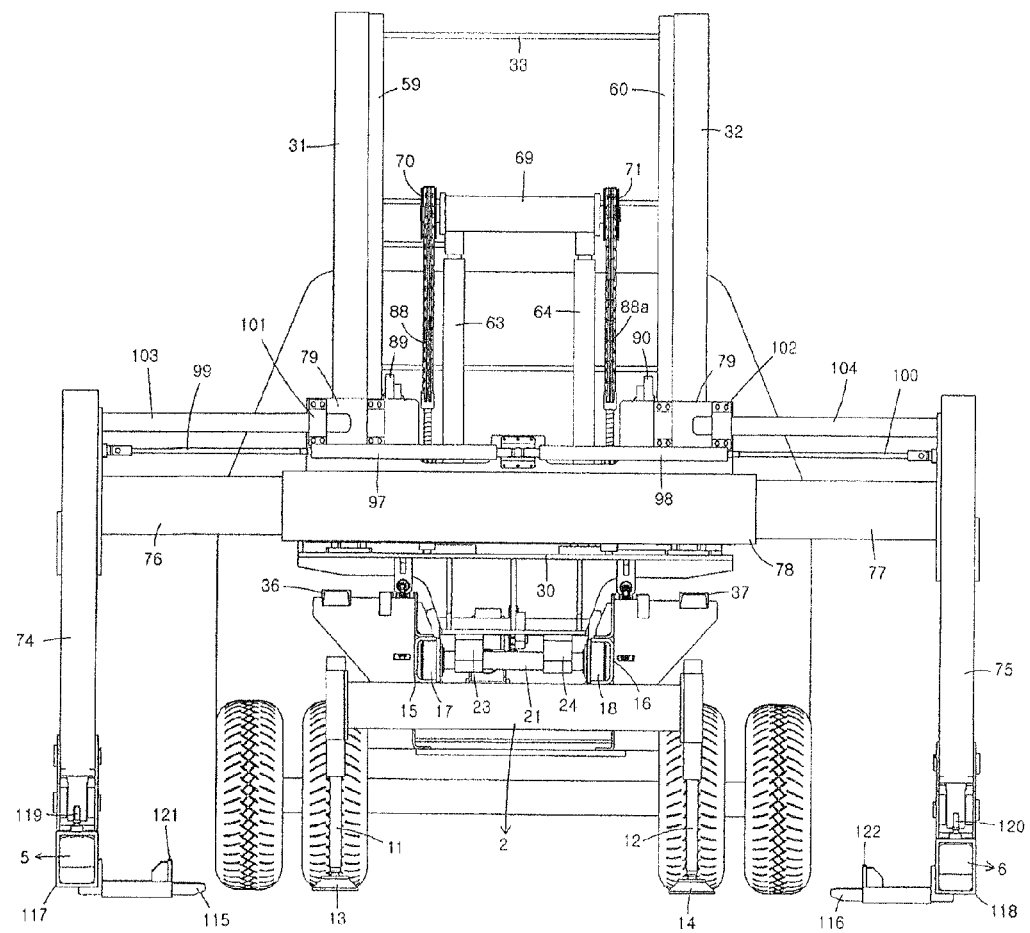
FIG. 16 is a rear view illustrating a state of the apparatus in accordance with the embodiment of the present invention, in which the ascending and descending unit is lowered and the fork arms are spread out.
Figure 17:
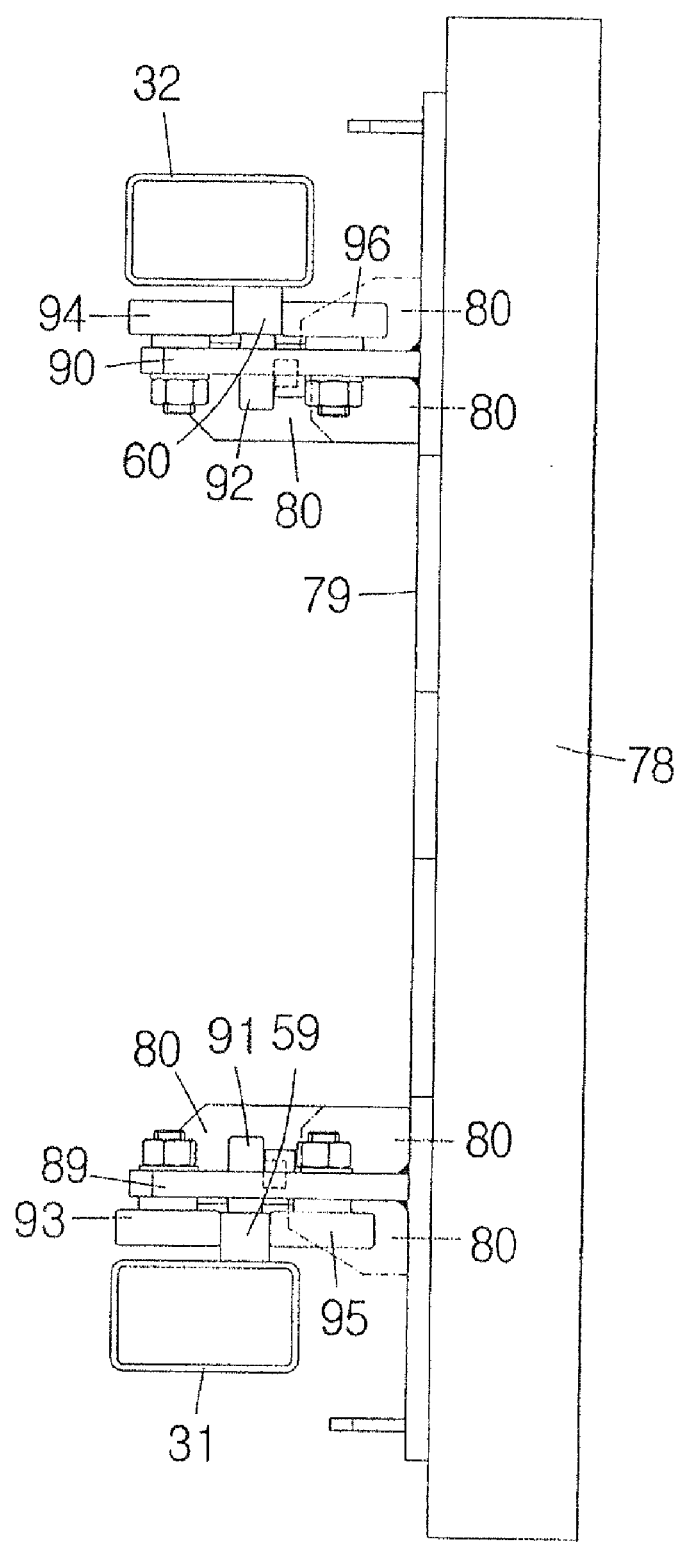
FIG. 17 is a plan view of an ascent and descent guide unit of the apparatus in accordance with the embodiment of the present invention.
Figure 37:
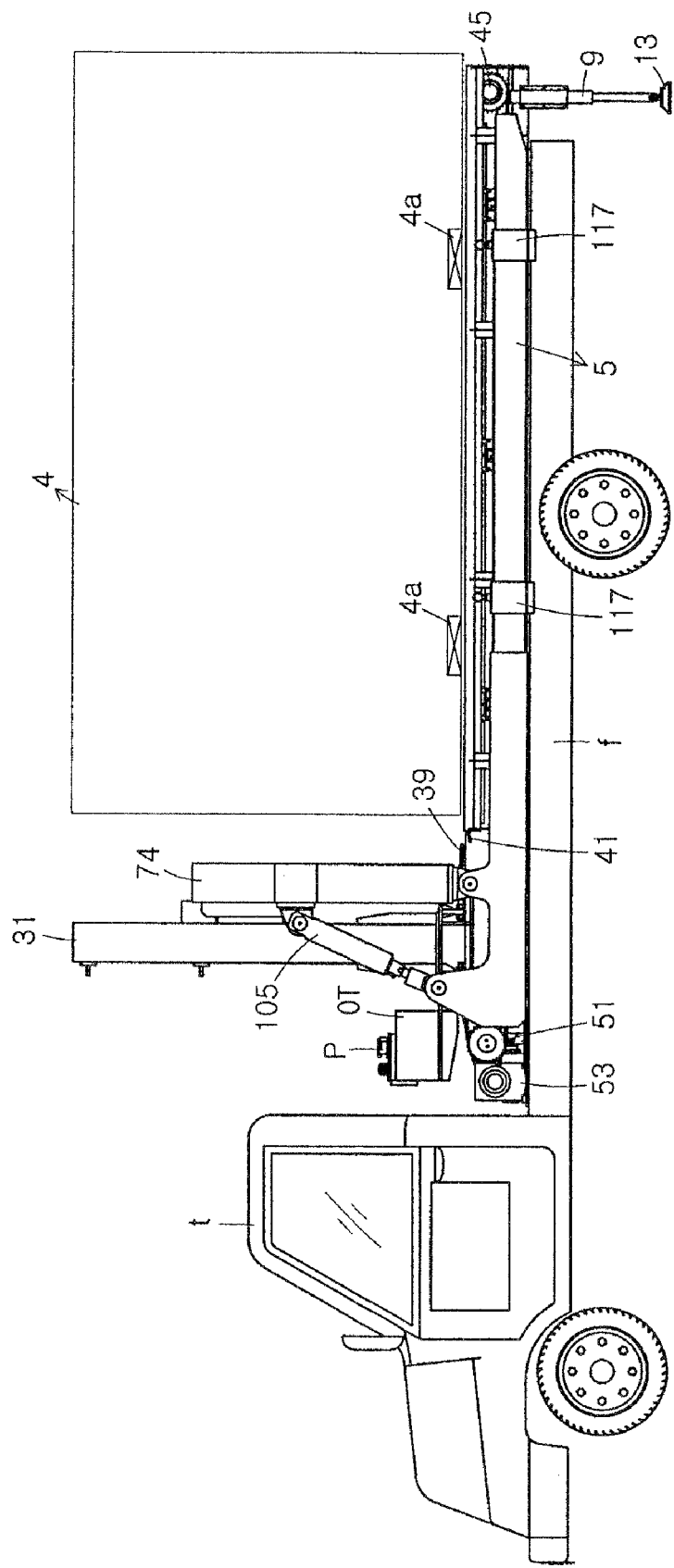
FIG. 37 is a side view of the apparatus in accordance with the embodiment of the present invention in a loaded state with one storage container.

FIG. 8 illustrates an initial height of the ascending and descending unit 7, i.e., illustrating the same state as that of FIG. 33 or FIG. 37. FIG. 19 illustrates a height of the ascending and descending unit 7 when the ascending and descending unit 7 clamps the storage container 4 and then ascends, i.e., illustrating the same state as that of FIG. 15 or FIG. 39. FIG. 20 illustrates a height of the ascending and descending unit 7 when the ascending and descending unit 7 descends and places the storage container 4 on the ground, i.e., illustrating the same state as that of FIG. 16 or FIG. 41.

Since the chain sprockets 70 and 71 and the chains 88 and 88a journalled at both sides of the horizontal connection member 69 are operated by the principle of a pulley, an ascending and descending stroke of the ascending and descending cylinders 63 and 64 is reduced by about half and the overall height of the ascending and descending unit 7 is reduced by about half.

Concretely, the downward facing ends of the chains 88 and 88a are connected to the chain fixing members 65 and 66 fixed to the upper plate 30, the other downward facing ends of the chains 88 and 88a are connected to the horizontal ascending and descending member 78 through the brackets 81 and 82 and the connection plate 79, and the central parts of the chains 88 and 88a are raised by the chain sprockets 70 and 71. Thereby, the chains 88 and 88a have a pulley structure.

Therefore, as shown in FIG. 19, the ascending and descending cylinders 63 and 64 ascend, the rods 67 and 68 push up the connection member 69, the chain sprockets 70 and 71 are raised and thus push up the horizontal ascending and descending member 78, and the vertical members 74 and 75 and the fork arms 5 and 6 are raised.

Here, since ends of the chains 88 and 88a are fixed to the upper plate 30, the vertical members 74 and 75 and the fork arms 5 and 6 are raised to a height twice that to which the rods 67 and 68 and the horizontal connection member 69 are raised. On the other hand, in case that the ascending and descending unit 7 lowers, the vertical members 74 and 75 and the fork arms 5 and 6 are lowered to a height twice that to which the rods 67 and 68 and the horizontal connection member are lowered. Therefore, the overall height of the ascending and descending unit 7 and the ascending and descending stroke of the ascending and descending unit 7 are reduced by half.

The projectable and retractable cylinders 97 and 98 are operated such that the projectable and retractable members 76 and 77 properly project and retract when the fork arms 5 and 6 clamp/unclamp the storage container 4, and perform centering of a clamping position by respectively adjusting the positions of the fork arms 5 and 6 in consideration of the positions of the vehicle t and the storage container 4.

Figure 29:
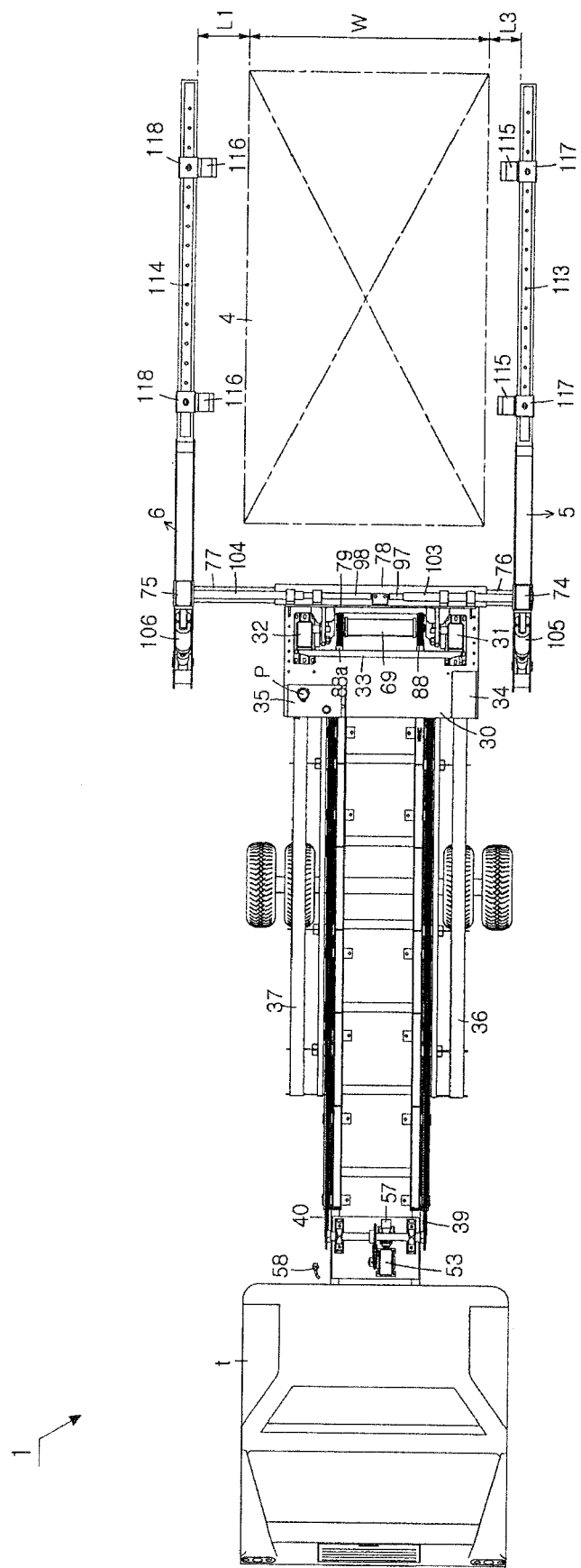
FIG. 29 is a plan view of the apparatus in accordance with the embodiment of the present invention, before a storage container is centered.
Figure 30:
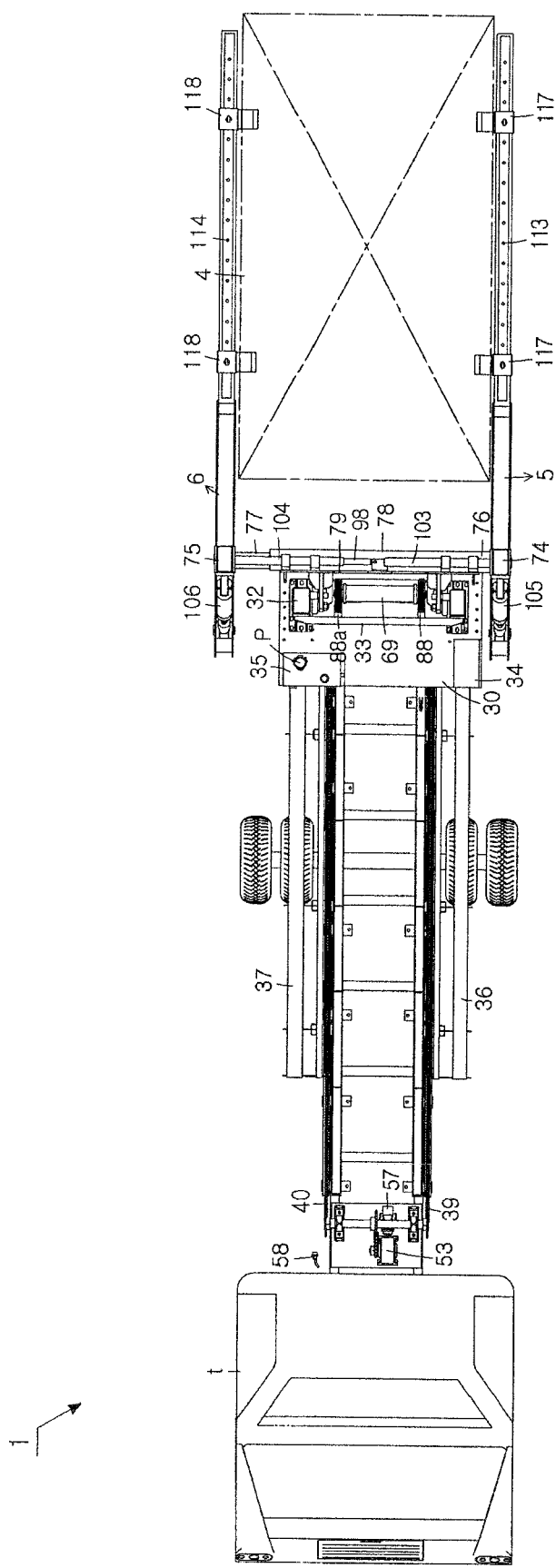
FIG. 30 is a plan view of the apparatus in accordance with the embodiment of the present invention in a state in which the storage container is clamped with the fork arms in order to center the storage container.
Figure 31:
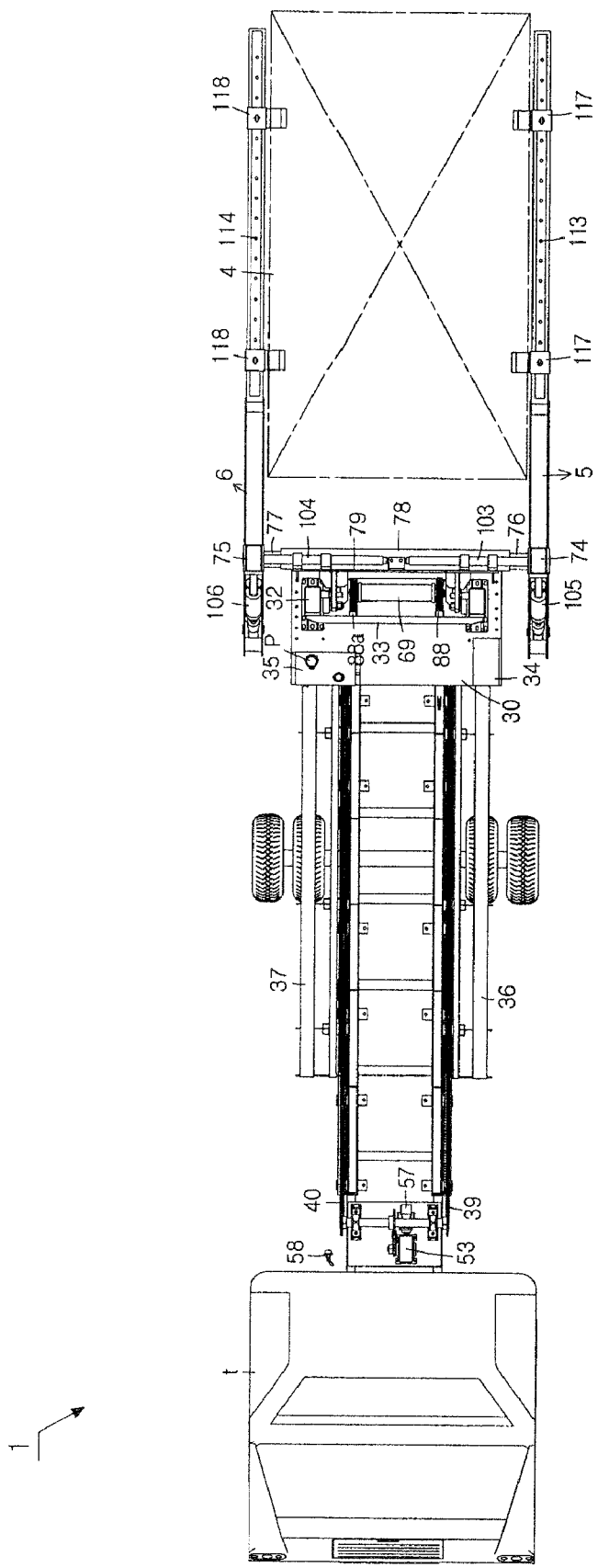
FIG. 31 is a plan view of the apparatus in accordance with the embodiment of the present invention in a state in which the clamped storage container is centered.

That is, in case that the storage container 4 is closer to one fork arm 5, as shown in FIG. 29, the other fork arm 6 is more protruded and thus adjusts a separation distance between the forks 118 and the storage container 4 such that the separation distance between the forks 118 and the storage container 4 is equal to the separation distance between the forks 117 and the storage container 4. Thereafter, the fork arms 5 and 6 stably clamp the storage container 4, and then raise the storage container, as shown in FIG. 30. Thereafter, the projecting lengths of the projectable and retractable members 76 and 77 are adjusted such that the protruding lengths of the vertical members 74 and 75 and the fork arms 5 and 6 are equal, and thus centering of the position of the storage container 4 is achieved such that the storage container 4 is located at the center of the vehicle t.

Of course, according to circumstances, centering of the storage container 4 may be carried out prior to raising or lowering of the storage container 4, and then raising or lowering of the storage container 4 may be stably carried out.

In the above case, it is preferable that centering (or balancing) of the storage container 4 be maintained within a range, in which there is no obstacle or the storage container 4 is not deviated from the center of gravity so much.

The tilting cylinders 105 and 106 are journalled to the vertical members 74 and 75 with the pins 111 and 112, and ends of the rods 109 and 110 of the tilting cylinders 105 and 106 are journalled at the front ends of the fork arms 5 and 6, which is more protruded than the pins 72 and 73, with the pins 107 and 108. Therefore, in case that the ground under the vehicle t and/or the ground of an unloading place of the container 4 are/is inclined, the tilting cylinders 105 and 106 directly adjust the slope of the fork arms 5 and 6 according to the slope of the ground, as shown in FIG. 32.

Concretely, in case that the rods 109 and 110 of the tilting cylinders 105 and 106 are protruded by the controller, the rear ends of the fork arms 5 and 6 are raised around the pins 72 and 73, and in case that the rods 109 and 110 are intruded by the controller, the rear ends of the fork arms 5 and 6 are lowered around the pins 72 and 73. Further, when the operation of the tilting cylinders 105 and 106 is stopped by the controller, the tilting state of the fork arms 5 and 6 is maintained, and when the fork arms 5 and 6 in this state are lowered, the container 4 is lowered and placed on the ground.

Figure 32:
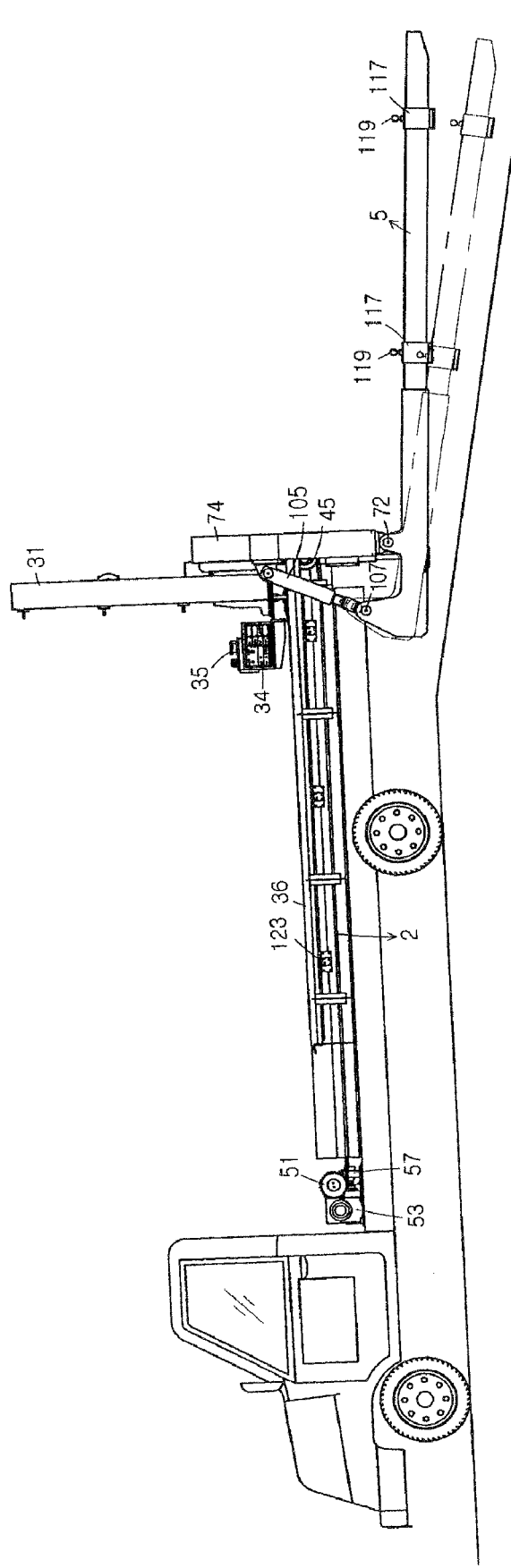
FIG. 32 is a side view illustrating a tilting state of the fork arms of the apparatus in accordance with the embodiment of the present invention.

Although FIG. 32 illustrates the fork arms 5 and 6 in the lowered state, which are tilted, the fork arms 5 and 6 are freely tilted in an allowable angle range at any position. For example, in case that the vehicle t is located on a slope and the ground, on which the storage container 4 will be placed, is level (horizontal), the tilting cylinders 105 and 106 are operated to stably place the storage container 4 on the ground.

The tilting cylinders 105 and 106 are journalled at the vertical members 74 and 75 with the pins 111 and 112 and ends of the rods 109 and 110 of the tilting cylinders 105 and 106 are journalled at the front ends of the fork arms 5 and 6, being more protruded than the pins 72 and 73, with the pins 107 and 108, thus forming a triangular structure. Therefore, the slope of the fork arms 5 and 6 is directly adjusted according to the operating state of the tilting cylinders 105 and 106.

Figure 18:
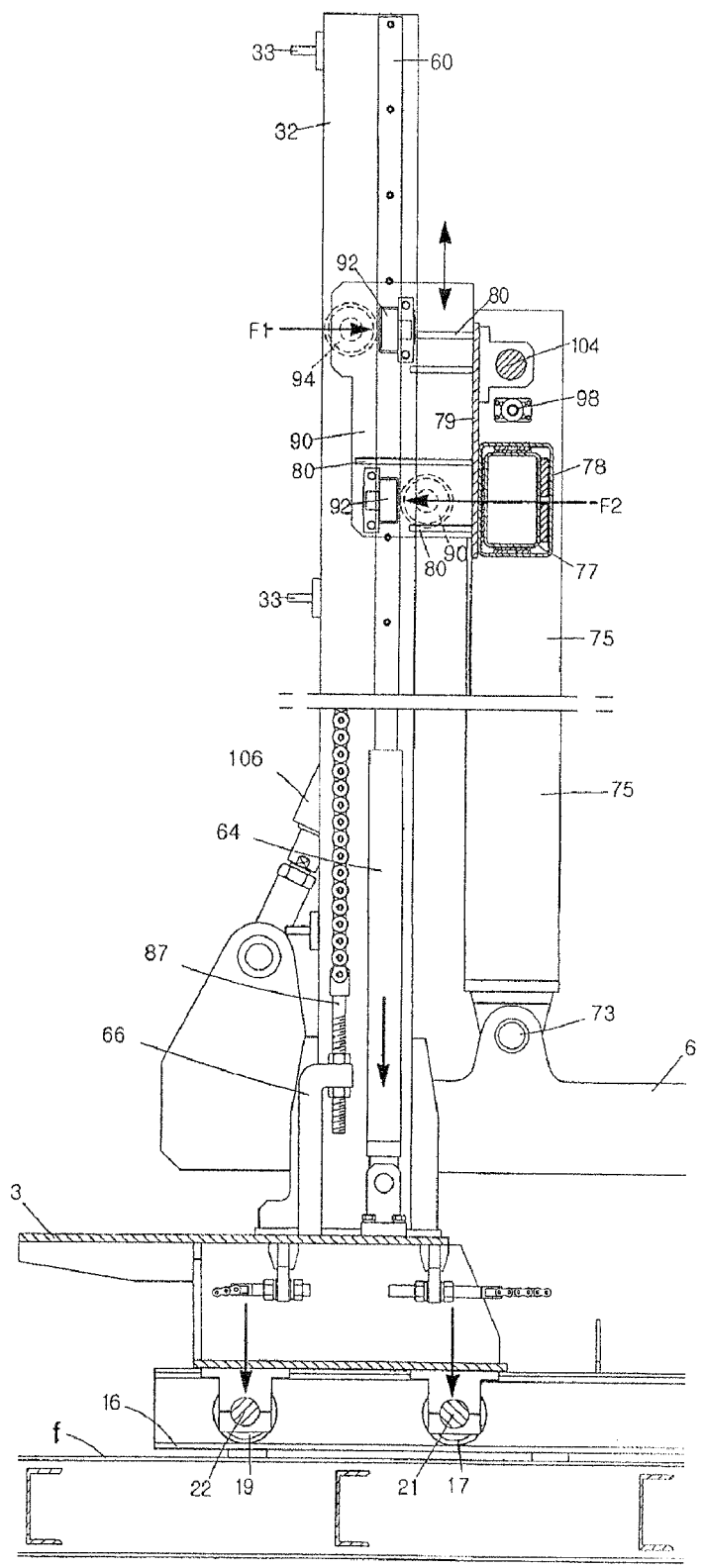
FIG. 18 is a side view of the ascent and descent guide unit of the apparatus in accordance with the embodiment of the present invention.

FIG. 18 illustrates action of live load. When a storage container is clamped by the forks 117 and 118 of the fork arms 5 and 6, live load passes through the ascent and descent guide rails 59 and 60, the vertical fixed members 31 and 32, the ascending and descending cylinders 63 and 64, and the front and rear wheels 17, 18, 19, and 20, and is dispersed to the guide rails 15 and 16, and most of shearing load is intensively transmitted to the ascent and descent guide rails 59 and 60 and the guide rollers 93, 94, 95, and 96 contacting the front and rear surfaces of the ascent and descent guide rails 59 and 60 and rolling.

In FIG. 18, F2 represents shearing load intensively transmitted to the ascent and descent guide rails 59 and 60 and the guide rollers 93, 94, 95, and 96, and F2 represents repulsive force.

The guide rollers 91 and 92 contacting upper and lower parts of the side surfaces of the ascent and descent guide rails 59 and 60 and performing rolling motion prevent the raising and lowering plates 89 and 90 from unnecessarily moving, and prevent the raising and lowering plates 89 and 90 from contacting the ascent and descent guide rails 59 and 60.

The sizes or positions of connection holes 4a, 143a, and 144a formed on the lower parts of the storage containers 4, 143, and 144 are varied according to the lengths (of the sizes) or the standards of the storage containers 4, 143, and 144. Therefore, the positions of the forks 117 and 118 are movable so as to flexibly correspond to the positions of the connection holes 4a, 143a, and 144a.

Figure 21:
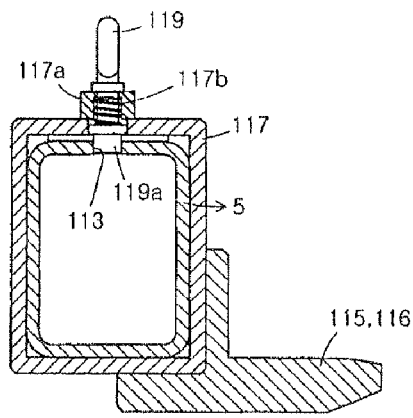
FIG. 21 is a partial sectional view of the fork arm and a fork of the apparatus in accordance with the embodiment of the present invention.

FIG. 21 is a partial sectional view of the fork 117 in accordance with the embodiment of the present invention. A body of the fork 117 connected to the outer surface of the fork arm 5 has a pipe structure, the position of which is movable. That is, the forks 117 and 118 move to proper positions of the fork arms 5 and 6 in consideration of the positions of the connection holes 4a, 143a, and 144a of the storage containers 4, 143, and 144, and connection parts 115 and 116 clamped to the connection holes 4a, 143a, and 144a of the storage containers 4, 143, and 144 are respectively protruded from lower parts of the bodies of the forks 117 and 118.

When clamping positions are determined, the forks 117 and 118 are fixed using fixing units installed at the forks 117 and 118. Each of the fixing units includes a fixture 119 or 120 connected to a hole 117a or 118a formed on the upper part of the fork 117 or 118 and elastically supported by a spring 117b or 118b, and a grip protruded from the upper part of the fixture 119 or 120. A protrusion 119a or 120a formed on the lower part of each of the fixing units is connected to the corresponding one of holes 113 and 114 formed at designated intervals on the upper parts or the upper and lower parts of the fork arms 5 and 6 by the downward elastically supporting force of the spring 117a or 118a. Thereby, the ascent of the protrusions 119a and 120a is prevented, and thus the movement or position change of the forks 117 and 118 is prevented.

In case that the position of the fork 117 or 118 is changed under the above state, when the grip of the fixture 119 or 120 is lifted up by a user hand, the protrusion 119a or 120a elastically supported by the spring 117a or 118a is lifted up and separated from the hole 113 or 114. When the user hand releases the fixture 119 or 120 after the change of the position of the fork 117 or 118, the protrusion 119a or 120a is lowered by the elastically supporting force of the spring 117a or 118a, is connected to the hole 113 or 114, and thus is fixed.

Figure 22:
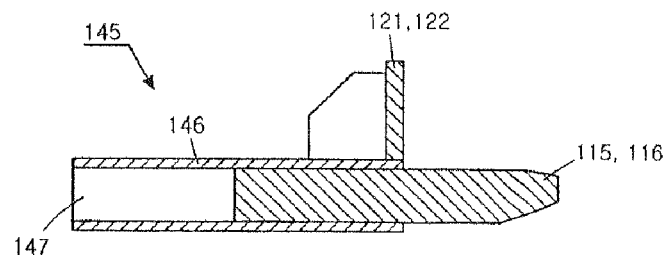
FIG. 22 is a sectional view of an auxiliary fork of the apparatus in accordance with the embodiment of the present invention.
Figure 23:
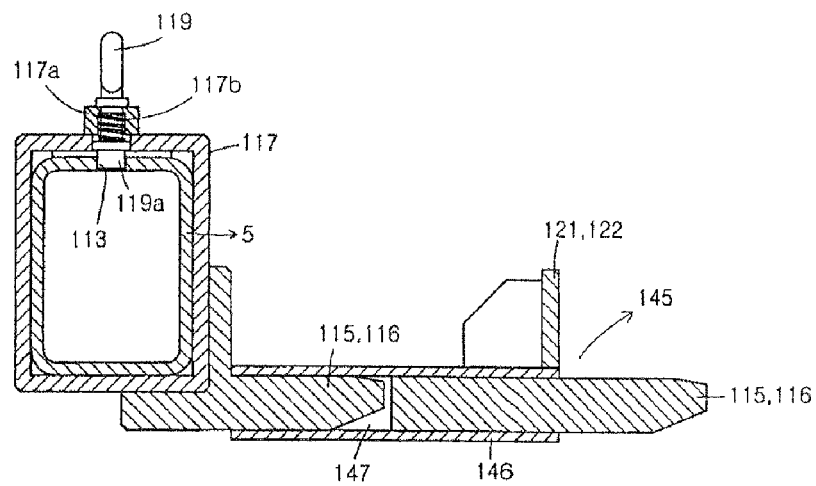
FIG. 23 is a sectional view illustrating a connection state between the fork and the auxiliary fork of the apparatus in accordance with the embodiment of the present invention.

FIG. 22 is a sectional view of an auxiliary fork 145 to extend the length of the fork 117 or 118. A connection hole 147, into which the connection part 115 or 116 of the fork 117 or 118 is inserted, is formed at the rear end of a body 146 of the auxiliary fork 145, and a connection part 115 or 116 clamped to the corresponding one of the connection holes 143a and 144a of the storage containers 143 and 144 is formed at the front end of the body 146.

In the present invention, when the seven-foot storage containers 143 and 144 having a narrower width than that of the sixteen-foot storage container 4 are used, the connection parts 115 and 116 of the forks 117 and 118 are inserted into the connection holes 147 of the auxiliary forks 145, thus achieving length compensation in clamping of the seven-foot storage containers 143 and 144.

An upward protruding stopper 121 or 122 is formed at about the center of the upper surface of the auxiliary fork 145, and prevents the connection part 115 or 116 from being excessively inserted into the connection hole 143a or 144a. That is, the stopper 121 or 122 prevents a clamping error, in which the auxiliary fork 145 is excessively inserted into the connection hole 143a or 144a.

When the fork arms 5 and 6 are raised to several cm~several tens of cm by the ascent of the ascending and descending cylinders 63 and 64 under the condition that the connection parts 115 and 116 are firmly connected to the connection holes 143a and 144a, the storage containers 143 and 144 hang in the air. Even if the transfer cart 3 moves backward and thus the storage containers 143 and 144 move backward under the above state, the movement of the storage containers 143 and 144 and the separation of the storage containers 143 and 144 from the fork arms 5 and 6 are prevented by the stoppers 121 and 122.

Further, when the rods 67 and 68 of the ascending and descending cylinders 63 and 64 are lowered under the condition that the storage containers 143 and 144 completely move backward by means of the transfer cart 3, and the storage containers 143 and 144 are placed on the ground by the descent of the transfer cart 3 and the fork arms 5 and 6, the vertical members 74 and 75 and the fork arms 5 and 6 are spread out by the projection of the projectable and retractable cylinders 97 and 98, and thus achieve unclamping of the storage containers 143 and 144. When the fork arms 5 and 6 are raised to designated positions or the initial positions by the ascent of the rods 67 and 68 of the ascending and descending cylinders and 64 under the condition that the unclamping of the storage containers 143 and 144 is achieved, the transfer cart 3 moves forward and the fork arms 5 and 6 also move forward. When the forward movement of the fork arms 5 and 6 is completed, the fork arms 5 and 6 and the forks 117 and 118 move to a position under the holding frames 36 and 37 by the retraction of the projectable and retractable cylinders 97 and 98, and thus the movement of the fork arms 5 and 6 and the forks 117 and 118 is prevented.

The holding frames 36 and 37, on which the storage container 4 is placed, are installed at both sides of the upper surface of the loading table 2 in the longitudinal direction. Binding units, each of which includes a ratchet 155, a wire 6, and a hook 154, are installed at plural regions of the frame f, and firmly bind the storage container 4 or the storage containers 143 and 144 placed on the holding frames 36 and 37, thus preventing the storage container 4 or the storage containers 143 and 144 from moving during transportation or traveling of the vehicle.

The leveling supports 11 and 12 are projected and retracted by cylinders 9 and 10 to stably support the rear end of the loading table 2, and thus keep the level of the loading table 2. Props 13 and 14 having large dimensions to allow the leveling supports 11 and 12 to be tilted at a designated angle are respectively installed at the lower ends of the leveling supports 11 and 12 by connection pins.

When a storage container is loaded or unloaded, the props 13 and 14 are lowered by the operation of the cylinders 9 and 10, contact the ground, lift up the rear part of the loading table 2, and thus stably support the rear part of the loading table 2. When the vehicle t travels, the props 13 and 14 are raised by the reverse operation of the cylinders 9 and 10.

Figure 34:
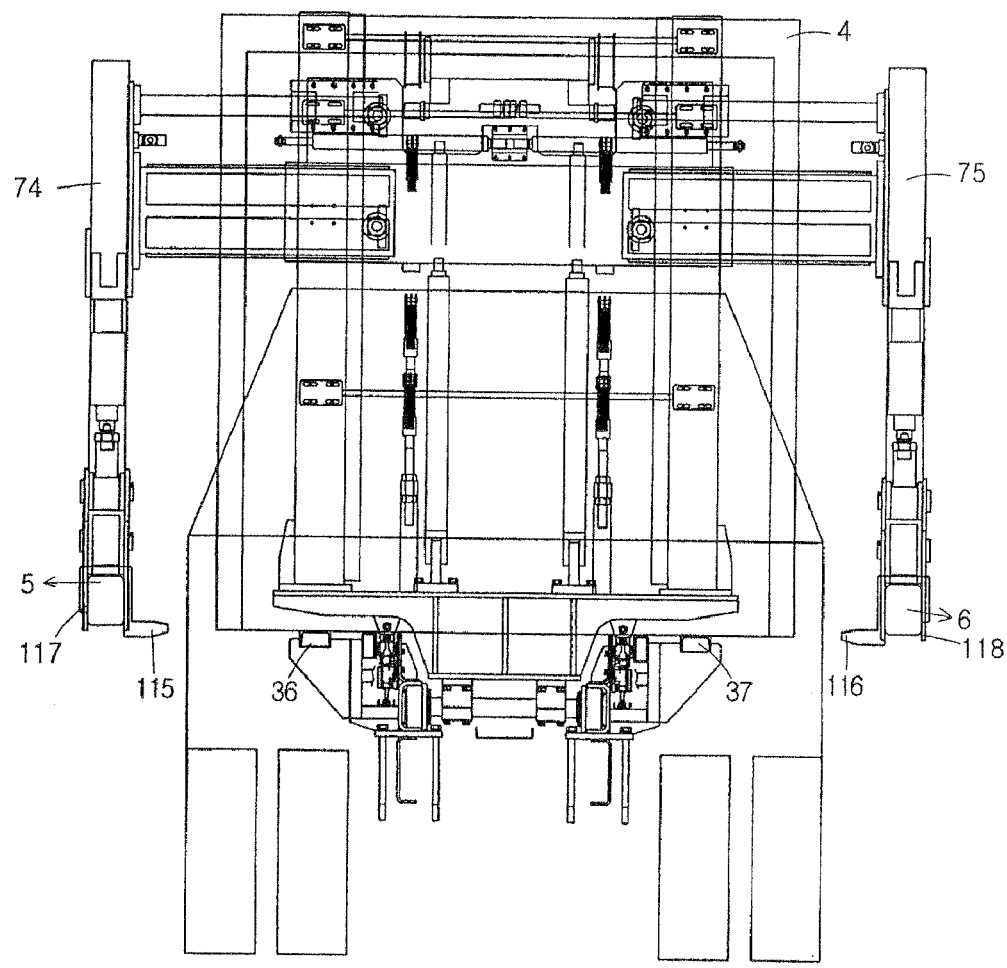
FIG. 34 is a rear view of the apparatus in accordance with the embodiment of the present invention in a state in which the fork arms are spread out to both sides.
Figure 35:
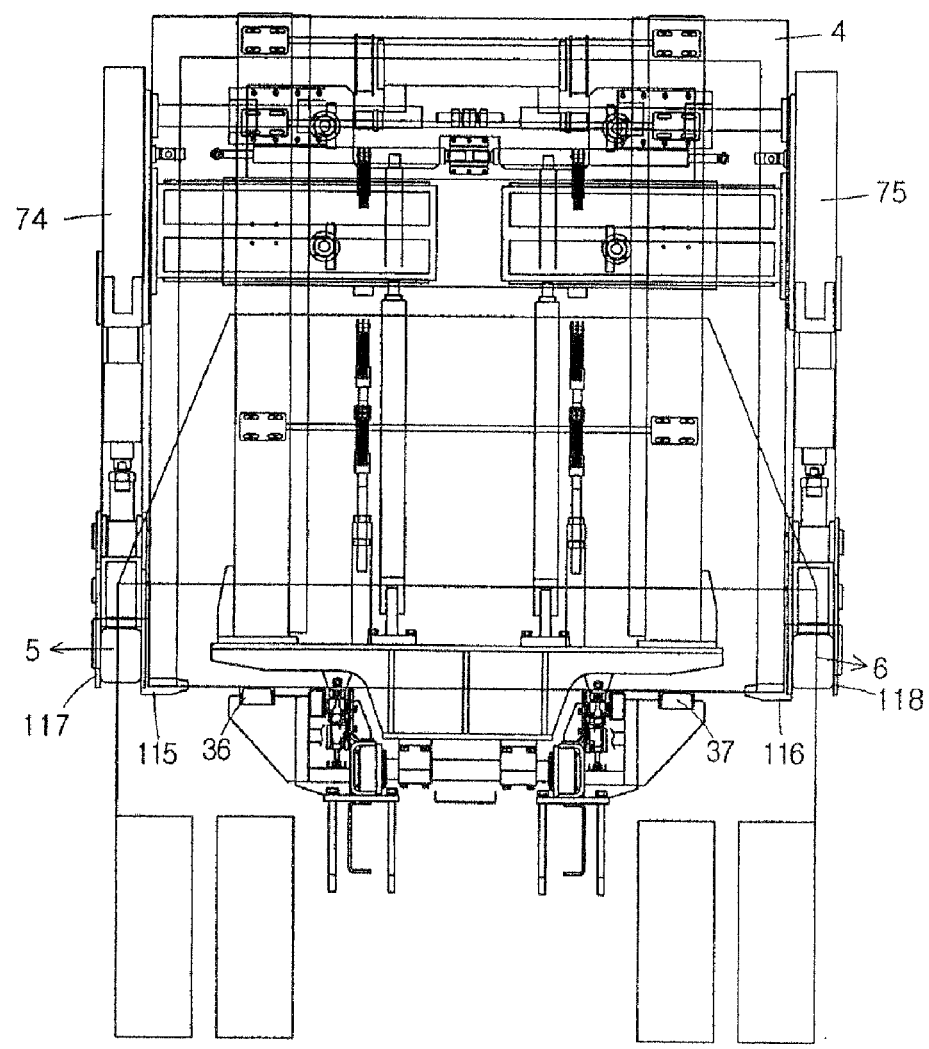
FIG. 35 is a rear view of the apparatus in accordance with the embodiment of the present invention in a state in which the fork arms are raised and are connected with the storage container.

FIG. 33 illustrates the apparatus in accordance with the embodiment of the present invention in an initial state in which the fork arms 5 and 6 are located within a vehicle width, FIG. 34 illustrates the apparatus in accordance with the embodiment of the present invention in a state in which the fork arms 5 and 6 are spread out, and FIG. 35 illustrates the apparatus in accordance with the embodiment of the present invention in a state in which the fork arms 5 and 6 are raised and clamp the storage container 4.

Figure 36:
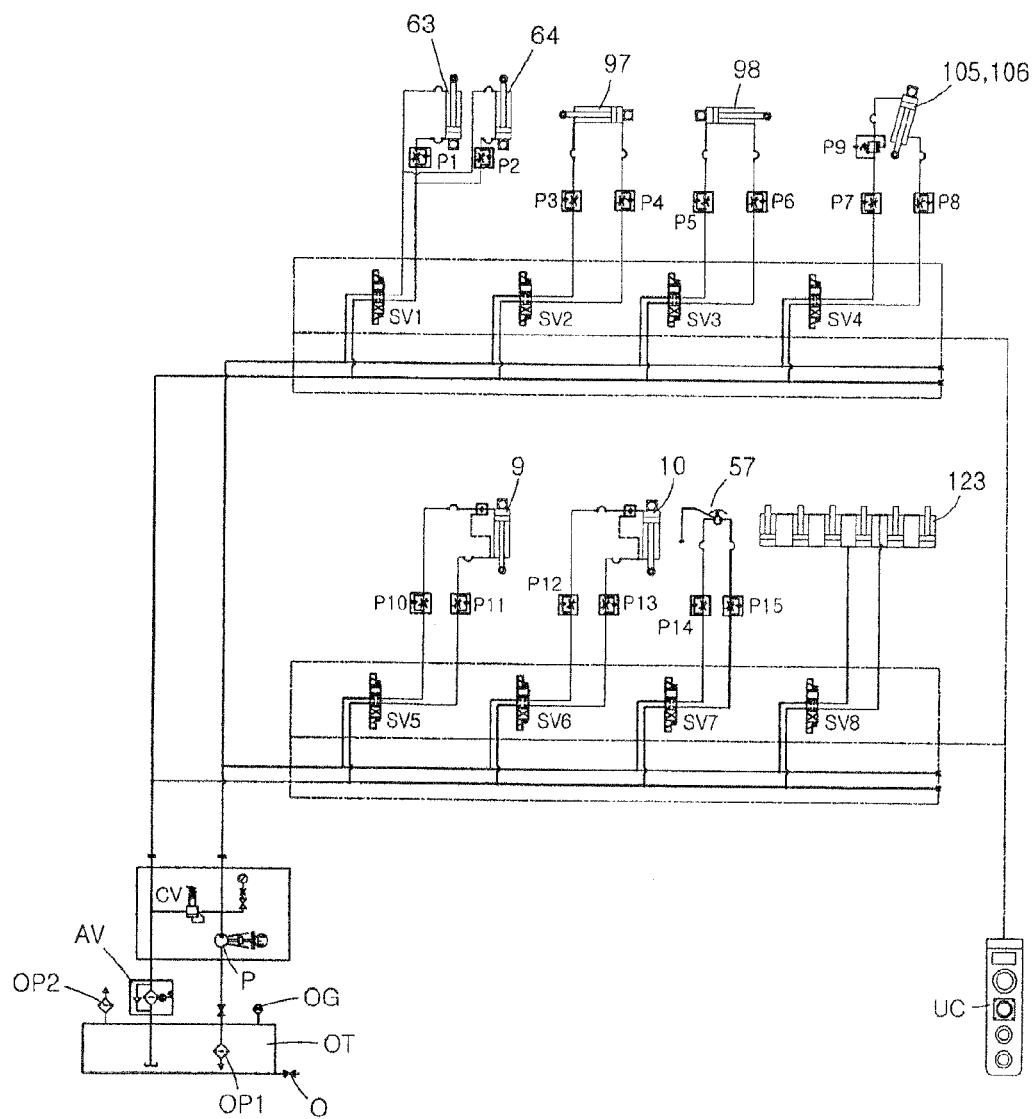
FIG. 36 is a hydraulic circuit diagram of the apparatus in accordance with the embodiment of the present invention.

FIG. 36 is a hydraulic circuit diagram of the apparatus in accordance with the embodiment of the present invention. In FIG. 36, a suction filter OP1, a hydraulic pump P driven by a separate engine (not shown) or an engine mounted in the vehicle t, a plurality of solenoid valves SV1~SV8, and cylinders and a hydraulic motor 57 respectively connected to the solenoid valves SV1~SV8 are connected to an oil supply line installed at an oil tank 35.

A relief valve AV adjusting the overall pressure, a check valve CV, the plurality of the solenoid valves SV1~SV8, and the cylinders and the hydraulic motor 57 respectively connected to the solenoid valves SV1~SV8 are connected to an oil discharge line installed at the oil tank 35. The solenoid valves SV1~SV8 are manipulated and controlled by the controller of the control panel 34 or a wired remote controller UC connected to the controller.

Flow control valves P1 and P2 are connected to the oil supply line of the solenoid valve SV1, oil supply holes of the ascending and descending cylinders 63 and 64 are respectively connected to the flow control valves P1 and P2, and oil discharge holes of the ascending and descending cylinders 63 and 64 are respectively connected to the oil discharge line of the solenoid valve SV1.

A flow control valve P4 is connected to the oil supply line of the solenoid valve SV2, an oil supply hole of the projectable and retractable cylinder 97 is connected to the flow control valve P4, a flow control valve P3 is connected to the oil discharge line of the solenoid valve SV2, and an oil discharge hole of the projectable and retractable cylinder 97 is connected to the flow control valve P3.

A flow control valve P6 is connected to the oil supply line of the solenoid valve SV3, an oil supply hole of the projectable and retractable cylinder 98 is connected to the flow control valve P6, a flow control valve P5 is connected to the oil discharge line of the solenoid valve SV3, and an oil discharge hole of the projectable and retractable cylinder 98 is connected to the flow control valve P5.

A flow control valve P8 is connected to the oil supply line of the solenoid valve SV4, oil supply holes of the tilting cylinders 105 and 106 are connected to the flow control valve P8, a flow control valve P7 is connected to the oil discharge line of the solenoid valve SV4, a count balancing valve P9 is connected to the flow control valve P7, and oil discharge holes of the tilting cylinders 105 and 106 are connected to the count balancing valve P9.

Back pressure is applied to the count balancing valve P9 connected to the tilting cylinders 105 and 106, and thus prevents the fork arms 5 and 6 from falling due to their own weight.

A flow control valve P11 is connected to the oil supply line of the solenoid valve SV5, an oil supply hole of the cylinder 9 of the leveling support 11 is connected to the flow control valve P11, a flow control valve P10 is connected to the oil discharge line of the solenoid valve SV5, and an oil discharge hole of the cylinder 9 of the leveling support 11 is connected to the flow control valve P10.

A flow control valve P13 is connected to the oil supply line of the solenoid valve SV6, an oil supply hole of the cylinder 10 of the leveling support 12 is connected to the flow control valve P13, a flow control valve P12 is connected to the oil discharge line of the solenoid valve SV6, and an oil discharge hole of the cylinder 10 of the leveling support 12 is connected to the flow control valve P12.

A flow control valve P15 is connected to the oil supply line of the solenoid valve SV7, an oil supply hole of the hydraulic motor 57 is connected to the flow control valve P15, a flow control valve P14 is connected to the oil discharge line of the solenoid valve SV7, and an oil discharge hole of the hydraulic motor 57 is connected to the flow control valve P14.

Oil supply holes of the plural ascending and descending cylinders 123 to raise and lower the chain rails 41 and 42 are connected to the oil supply line of the solenoid valve SV8, and oil discharge holes of the plural ascending and descending cylinders 123 are connected to the oil discharge line of the solenoid valve SV8.

As a separate engine to drive the hydraulic pump P, an engine using fossil fuels, such as a gasoline engine, or an electric motor may be used. An oil gauge OG to display the amount of oil, an air bleed filter OP2 installed at an oil supply hole, and a drain valve O are disposed around the oil tank 35.

The wired remote controller UC to operate the solenoid valves SV1~SV8 is configured and designed such that a worker can conveniently manipulate the wired remote controller UC by hand, and is detachably attached to the control panel 34.

FIGS. 37 to 41 illustrate a process of unloading one storage container, for example, the sixteen-foot storage container 4.

FIG. 37 is a side view of the apparatus in accordance with the embodiment of the present invention in a state in which one sixteen-foot storage container 4 is loaded into the vehicle t. In this state, the fork arms 5 and 6 are lowered to the initial positions, the binding of the storage container is released to unload the storage container 4, and the leveling supports 11 and 12 are lowered to keep the level of the vehicle t.

Figure 38:
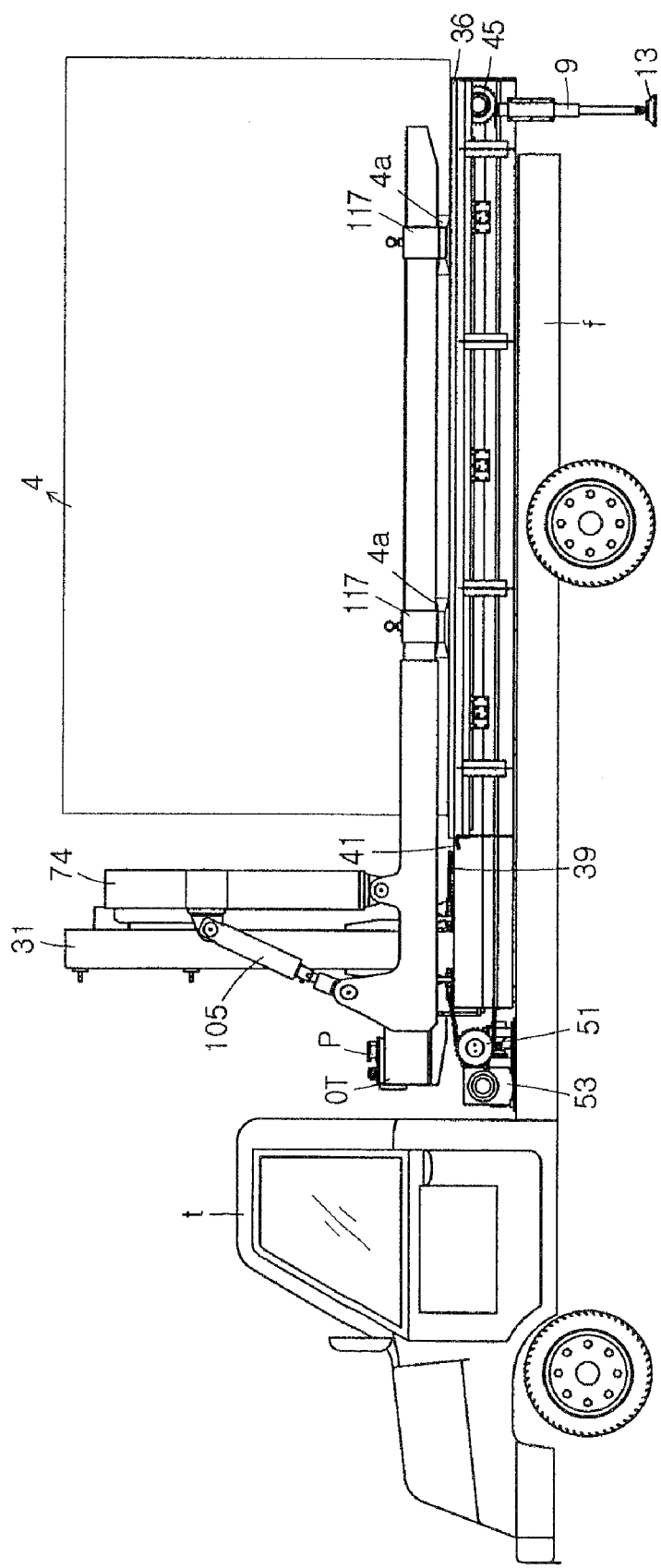
FIG. 38 is a side view of the apparatus in accordance with the embodiment of the present invention in a state in which the fork arms are raised and thus clamp a storage container.
Figure 39:
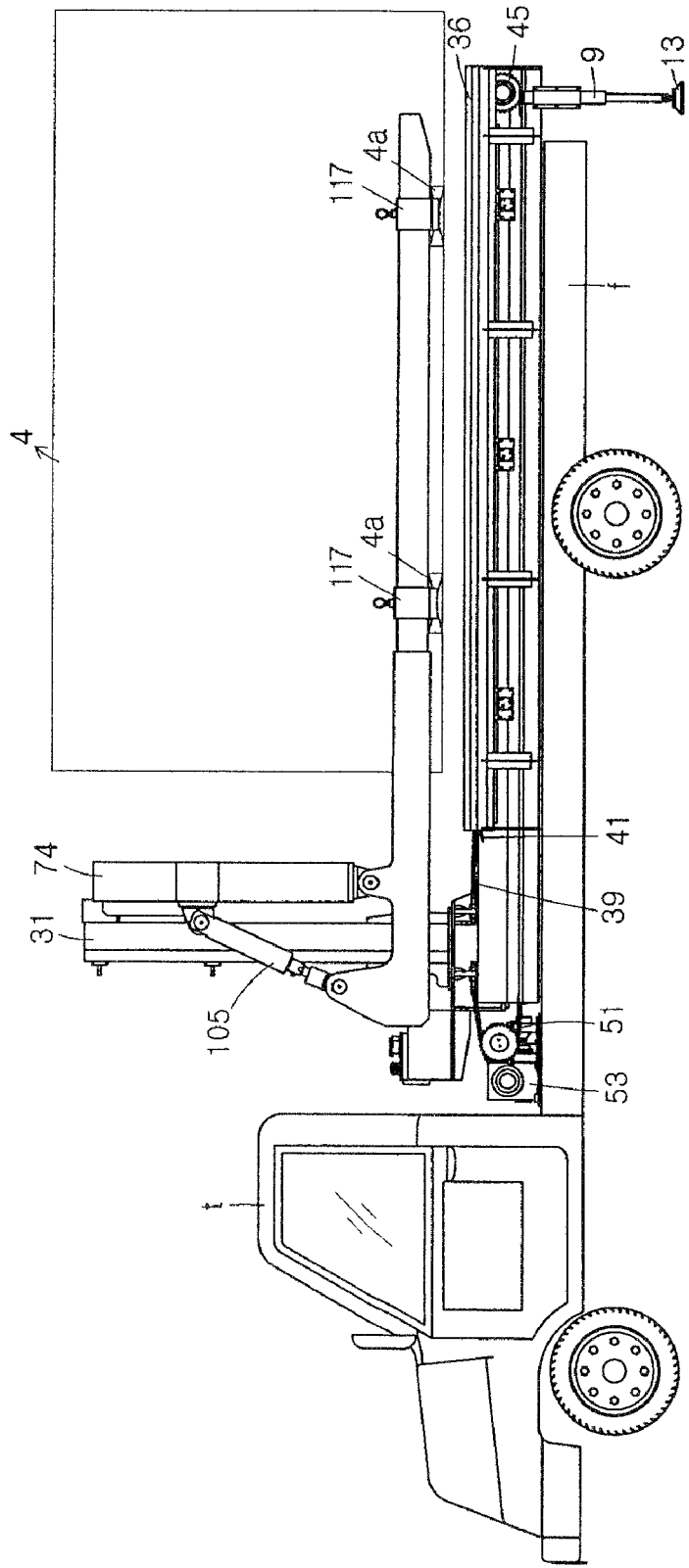
FIG. 39 is a side view of the apparatus in accordance with the embodiment of the present invention in a state in which the fork arms are raised and thus raise the clamped storage container.
Figure 40:
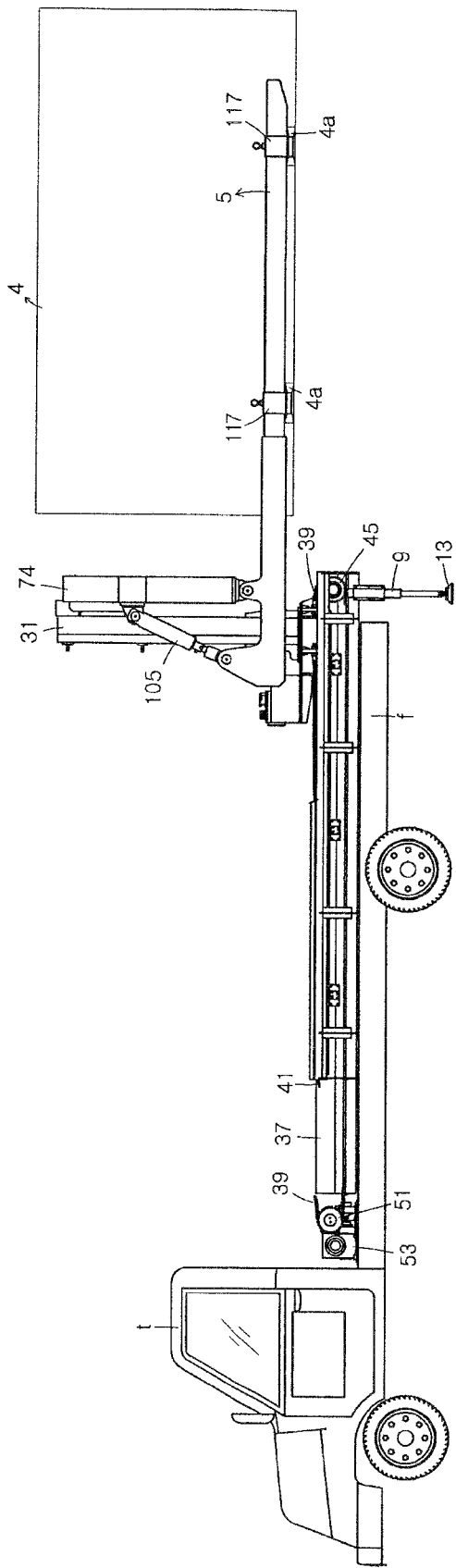
FIG. 40 is a side view of the apparatus in accordance with the embodiment of the present invention in a state in which the fork arms move backward and thus move the clamped storage container backward.
Figure 41:
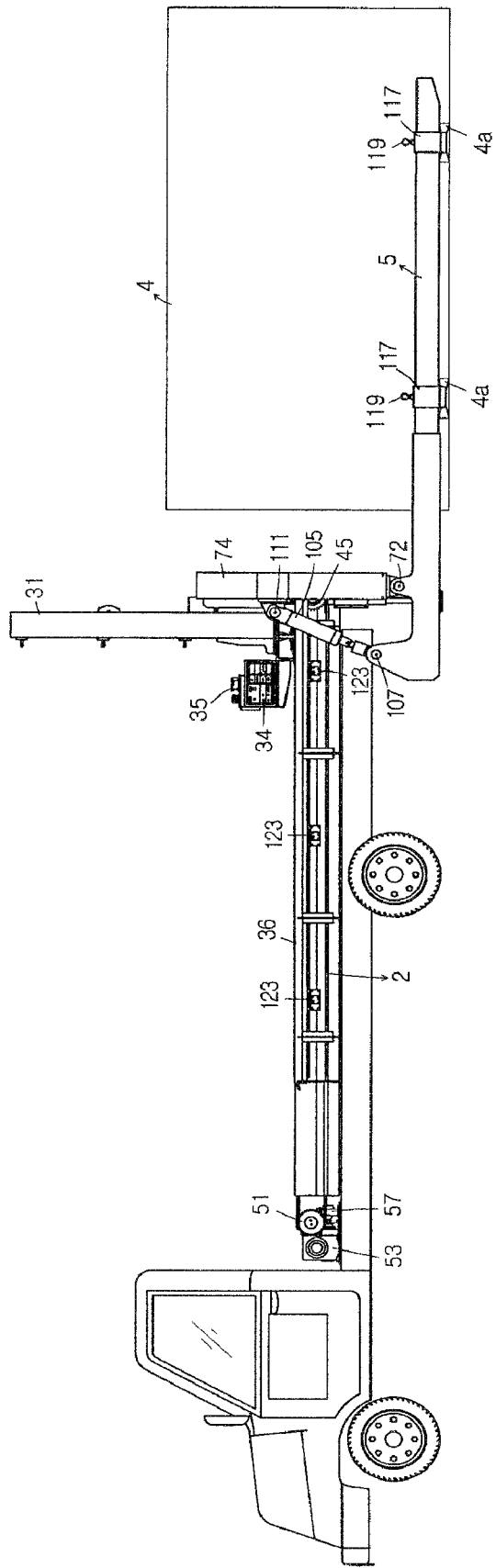
FIG. 41 is a side view of the apparatus in accordance with the embodiment of the present invention in a state in which the fork arms are lowered and thus place the storage container on the ground.

FIG. 38 illustrates the apparatus in accordance with the embodiment of the present invention in a state in which the fork arms 5 and 6 are raised to clamping positions and thus clamp the storage container 4 placed on the holding frames 36 and 37, and FIG. 39 illustrates the apparatus in accordance with the embodiment of the present invention in a state in which the fork arms 5 and 6 are raised and thus raise the clamped storage container 4 (the storage container 4 being separated from the holding frames 36 and 37). FIG. 40 illustrates the apparatus in accordance with the embodiment of the present invention in a state in which the fork arms 5 and 6 move backward and thus the storage container 4 hangs in the air. Under the above state, the fork arms 5 and 6 are lowered, and thus safely place the storage container 4 on the ground, as shown in FIG. 41.

When the placement of the storage container 4 on the ground is completed, the fork arms 5 and 6 are spread out and thus release the clamped state of the storage container 4. Under this state, the fork arms 5 and 6 are raised and move forward, as shown in FIG. 6, and then are lowered to the initial positions, as shown in FIG. 4, thereby completing unloading of the storage container 4. Loading of the storage container 4 is carried out in reverse order, and the loaded storage container 4 is firmly bound to the vehicle t by the binding units of FIG. 24.

Figure 24:
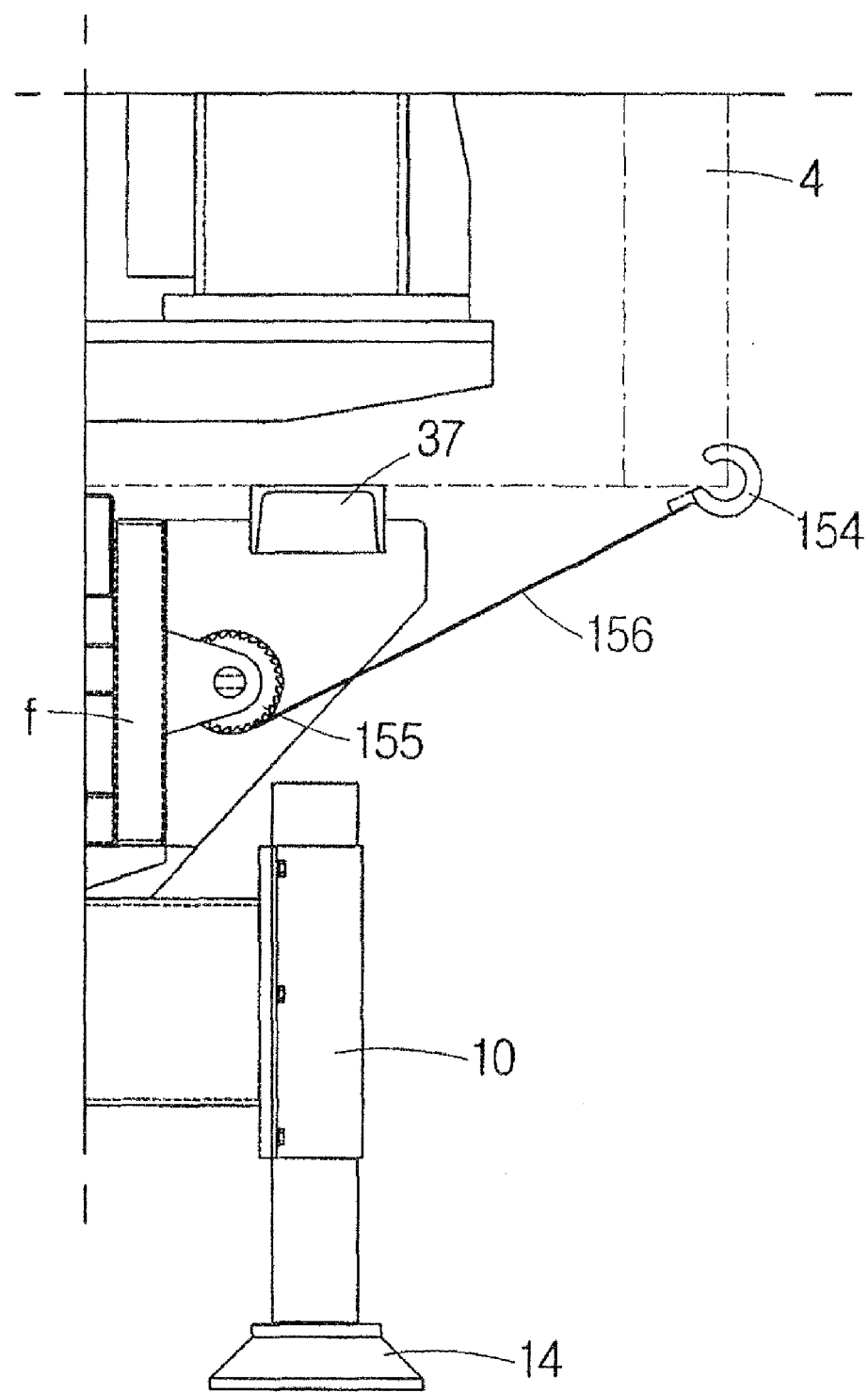
FIG. 24 is a sectional view illustrating a bound state of the storage container of the apparatus in accordance with the embodiment of the present invention.
Figure 25:
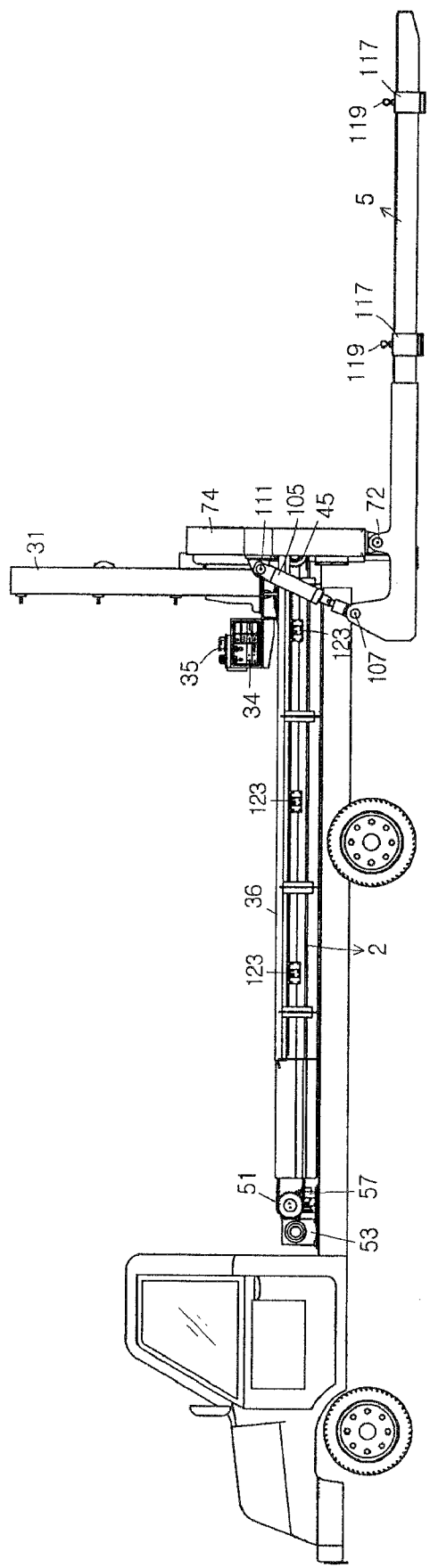
FIG. 25 is a side view of the apparatus in accordance with the embodiment of the present invention, illustrating a state in which the fork arms move backward and are lowered.
Figure 26:
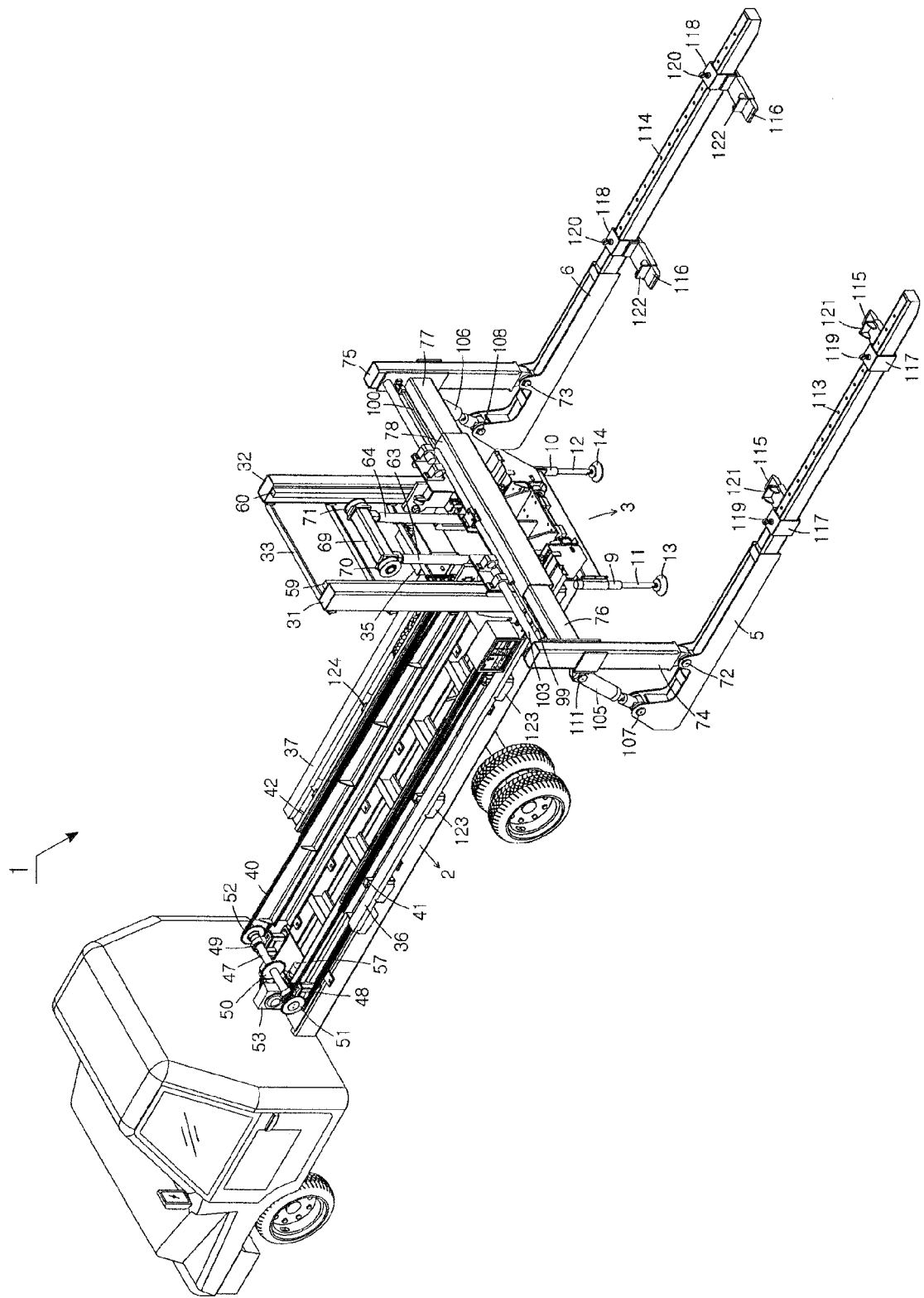
FIG. 26 is a perspective view of FIG. 25, illustrating a state in which the auxiliary forks are respectively connected to the front ends of the forks.
Figure 27:
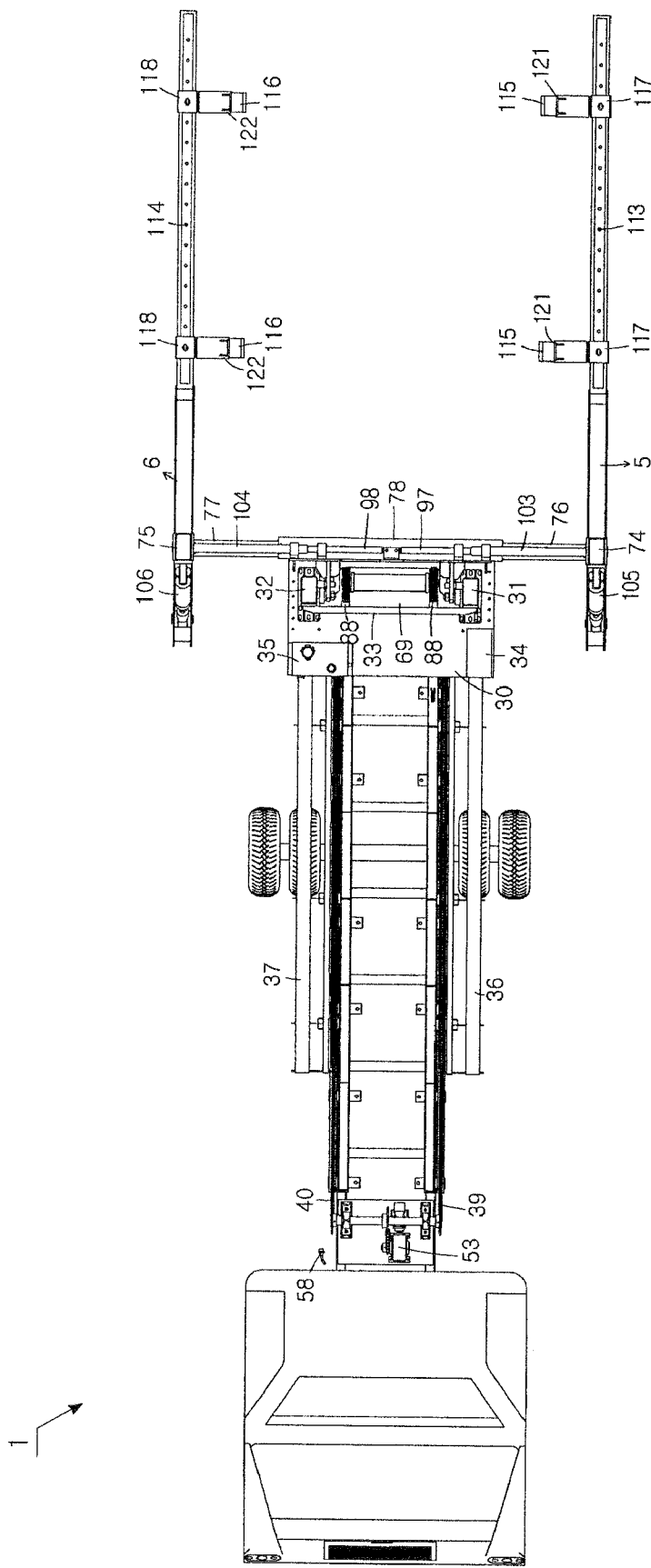
FIG. 27 is a plan view of FIG. 25.
Figure 28:
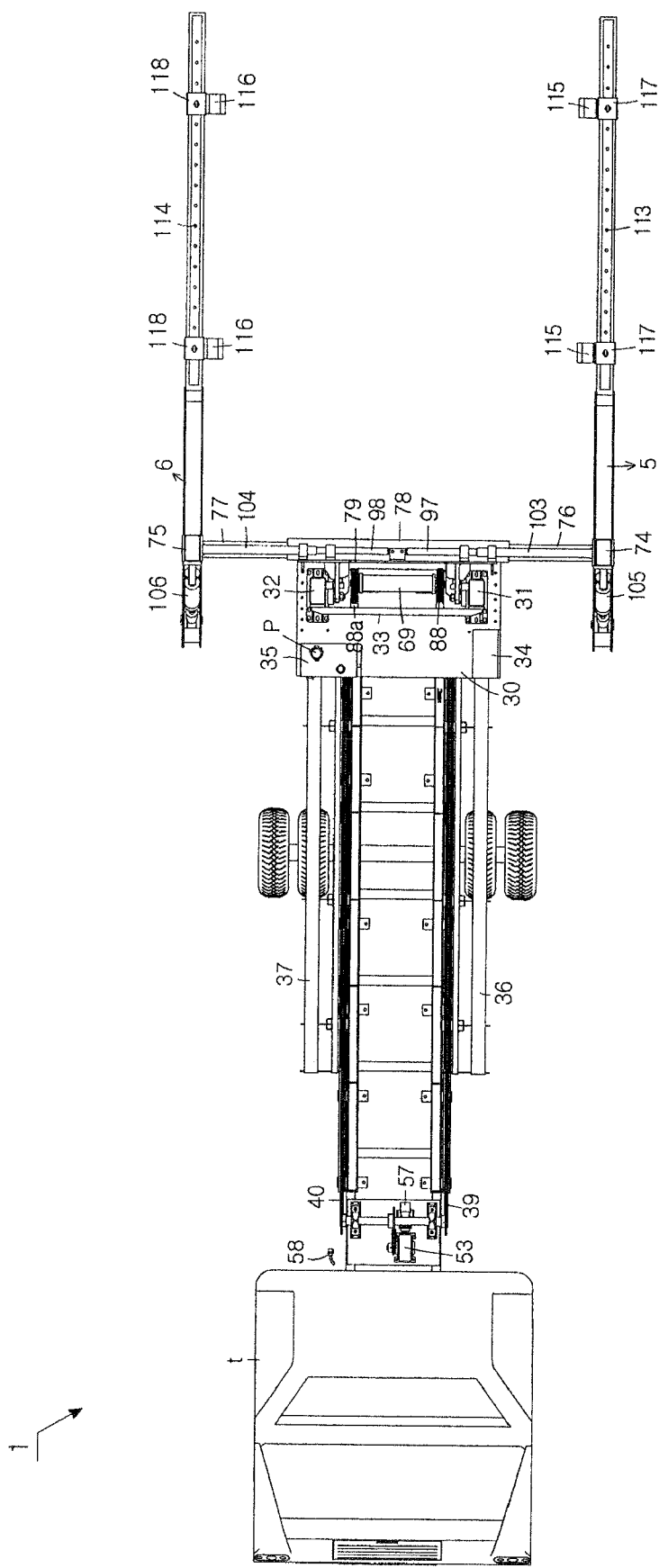
FIG. 28 is a plan view of the apparatus of FIG. 27, in a state in which the auxiliary forks are removed.
Figure 42:
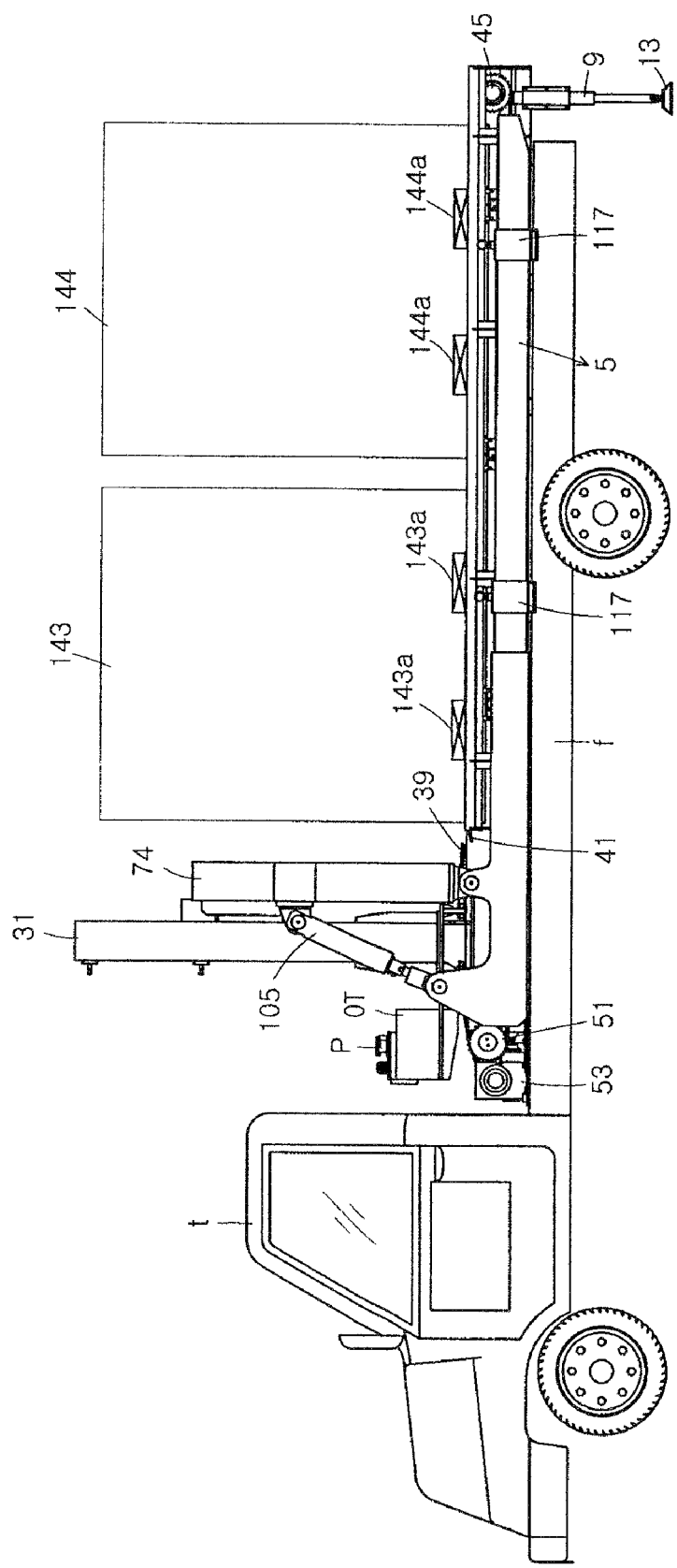
FIG. 42 is a side view of the apparatus in accordance with the embodiment of the present invention in a loaded state with first and second seven-foot storage containers (two storage containers)

FIG. 42 illustrates the apparatus in accordance with the embodiment of the present invention in a state in which two seven-foot storage containers, for example, the first storage container 143 and the second storage container 144, are loaded on the holding frames 36 and 37. The first and second storage containers 143 and 144 are firmly fixed to the vehicle t by fixing the hooks 154 of the binding units installed on the frame f, as shown in FIG. 24, to the connection holes 143a and 144a of the first and second storage containers 143 and 144. Even if the vehicle t transports the first and second storage containers 143 and 144 in the above state to a designated position, the movement of the first and second storage container 143 and 144 or the separation of the first and second storage container 143 and 144 from the vehicle t is prevented.

In the binding units, the wires 156 are respectively wound on the ratchets 155 installed on the frame f, and the hooks 154 are respectively fixed to the tips of the wires 156. When the binding units are not in use, the wires 156 are respectively wound on the ratchets 155, and when the binding units are used, the wires 156 are respectively unwound from the ratchet 155 to a designated length.

The hooks 154 of the binding units may be fixed to other fixing parts of the first and second storage containers 143 and 144 as well as the connection holes 143a and 144a.

In order to unload the first and second storage containers 143 and 144, the leveling supports 11 and 12 are protruded downward and are supported by the ground to keep the level of the loading table 2, the binding of the first and second storage containers 143 and 144 with the binding units is released, and then the first and second storage containers 143 and 144 are unloaded.

Of course, the order of the operation may be changed. Further, the leveling supports 11 and 12 may be operated simultaneously or individually, and be properly protruded according to the slope of the ground to keep the level of the loading table 2.

FIGS. 42 to 50 illustrate a process of unloading two small-sized storage containers, for example, two seven-foot storage containers 143 and 144.

FIG. 42 is a side view of the apparatus in accordance with the embodiment of the present invention in a state in which the first and second storage containers 143 and 144 are loaded into the vehicle t. In this state, the fork arms 5 and 6 are lowered to the initial positions, and the binding of the first and second storage containers 143 and 144 is released to unload the first and second storage containers 143 and 144.

Figure 11:
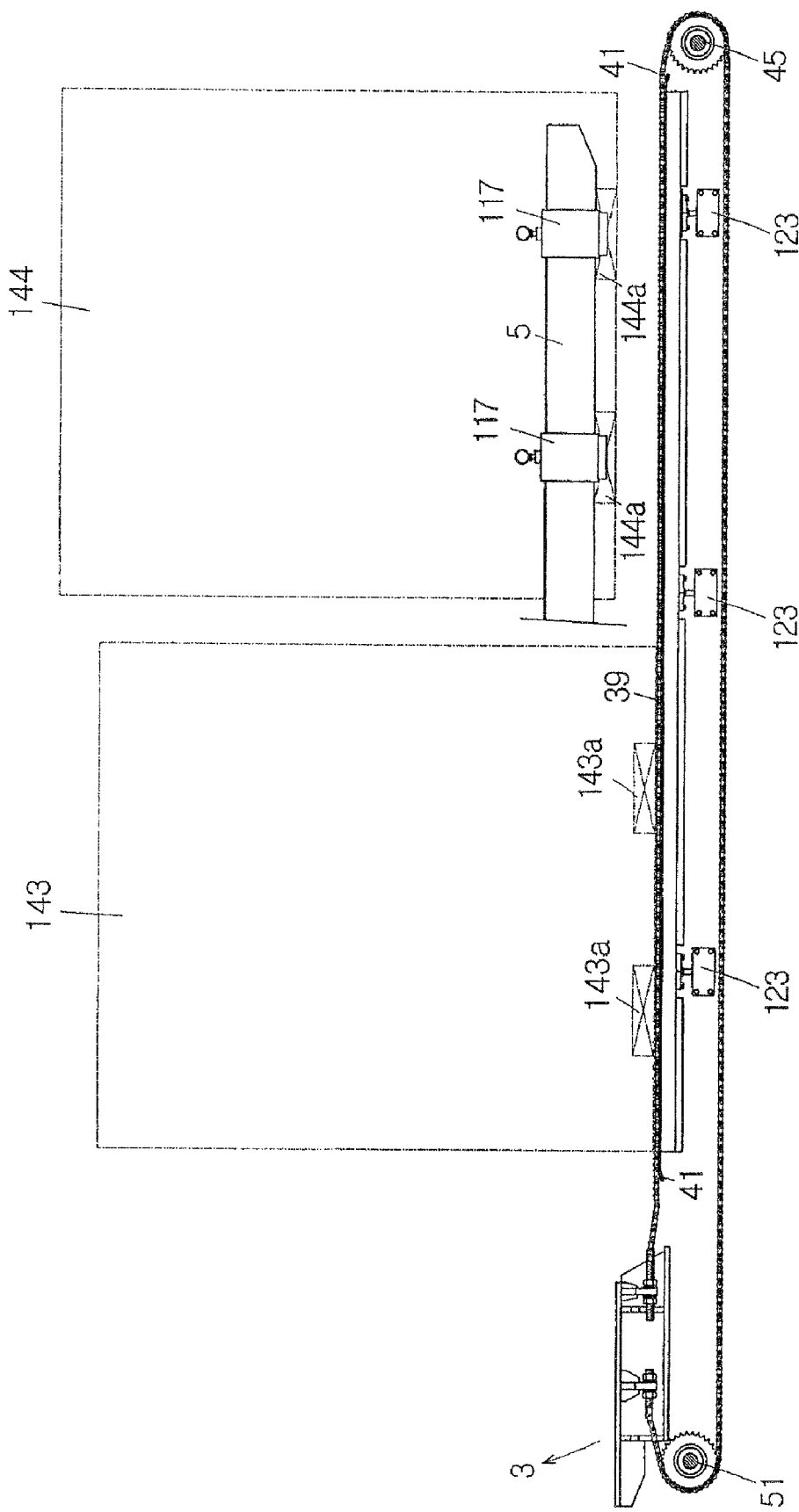
FIG. 11 is a side view illustrating an ascending state of the chains of the apparatus in accordance with the embodiment of the present invention.
Figure 43:
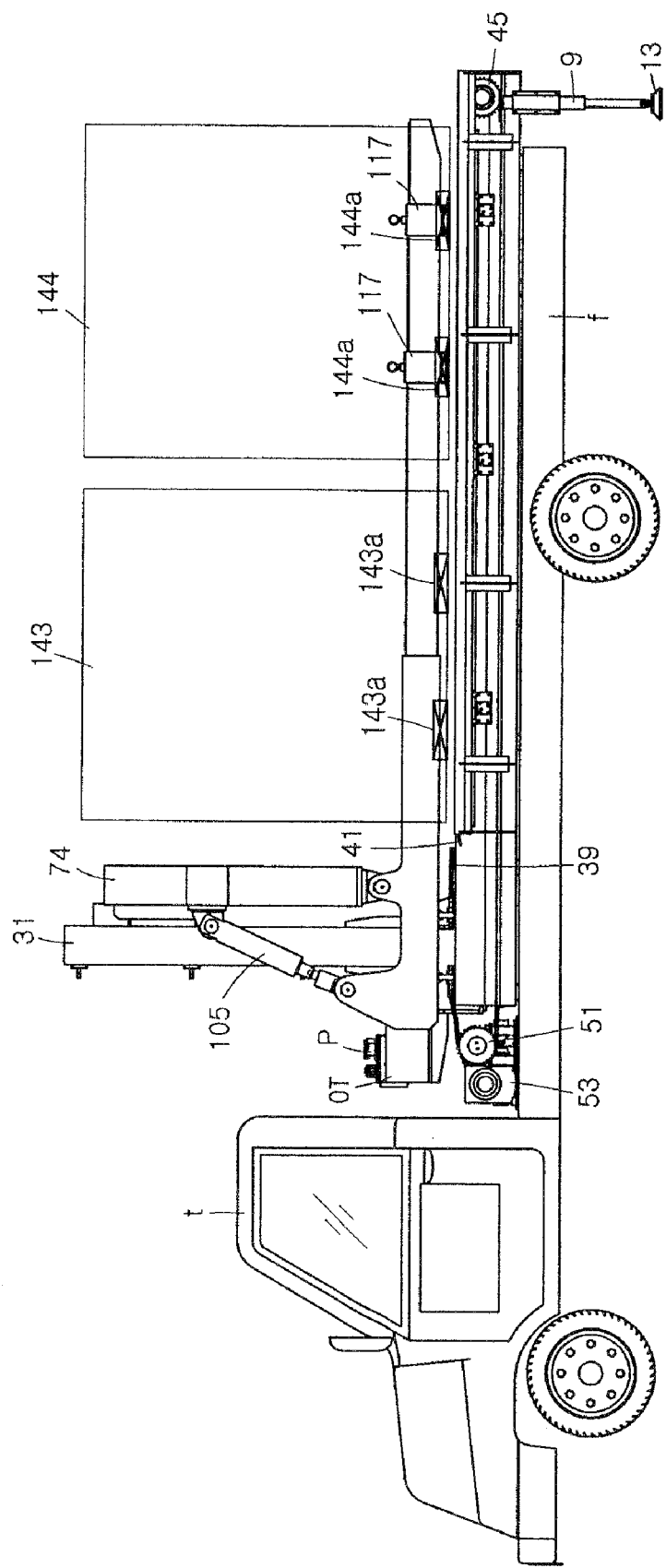
FIG. 43 is a side view of the apparatus in accordance with the embodiment of the present invention in a state in which the fork arms are raised and thus clamp the second storage container.
Figure 44:
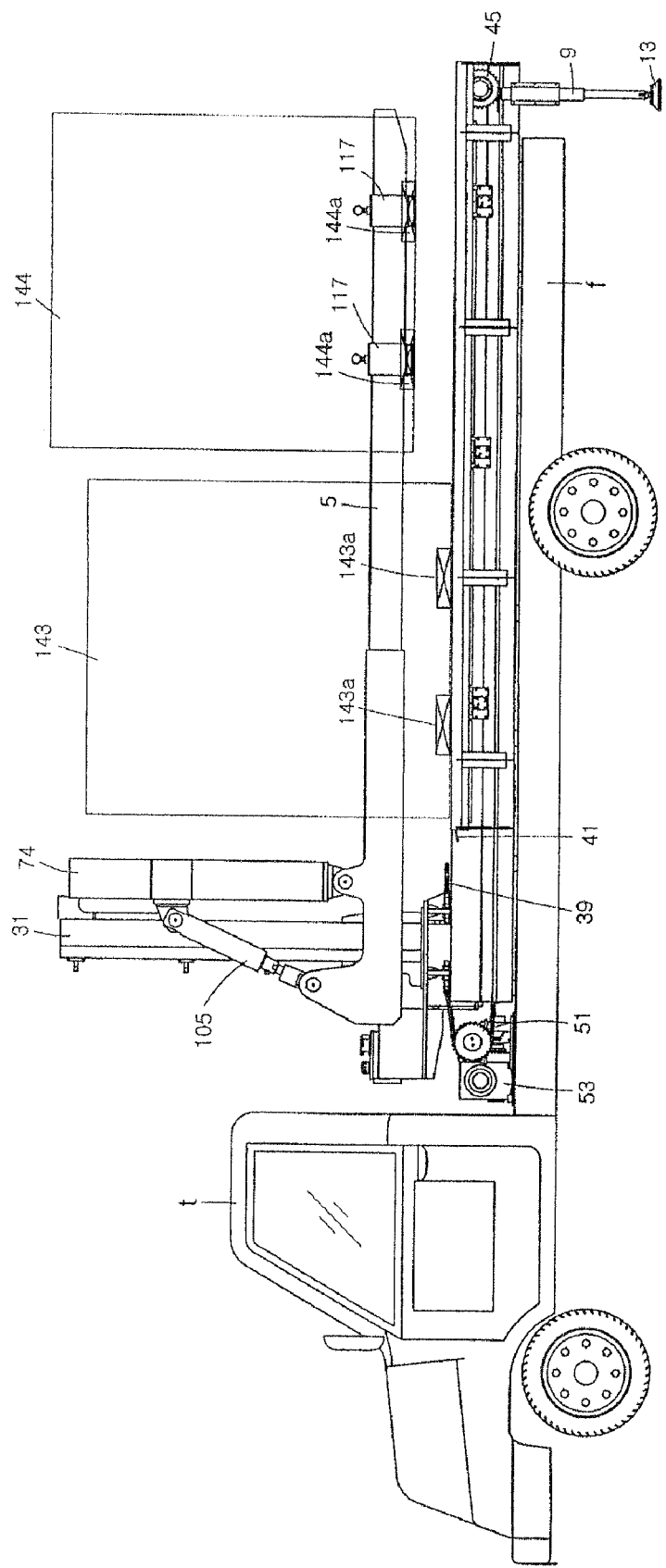
FIG. 44 is a side view of the apparatus in accordance with the embodiment of the present invention in a state in which the fork arms are raised and thus raise the clamped second storage container.
Figure 45:
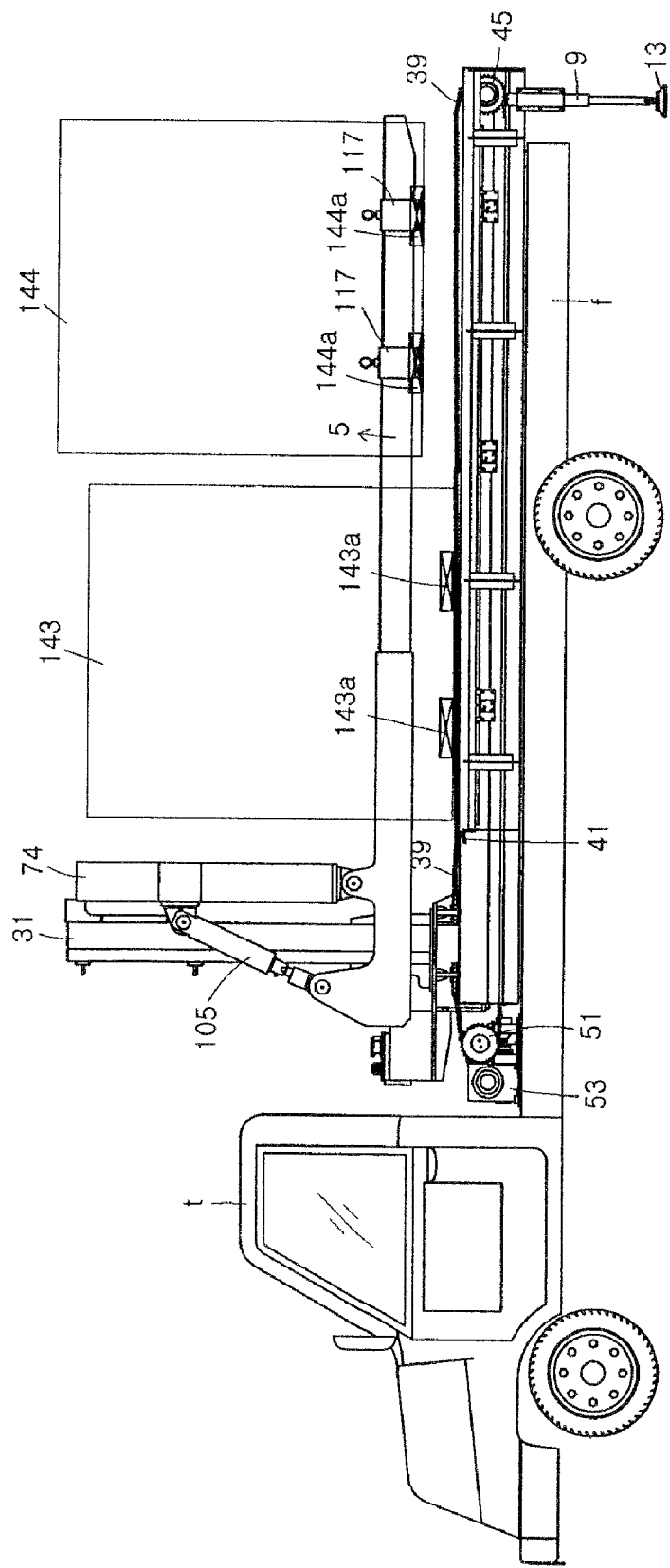
FIG. 45 is a side view of the apparatus in accordance with the embodiment of the present invention in a state in which the chains are raised and thus raise the first storage container.

FIG. 43 illustrates the apparatus in accordance with the embodiment of the present invention in a state in which the fork arms 5 and 6 are raised to clamping positions and thus clamp the second storage container 144 located at the rear end of the loading table 2, and FIG. 44 illustrates the apparatus in accordance with the embodiment of the present invention in a state in which the fork arms 5 and 6 are raised and thus raise the clamped second storage container 144. Further, FIGS. 11, 12, and 45 illustrate the apparatus in accordance with the embodiment of the present invention in a state in which the chains 39 and 40 are raised by the ascent of the ascending and descending cylinders 123, and thus raise the first storage container 143 from the holding frames 36 and 37 to separate the first storage container 143 from the holding frames 36 and 37. In this state, although the first and second storage containers 143 and 144 are raised to different heights, both the first and second storage containers 143 and 144 are separated from the holding frames 36 and 37 so as to move.

Figure 46:
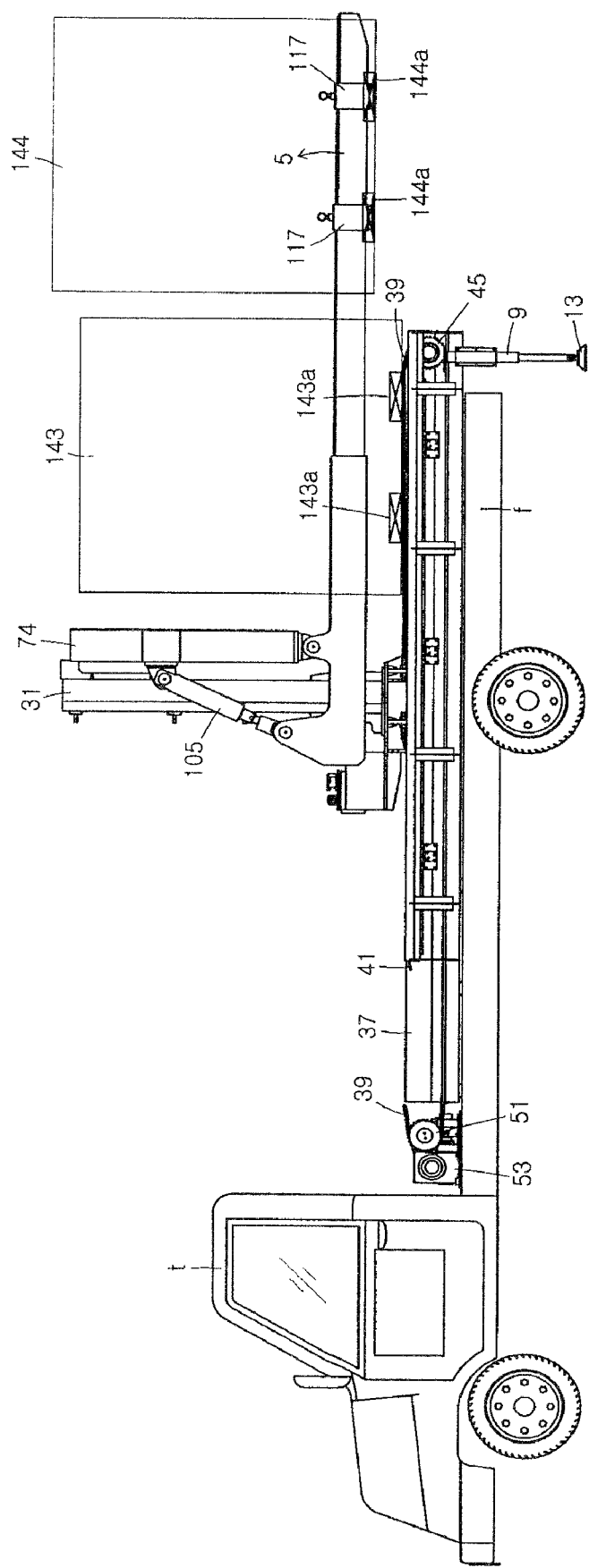
FIG. 46 is a side view of the apparatus in accordance with the embodiment of the present invention in a state in which the fork arms move backward by about half of the length of the fork arms and the first storage container moves backward by about half of the length of the fork arms by the raised chains in order to firstly unload the second storage container.
Figure 47:
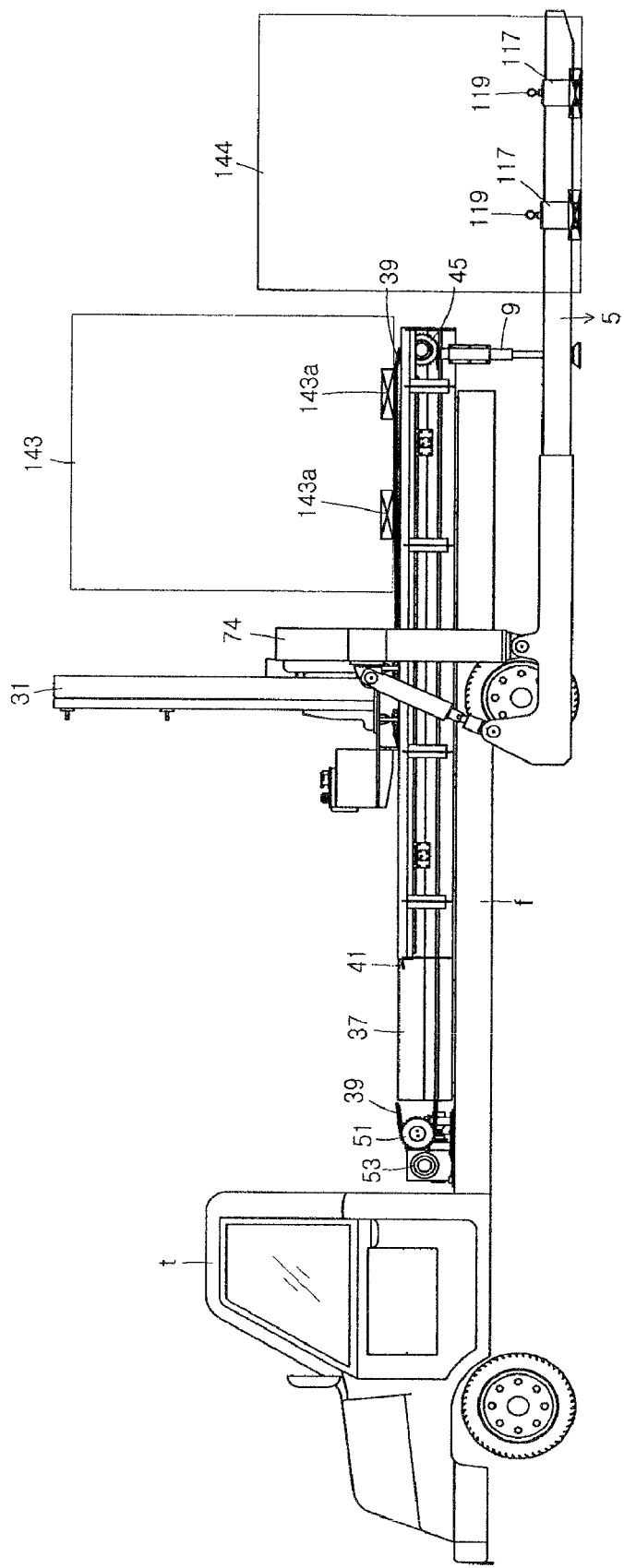
FIG. 47 is a side view of the apparatus in accordance with the embodiment of the present invention in a state in which the first storage container is placed on the chains, and the fork arms are lowered and thus place the second storage container on the ground.

In the above state in which the first and second storage containers 143 and 144 are respectively raised, in order to firstly unload the second storage container 144, the fork arms 5 and 6 move backward by about half of the length of the fork arms 5 and 6, and thus the second storage container 144 is located in the air and the first storage container 143 raised by the chains 39 and 40 is located at the rear end of the loading table 2, as shown in FIG. 46. In this state, the fork arms 5 and 6 are lowered, and safely place the second storage container 144 on the ground, as shown in FIG. 47.

Figure 48:
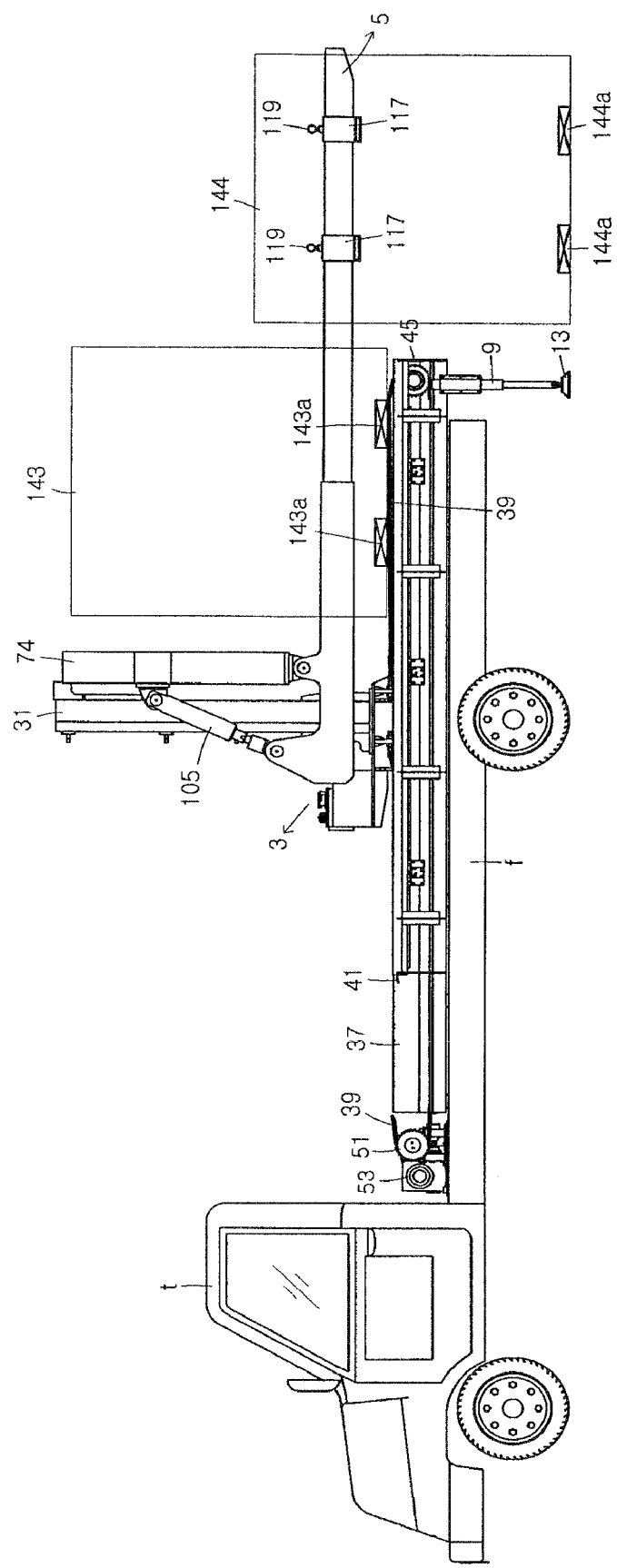
FIG. 48 is a side view of the apparatus in accordance with the embodiment of the present invention in a state in which the fork arms are raised in order to unload the first storage container.
Figure 49:
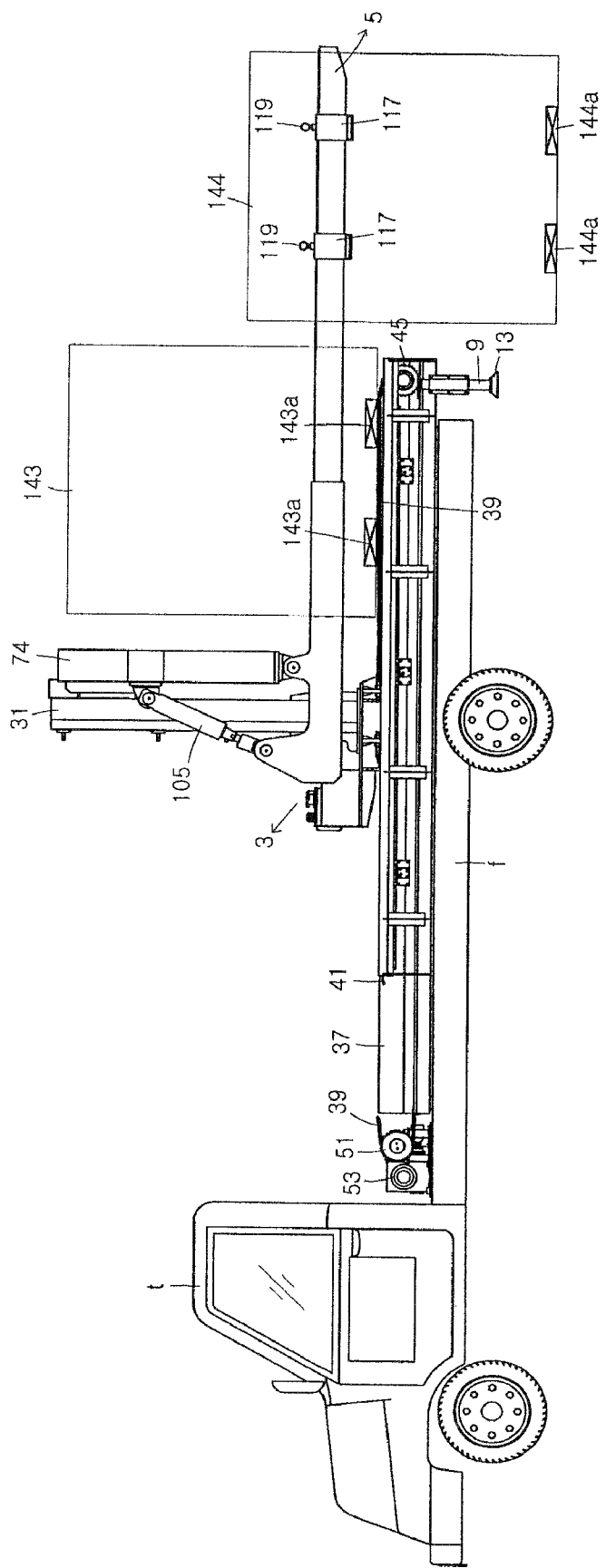
FIG. 49 is a side view of the apparatus in accordance with the embodiment of the present invention in a state in which leveling supports are raised to move a vehicle forward to secure a position for unloading the first storage container.

When the placement of the second storage container 144 on the ground is completed, the fork arms 5 and 6 are spread out, and release the clamped state of the second storage container 144. Thereafter, in order to unload the first storage container 143, the fork arms 5 and 6 are raised, as shown in FIG. 48, and in order to secure to a position for unloading the first storage container 143, the leveling supports 11 and 12 are raised and then the vehicle t moves forward, as shown in FIG. 49.

Figure 50:
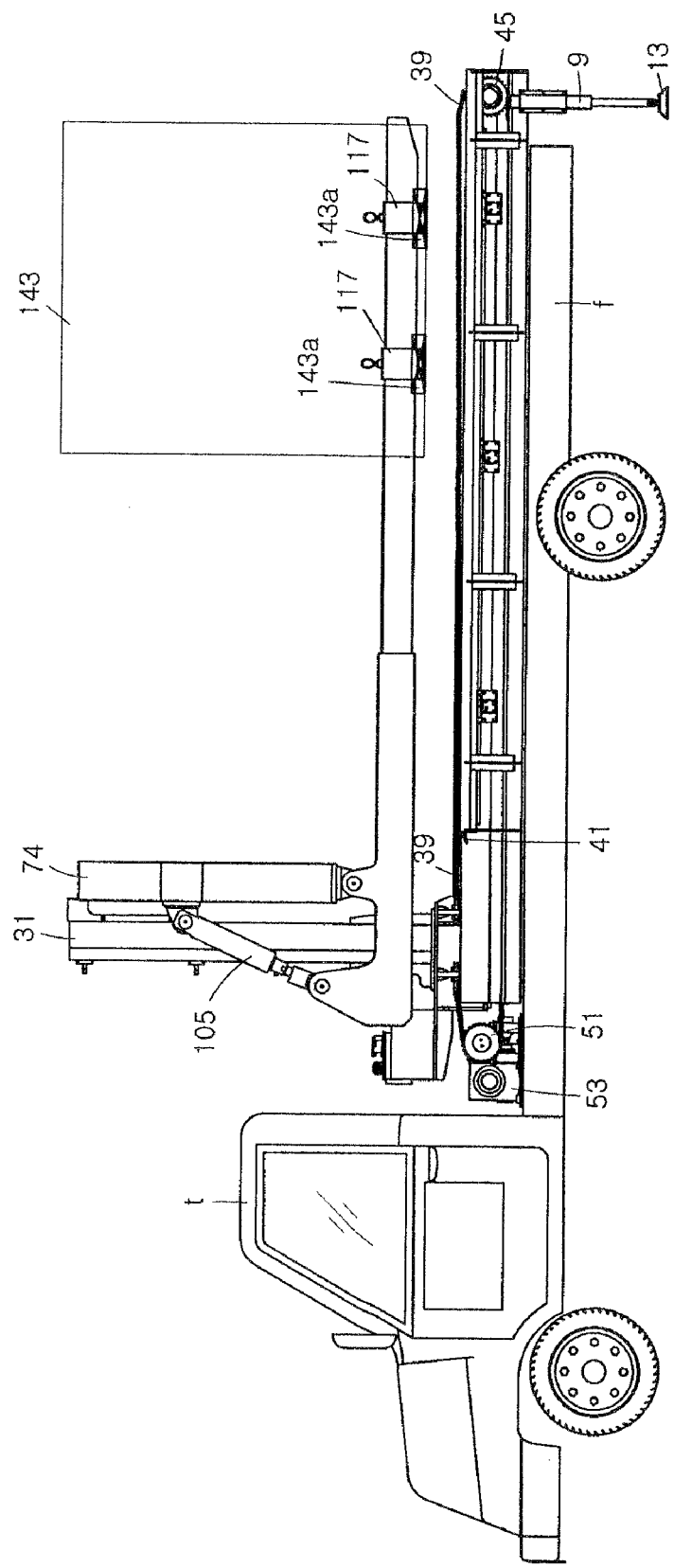
FIG. 50 is a side view of the apparatus in accordance with the embodiment of the present invention in a state in which the fork arms move forward, and thus clamp the first storage container and then raise the first storage container.
Figure 51:
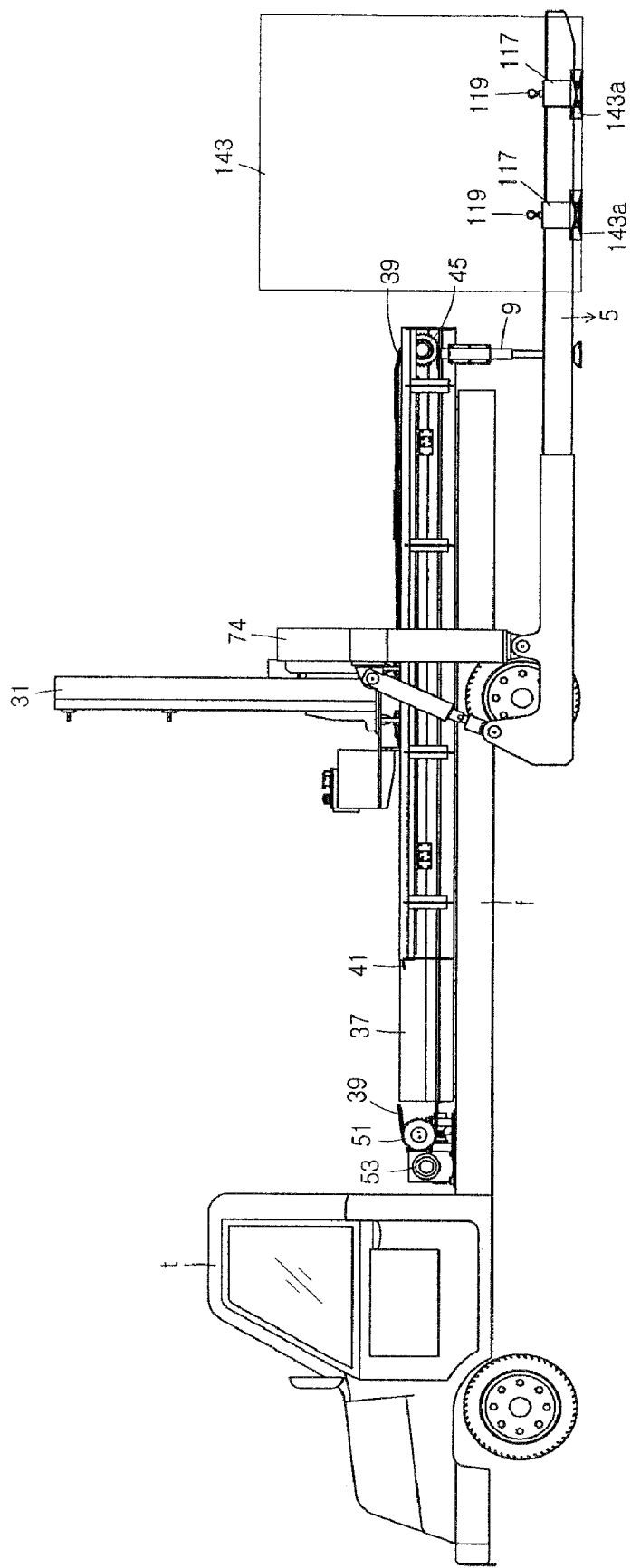
FIG. 51 is a side view of the apparatus in accordance with the embodiment of the present invention in a state in which the fork arms move backward by about half of the length of the fork arms and are lowered, and thus place the first storage container on the ground.

When the vehicle t moves forward, the leveling supports 11 and 12 are lowered to keep the level of the vehicle t, and the fork arms 5 and 6 move forward, clamp the first storage container 143, and then raise the clamped first storage container, as shown in FIG. 50. Thereafter, the fork arms 5 and 6 move backward and are lowered, safely place the first storage container 143 on the ground occupying a space, and release the clamped state of the first storage container 143, as shown in FIG. 51. Thereafter, the fork arms 5 and 6 move forward, as shown in FIG. 6, and then are lowered to the initial positions, as shown in FIG. 4, thereby completing unloading of the first and second storage containers 143 and 144. Loading of the first and second storage containers 143 and 144 is carried out in reverse order, and the loaded first and second storage containers 143 and 144 are firmly bound to the vehicle t by the binding units of FIG. 24.

FIGS. 52 to 58 are views of a storage container loading/unloading and transporting apparatus in accordance with another embodiment of the present invention. In the storage container loading/unloading and transporting apparatus in accordance with this embodiment, a plurality of multi-joint arms respectively operated by cylinders, i.e., first and second arms 160 and 161 and fork arms 162, raise and lower a storage container 4, a plurality of forks 165 and 166, the positions of which can be changed and fixed in consideration of the clamped position of the storage container 4 are installed on the fork arms 162, the first and second arms 160 and 161 and the fork arms 162 are drawn in or spread out by a pair of left and right projectable and retractable cylinders 163 and 164 to clamp and unclamp the storage container 4, thereby achieving loading and unloading of the storage container 4.

That is, an ascending and descending unit to raise and lower the fork arms 162 and the storage container 4 clamped by the fork arms 162, and a horizontal moving unit to horizontally spreading out or drawing in the fork arms 162 to clamp or unclamp the storage container 4 are respectively installed at both sides of a transfer cart 3 installed on the vehicle t.

The ascending and descending unit includes the first and second arms 160 and 161 (or booms), and a plurality of cylinders to rotate the first and second arms 160 and 161 to designated angles.

Figure 57:
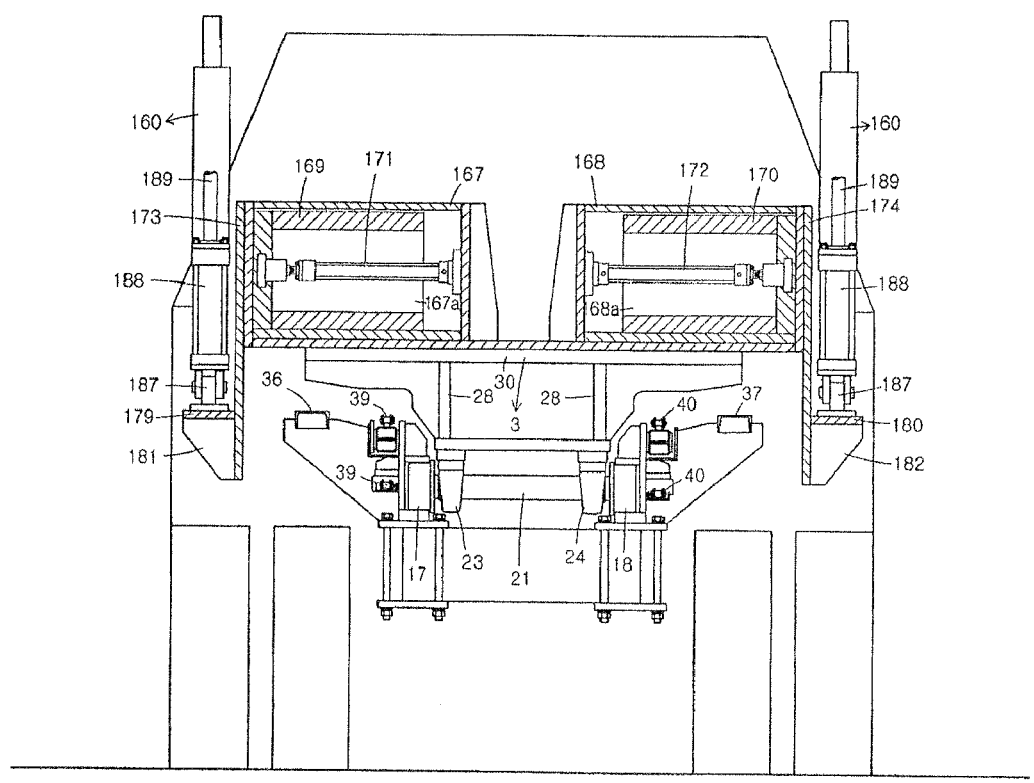
FIG. 57 is a sectional view of the apparatus in accordance with the embodiment of the present invention in a state in which the fork arms are drawn in to an initial position.
Figure 58:
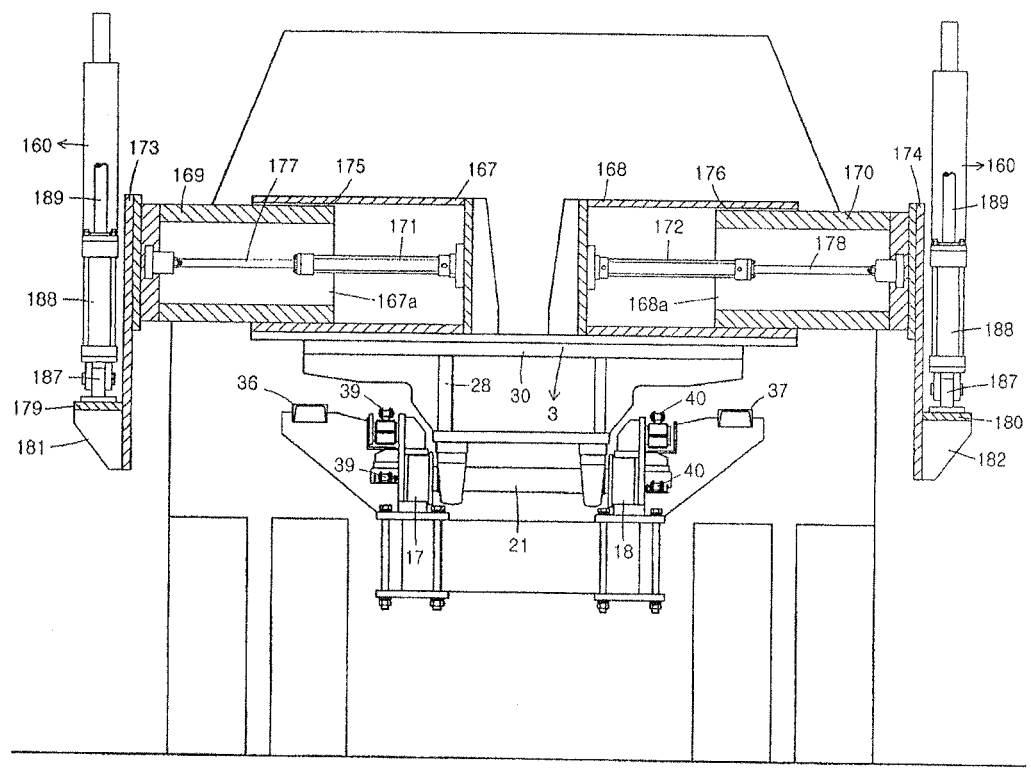
FIG. 58 is a sectional view of the apparatus in accordance with the embodiment of the present invention in a state in which the fork arms are spread out.

The horizontal moving unit includes a pair of fixed bodies 167 and 168 installed at both sides of the upper part of the transfer cart 3, a pair of projectable and retractable cylinders 171 and 172 to horizontally project and retract moving bodies 169 and 170 connected to the fixed members 167 and 168, and support members 173 and 174, to which the ascending and descending unit is fixed, installed at the outer surfaces of the moving bodies 169 and 170. The horizontal moving unit horizontally spreads out the fork arms 162, as shown in FIG. 58, or horizontally draws in the fork arms, as shown in FIG. 57, thus achieving clamping and unclamping of the storage container 4 and achieving movement of the fork arms to initial positions.

The configurations and effects of the transfer cart 3 to move the first and second arms 160 and 161, the fork arms 162, and the storage container 4 clamped by the fork arms 162 forward and backward, and a driving unit and a power transmission unit to reciprocate the transfer cart 3 in this embodiment are the same as those in the former embodiment. In this embodiment, the raising and lowering of the storage container 4 is achieved by raising and lowering the fork arms 162 with rotating the first and second arms 160 and 161 around shafts (pins) within a designated section in cooperation with the cylinders, and thus the ascending and descending unit 7 is not required.

Hereinafter, the configuration of the horizontal moving unit will be described.

The fixed bodies 167 and 168 having a designated length and a designated size are installed at both sides of an upper plate 30 of the transfer cart 3 installed on the vehicle t, the moving bodies 169 and 170 having a designated length and a designated size are respectively connected to openings 175 and 176 formed on the outer side of the fixed bodies 167 and 168, the cylinders 171 and 172 are fixed to the inner walls of the fixed bodies 167 and 168, ends of rods 177 and 178 of the cylinders 171 and 172 are respectively fixed to the inner walls of the moving bodies 169 and 170 through openings 169a and 170a formed through the moving bodies 169 and 170, the support members 173 and 174 are vertically installed at the outer walls of the moving bodies 169 and 170, fixing plates 179 and 180 having designated dimensions are horizontally fixed to the outer lower ends of the support members 173 and 174 to install the ascending and descending unit, and the lower parts of the fixing plates 179 and 180 are sufficiently supported by a plurality of brackets 181 and 182.

Therefore, when the rods 177 and 178 are projected, as shown in FIG. 58, the moving bodies 169 and 170 and the ascending and descending unit are projected, and when the rods 177 and 178 are retracted, as shown in FIG. 57, the moving bodies 169 and 170 and the ascending and descending unit are retracted, according to the operating state of the projectable and retractable cylinders 171 and 172.

The fixed bodies 167 and 168 and the moving bodies 169 and 170 connected thereto preferably have a rectangular pipe shape to withstand large load, and sliding bearings are preferably installed on surface contact parts between the fixed bodies 167 and 168 and the moving bodies 169 and 170, and are fixed to the fixed bodies 167 and 168 or the moving bodies 169 and 170 to greatly reduce the coefficient of friction. Further, the support members 173 and 174 are protruded more downward than the fixed bodies 167 and 168, and the fixing plates 179 and 180 are fixed to the lower part of the support members 173 and 174, thereby reducing the overall height and operating height of the ascending and descending unit and easily achieving clamping/unclamping and loading/unloading of the storage container 4.

Hereinafter, the configuration of the ascending and descending unit to raise and lower the storage container 4 will be described.

Brackets 183 are respectively fixed to the front ends of the upper surfaces of the fixing plates 179 and 180, ends of the first arms 160 are respectively journalled at the brackets 183 by pins 184, ends of the second arms 161 are respectively journalled at the other ends of the first arms 160 by pins 185, ends of the fork arms 162 are respectively journalled at the other ends of the second arms 161 by pins 186, and the plural forks 165 and 166 to clamp or unclamp the storage container 4 are respectively installed at the fork arms 162 such that the positions of the forks 165 and 166 may be changed and fixed.

Brackets 187 are respectively fixed to the rear ends of the upper surfaces of the fixing plates 179 and 180, cylinders 188 are respectively journalled at the brackets 186 by pins, and rods 189 of the cylinders 188 are respectively journalled at brackets 190 fixed to the lower parts of the first arms 160 to allow the first arms 160 to be rotated within a designated section around the pins 184. Further, cylinders 192 are respectively journalled at brackets 191 fixed to the upper parts of the first arms 160 by pins, rods 193 of the cylinders 192 are respectively journalled at front ends 161a of the second arms 161 by pins, cylinders 195 are respectively journalled at brackets 194 fixed to the upper surfaces of the second arms 161 by pins, and rods 196 of the cylinders 195 are respectively journalled at brackets 197 fixed to the upper surfaces of the front ends of the fork arms 162 by pins.

As described above, the ends of the first arms 160 are journalled at the brackets 183 installed at the front ends of the upper surfaces of the fixing plates 179 and 180, the cylinders 188 are journalled at the brackets 187 installed at the rear ends of the upper surfaces of the fixing plates 179 and 180, and the rods 189 of the cylinders 188 are journalled at the brackets 190 of the first arms 160, thus forming a triangular link structure. Therefore, the first arms 160 are rotated within a designated section around the pins 184 by the operation of the cylinders 188.

Further, as described above, the second arms 161, at which rods 193 of the cylinders 192 are journalled, has a triangular link structure, in which the front ends 161a is more protruded than the pins 185 connecting the first arms 160 and the second arms 161. Therefore, the second arms 161 are rotated within a designated section around the pins 185 by the operation of the cylinders 192.

Moreover, as described above, the second arms 161 and the fork arms 162 connected by the pins 186, and the cylinders 195 form a triangular link structure. Therefore, the fork arms 162 carry out forward and backward horizontal movement or tilting and forward and backward tilting movement by the operation of the cylinders 195.

Figure 52:
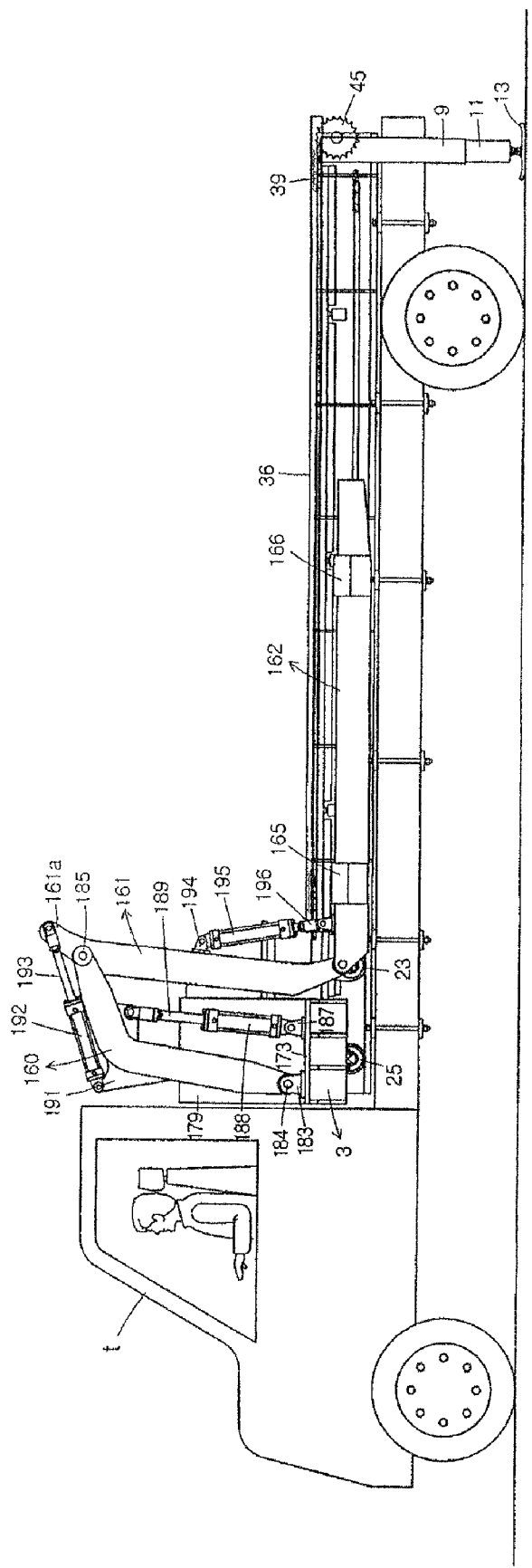
FIG. 52 is a side view of a storage container loading/unloading and transporting apparatus in accordance with another embodiment of the present invention.
Figure 53:
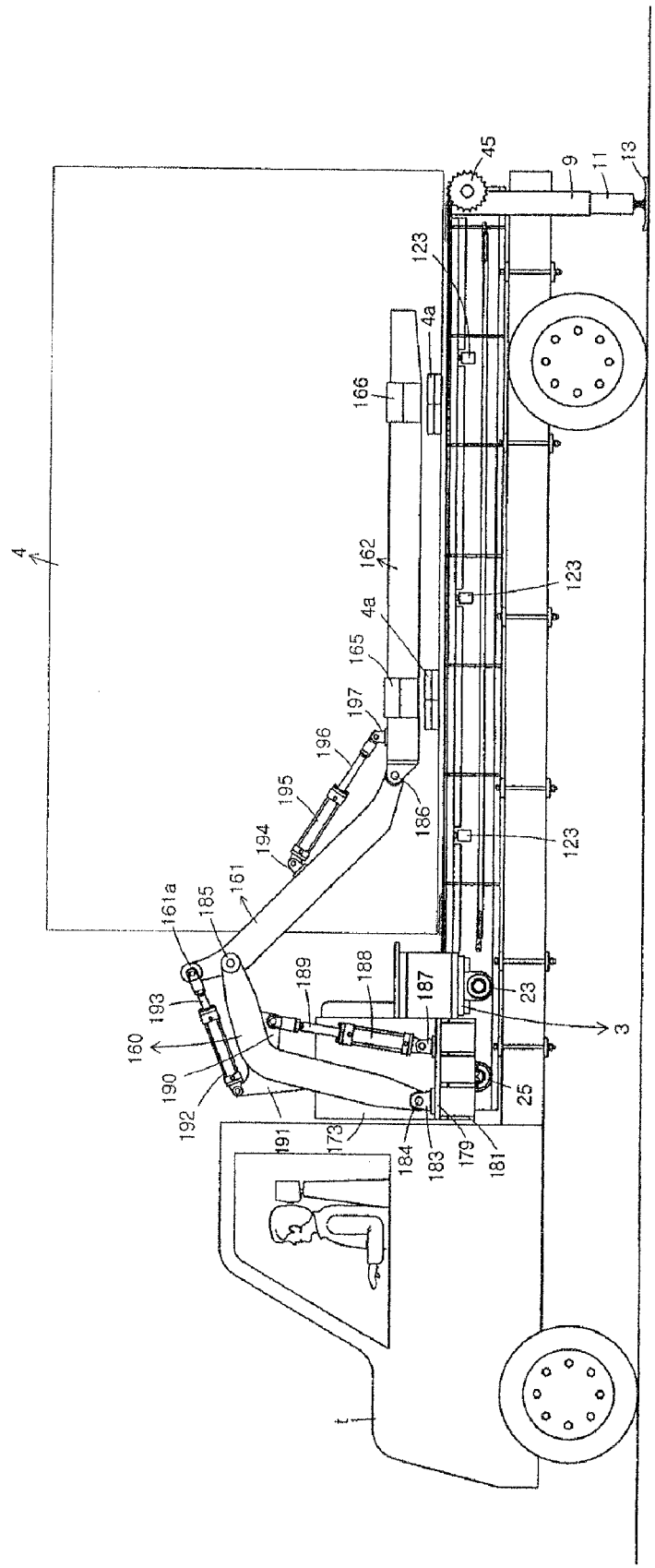
FIG. 53 is a side view of the apparatus in accordance with the embodiment of the present invention in a state in which fork arms are lowered in order to clamp a storage container.
Figure 54:
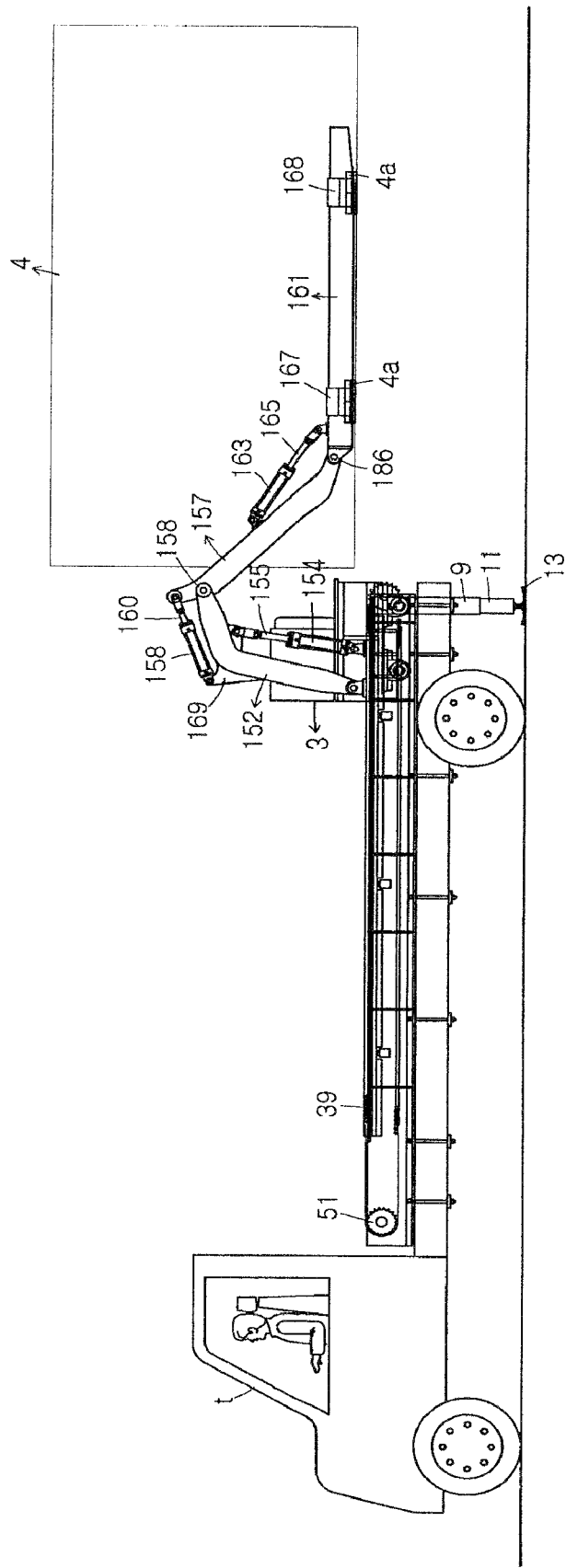
FIG. 54 is a side view of the apparatus in accordance with the embodiment of the present invention in a state in which the fork arms clamping the storage container move to a read end of a vehicle.
Figure 55:
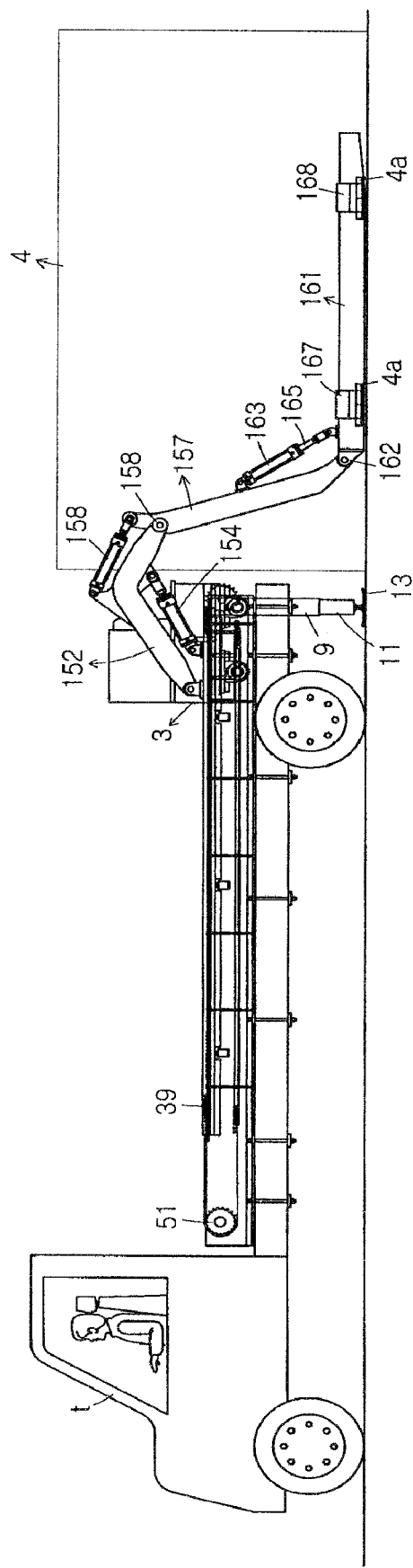
FIG. 55 is a side view of the apparatus in accordance with the embodiment of the present invention in a state in which the fork arms are lowered and thus place the storage container on the ground.

FIG. 52 is a side view of the apparatus in accordance with this embodiment in a normal unloaded state in which the leveling supports 11 and 12 are lowered to keep the level of the loading table 2, FIG. 53 illustrates the apparatus in accordance with this embodiment in a state in which the fork arms 162 are lowered to a clamping position, FIG. 54 illustrates the apparatus in accordance with this embodiment in a state in which the clamped storage container 4 is lifted up from the holding frames 36 and 37, is moved to the rear end of the vehicle t of the transfer cart 3, and hangs in the air, and FIG. 55 illustrates the apparatus in accordance with this embodiment in a state in which the fork arms 162 are lowered and thus place the storage container 4 on the ground.

Figure 56:
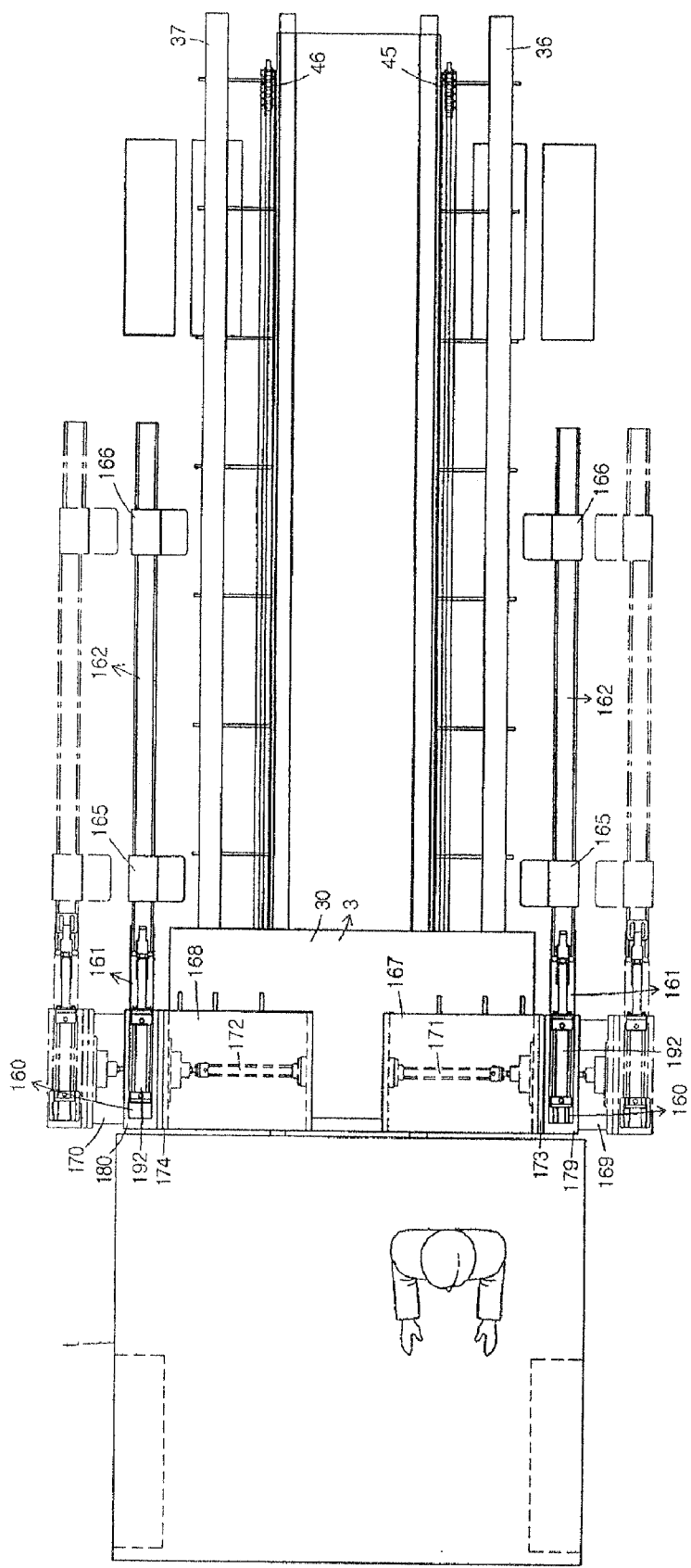
FIG. 56 is a plan view of the apparatus in accordance with the embodiment of the present invention.

FIG. 56 is a plan view of the apparatus in accordance with this embodiment, FIG. 57 is a sectional view of the apparatus in accordance with this embodiment in a state in which the fork arms 162 move to the initial positions and are drawn in by the pair of the projectable and retractable cylinders 171 and 172, and FIG. 58 is a sectional view of the apparatus in accordance with this embodiment in a state in which the fork arms 162 are spread out by the pair of the projectable and retractable cylinders 171 and 172.

As apparent from the above description, a storage container loading/unloading and transporting apparatus of one embodiment of the present invention transports one storage container or plural storage containers to a depository or a designated place using a loading and unloading unit installed on a transport vehicle.

For example, the apparatus loads/unloads and transports one sixteen-foot storage container or two seven-foot storage containers.

An ascending and descending unit installed on a transfer cart loads and unloads the storage container(s) at a force doubled by the principle of a pulley.

Fork arms are horizontally spread out or drawn in by a pair of projectable and retractable cylinders horizontally installed symmetrically, thus achieving clamping and unclamping of the storage container(s).

The projectable and retractable cylinders are operated individually, and thus achieve centering of the storage container(s) even if the position of the storage container is deviated from the original clamped position.

The fork arms journalled at the lower parts of vertical members are tilted directly to a desired slope by tilting cylinders.

A pair of chains raised and lowered by a plurality of cylinders moves the storage container located at the front among two seven-foot storage containers.

Guide bars, on which outer circumferential surfaces of rollers of the chains roll, are installed under the chains to reduce the coefficient of friction of the chains, thus achieving smooth movement of the storage container(s) loaded on the chains.

Auxiliary forks are respectively connected to plural forks installed on the fork arms, thus being capable of clamping the seven-foot storage container having a narrow width.

The loaded storage container(s) is/are firmly bound to the frame of the transport vehicle using binding units, and thus movement of the storage container(s) or separation of the storage container(s) from the frame during traveling is prevented.

Since chain sprockets and the chains installed at both sides of a horizontal connection member are operated by the principle of a pulley, an ascending and descending stroke of cylinders is reduced by about half, and thus the overall height and the ascending and descending stroke of the ascending and descending unit are reduced.

Further, a storage container loading/unloading and transporting apparatus of another embodiment of the present invention loads one storage container or plural storage containers to a designated place, transports the storage container(s) to a designated place, and then unloads the storage container(s) using a pair of left and right multi-joint arms respectively including a plurality of forks.

The loaded storage container(s) is/are firmly bound to the frame of the transport vehicle using binding units, and thus movement of the storage container(s) or separation of the storage container(s) from the frame during traveling is prevented.

Support members, on which the ascending and descending unit is installed, are protruded more downward than fixed bodies, thus reducing the overall height and operating height of the ascending and descending unit.

The positions of plural forks installed on the fork arms are changed in consideration of the clamped position of the storage container, and then are fixed, thus allowing the apparatus to be conveniently used.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A storage container loading/unloading and transporting apparatus comprising:
   a transfer cart installed on a frame of a vehicle and reciprocating in the longitudinal direction of a loading table;
   an ascending and descending unit installed on the transfer cart to raise and lower the at least one storage container;
   vertical members installed at both sides of the ascending and descending unit, and horizontally spread out and drawn in by projectable and retractable cylinders;
   a pair of fork arms journalled at lower parts of the vertical members, and provided with front ends supported by tilting cylinders, wherein the pair of fork arms is configured to be raised above the frame or lowered below the frame substantially down to a floor;
   a plurality of forks connected to the fork arms to clamp the at least one storage container;
   holding frames installed in parallel at both sides of the frame such that the at least one storage container is loaded on the holding frames;
   binding units to fix the at least one storage container loaded on the holding frames; and
   a hydraulic device and a controller,
   wherein the storage container loading/unloading and transporting apparatus is configured to load/unload and transport at least one storage container by reciprocating motion of the transfer cart installed on the loading table of the vehicle and ascending and descending motion of the ascending and descending unit.

2. The storage container loading/unloading and transporting apparatus according to claim 1, wherein: the transfer cart includes a pair of front and rear rollers and a pair of left and right rollers installed on guide rails of the frame, a hydraulic motor rotated in a regular direction and a reverse direction, and a power transmission unit, and reciprocates in the longitudinal direction of the loading table of the vehicle; and the power transmission unit reduces power transmitted from the hydraulic motor with a reducer, and transmits the power to both chains installed in the longitudinal direction of the loading table to achieve the reciprocating motion of the transfer cart.

3. The storage container loading/unloading and transporting apparatus according to claim 2, wherein chain brackets are respectively installed under chains to move the transfer cart, and both sides of the chain brackets are protruded upward by bending and thus prevent separation of the chains from the chain brackets.

4. The storage container loading/unloading and transporting apparatus according to claim 3, wherein guide bars are installed between the chains and the chain brackets to guide rolling motion of rollers of the chains.

5. The storage container loading/unloading and transporting apparatus according to claim 2, wherein the at least one storage container includes one sixteen-foot storage container or two seven-foot storage containers.

6. The storage container loading/unloading and transporting apparatus according to claim 2, wherein chains to reciprocate the transfer cart are raised and lowered by a plurality of ascending and descending cylinders installed at designated intervals, and when first and second storage containers are transferred, the first storage container located at the front is lifted up to be transferred along the chains, and the second storage container located at a rear is clamped by the plurality of forks of the fork arms to be transferred.

7. The storage container loading/unloading and transporting apparatus according to claim 2, wherein: the ascending and descending unit includes vertical fixed members fixed to both sides of the transfer cart, a pair of cylinders journalled between the vertical fixed members, a horizontal connection member installed at ends of rods of the cylinders, and chain sprockets journalled at both sides of a horizontal connection member; and ends of chains connected to the chain sprockets are installed on a bottom of the transfer cart, and other ends of the chains connected to the chain sprockets are installed at a horizontal ascending and descending member.

8. The storage container loading/unloading and transporting apparatus according to claim 2, wherein the projectable and retractable cylinders are operated simultaneously or individually to adjust centering of the at least one storage container.

9. The storage container loading/unloading and transporting apparatus according to claim 2, wherein the plurality of forks is connected to the fork arms such that positions of the forks are changeable, and is provided with fixing units to fix positions of the forks after the change of the positions of the forks.

10. The storage container loading/unloading and transporting apparatus according to claim 2, wherein a plurality of holes is formed through the fork arms at designated intervals in a longitudinal direction of the fork arms such that fixtures of the fixing units are connected to the plurality of holes.

11. The storage container loading/unloading and transporting apparatus according to claim 2, wherein auxiliary forks of a detachable type are respectively connected to front ends of the forks to clamp a storage container having a narrow width.

12. The storage container loading/unloading and transporting apparatus according to claim 2, wherein each of the binding units of the at least one storage container includes a ratchet installed on the frame of the vehicle, a wire wound on the ratchet, and a hook-type fastener fixed to a tip of the wire.

13. The storage container loading/unloading and transporting apparatus according to claim 2, wherein an engine to drive the hydraulic pump is a separate engine installed in the vehicle.

14. The storage container loading/unloading and transporting apparatus according to claim 2, wherein the controller includes a control panel installed on the frame, and a wired remote controller detachably connected to the control panel.

15. The storage container loading/unloading and transporting apparatus according to claim 1, wherein the at least one storage container includes one sixteen-foot storage container or two seven-foot storage containers.

16. The storage container loading/unloading and transporting apparatus according to claim 1, wherein chains to reciprocate the transfer cart are raised and lowered by a plurality of ascending and descending cylinders installed at designated intervals, and when first and second storage containers are transferred, the first storage container located at the front is lifted up to be transferred along the chins chains, and the second storage container located at a rear is clamped by the plurality of forks of the fork arms to be transferred.

17. The storage container loading/unloading and transporting apparatus according to claim 1, wherein: the ascending and descending unit includes vertical fixed members fixed to both sides of the transfer cart, a pair of cylinders journalled between the vertical fixed members, a horizontal connection member installed at ends of rods of the cylinders, and chain sprockets journalled at both sides of a horizontal connection member; and ends of chains connected to the chain sprockets are installed on a bottom of the transfer cart, and other ends of the chains connected to the chain sprockets are installed at a horizontal ascending and descending member.

18. The storage container loading/unloading and transporting apparatus according to claim 17, wherein the chain sprockets and the chains installed at both sides of the horizontal connection member are operated using the principle of a pulley, and thus an ascending and descending stroke of the cylinders is reduced by about half and the overall height and the ascending and descending stroke of the ascending and descending unit are reduced.

19. The storage container loading/unloading and transporting apparatus according to claim 17, wherein the horizontal ascending and descending member is formed in a rectangular pipe shape and provided with projectable and retractable members at both sides thereof, projectable and retractable members project and retract to a designated distance by a pair of guide rods and a pair of projectable and retractable cylinders, vertical members are respectively installed at the ends of the projectable and retractable members, the fork arms are respectively journalled at the lower ends of the vertical members, and the tilting cylinders are installed between the front ends of the fork arms protruded from the front ends of the vertical members and the vertical members.

20. The storage container loading/unloading and transporting apparatus according to claim 17, wherein sliding bearings are installed in spaces between the horizontal ascending and descending member and the projectable and retractable members to achieve smooth projection and retraction of the projectable and retractable members.

21. The storage container loading/unloading and transporting apparatus according to claim 20, wherein the sliding bearings are fixed to any one of the horizontal ascending and descending member and the projectable and retractable members.

22. The storage container loading/unloading and transporting apparatus according to claim 1, wherein the projectable and retractable cylinders are operated simultaneously or individually to adjust centering of the at least one storage container.

23. The storage container loading/unloading and transporting apparatus according to claim 1, wherein the plurality of forks is connected to the fork arms such that positions of the forks are changeable, and is provided with fixing units to fix the positions of the forks after the change of the positions of the forks.

24. The storage container loading/unloading and transporting apparatus according to claim 23, wherein each of the fixing units includes a spring installed on an upper part of each of the forks, and a fixture elastically supported by the spring.

25. The storage container loading/unloading and transporting apparatus according to claim 1, wherein a plurality of holes is formed through the fork arms at designated intervals in a longitudinal direction of the fork arms such that fixtures of the fixing units are connected to the plurality of holes.

26. The storage container loading/unloading and transporting apparatus according to claim 1, wherein auxiliary forks of a detachable type are respectively connected to front ends of the forks to clamp a storage container having a narrow width.

27. The storage container loading/unloading and transporting apparatus according to claim 1, wherein each of the binding units of the at least one storage container includes a ratchet installed on the frame of the vehicle, a wire wound on the ratchet, and a hook-type fastener fixed to a tip of the wire.

28. The storage container loading/unloading and transporting apparatus according to claim 1, wherein an engine to drive the hydraulic pump is a separate engine installed in the vehicle.

29. The storage container loading/unloading and transporting apparatus according to claim 1, wherein the controller includes a control panel installed on the frame, and a wired remote controller detachably connected to the control panel.

30. A storage container loading/unloading and transporting apparatus comprising:
fork arms installed at both sides of a transfer cart installed on a vehicle, and first and second arms to raise and lower at least one storage container clamped by the fork arms;
the ascending and descending unit including a plurality of cylinders to rotate the first and second arms to designated angles; and
a horizontal moving unit to horizontally spread out or draw in the fork arms to clamp or unclamp the at least one storage container,
wherein the storage container loading/unloading and transporting apparatus, which loads/unloads and transports at least one storage container by reciprocating motion of a transfer cart installed on a loading table of the vehicle and ascending and descending motion of an ascending and descending unit is configured to load/unload and transport at least one storage container by reciprocating motion of the transfer cart installed on the loading table of the vehicle and ascending and descending motion of the ascending and descending unit,
wherein the fork arms are configured to be raised above a frame of the vehicle or lowered below the frame of the vehicle substantially down to a floor.

31. The storage container loading/unloading and transporting apparatus according to claim 30, wherein the horizontal moving unit includes a pair of fixed bodies installed at both sides of an upper part of the transfer cart, a pair of projectable and retractable cylinders to horizontally project and retract moving bodies connected to fixed members, and support members, to which the ascending and descending unit is fixed, installed at outer surfaces of the moving bodies, and horizontally spreads out or draws in the fork arms to achieve clamping and unclamping of the at least one storage container.

32. The storage container loading/unloading and transporting apparatus according to claim 31, wherein the fixed bodies and the moving bodies connected thereto are formed in a rectangular pipe shape.

33. The storage container loading/unloading and transporting apparatus according to claim 31, wherein sliding bearings are installed on surface contact parts between the fixed bodies and the moving bodies, and are fixed to any one of the fixed bodies and the moving bodies.

34. The storage container loading/unloading and transporting apparatus according to claim 31, wherein the support members are protruded more downward than the fixed bodies to reduce an overall height and an operating height of the ascending and descending unit.

35. The storage container loading/unloading and transporting apparatus according to claim 31, wherein the ascending and descending unit is configured such that brackets are respectively fixed to front ends of upper surfaces of fixing plates, ends of first arms are respectively journalled at the brackets by pins, ends of the second arms are respectively journalled at other ends of the first arms by pins, ends of the fork arms are respectively journalled at the other ends of the second arms by pins, a plurality of forks to clamp or unclamp the at least one storage container is installed on the fork arms such that positions of the forks may be changed and fixed, brackets are respectively fixed to rear ends of upper surfaces of the fixing plates, cylinders are respectively journalled at the brackets by pins, rods of the cylinders are respectively journalled at brackets fixed to lower parts of the first arms, cylinders are respectively journalled at brackets fixed to upper parts of the first arms by pins, rods of the cylinders are respectively journalled at front ends of the second arms by pins, cylinders are respectively journalled at brackets fixed to upper surfaces of the second arms by pins, and rods of the cylinders are respectively journalled at brackets fixed to the upper surfaces of the front ends of the fork arms by pins.

36. The storage container loading/unloading and transporting apparatus according to claim 31, wherein: the transfer cart includes a pair of front and rear rollers and a pair of left and right rollers installed on guide rails of the frame of the vehicle, a hydraulic motor rotated in a regular direction and a reverse direction, and a power transmission unit, and reciprocates in the longitudinal direction of the loading table of the vehicle; and the power transmission unit reduces power transmitted from the hydraulic motor with a reducer, and transmits the power to both chains installed in the longitudinal direction of the loading table to achieve the reciprocating motion of the transfer cart.

37. The storage container loading/unloading and transporting apparatus according to claim 31, wherein the projectable and retractable cylinders are operated simultaneously or individually to adjust centering of the at least one storage container.

38. The storage container loading/unloading and transporting apparatus according to claim 31, wherein a plurality of holes is formed through the fork arms at designated intervals in the longitudinal direction of the fork arms, and a plurality of forks installed on the fork arms is connected to the plurality of holes such that positions of the forks are changeable, and is provided with fixing units to fix the positions of the forks after the change of the positions of the forks.

39. The storage container loading/unloading and transporting apparatus according to claim 31, wherein auxiliary forks of a detachable type are respectively connected to the front ends of forks of the fork arms to clamp a storage container having a narrow width.

40. The storage container loading/unloading and transporting apparatus according to claim 31, wherein each of binding units of the at least one storage container includes a ratchet installed on the frame of the vehicle, a wire wound on the ratchet, and a hook-type fastener fixed to the tip of the wire.

41. The storage container loading/unloading and transporting apparatus according to claim 31, wherein the horizontal moving unit is configured such that the fixed bodies having a designated length and a designated size are installed at both sides of an upper plate of the transfer cart installed on the vehicle, the moving bodies having a designated length and a designated size are respectively connected to openings formed on the outer side of the fixed bodies, the cylinders are fixed to inner walls of the fixed bodies, ends of rods of the cylinders are respectively fixed to inner walls of the moving bodies through openings formed through the moving bodies, the support members are vertically installed at outer walls of the moving bodies, fixing plates having designated dimensions are horizontally fixed to outer lower ends of the support members to install the ascending and descending unit, and the lower parts of the fixing plates are supported by a plurality of brackets.

42. The storage container loading/unloading and transporting apparatus according to claim 30, wherein the horizontal moving unit is configured such that fixed bodies having a designated length and a designated size are installed at both sides of an upper plate of the transfer cart installed on the vehicle, the moving bodies having a designated length and a designated size are respectively connected to openings formed on an outer side of the fixed bodies, the cylinders are fixed to inner walls of the fixed bodies, ends of rods of the cylinders are respectively fixed to inner walls of the moving bodies through openings formed through the moving bodies, support members are vertically installed at outer walls of the moving bodies, fixing plates having designated dimensions are horizontally fixed to outer lower ends of the support members to install the ascending and descending unit, and lower parts of the fixing plates are supported by a plurality of brackets.

43. The storage container loading/unloading and transporting apparatus according to claim 30, wherein fixed bodies and moving bodies connected thereto are formed in a rectangular pipe shape.

44. The storage container loading/unloading and transporting apparatus according to claim 30, wherein sliding bearings are installed on surface contact parts between the fixed bodies and the moving bodies, and are fixed to any one of the fixed bodies and the moving bodies.

45. The storage container loading/unloading and transporting apparatus according to claim 30, wherein support members are protruded more downward than the fixed bodies to reduce an overall height and an operating height of the ascending and descending unit.

46. The storage container loading/unloading and transporting apparatus according to claim 30, wherein the ascending and descending unit is configured such that brackets are respectively fixed to front ends of upper surfaces of fixing plates, ends of first arms are respectively journalled at the brackets by pins, ends of second arms are respectively journalled at other ends of the first arms by pins, ends of the fork arms are respectively journalled at the other ends of the second arms by pins, a plurality of forks to clamp or unclamp the at least one storage container is installed on the fork arms such that the positions of the forks may be changed and fixed, brackets are respectively fixed to rear ends of upper surfaces of the fixing plates, cylinders are respectively journalled at the brackets by pins, rods of the cylinders are respectively journalled at brackets fixed to lower parts of the first arms, cylinders are respectively journalled at brackets fixed to the upper parts of the first arms by pins, rods of the cylinders are respectively journalled at front ends of the second arms by pins, cylinders are respectively journalled at brackets fixed to upper surfaces of the second arms by pins, and rods of the cylinders are respectively journalled at brackets fixed to upper surfaces of the front ends of the fork arms by pins.

47. The storage container loading/unloading and transporting apparatus according to claim 30, wherein: the transfer cart includes a pair of front and rear rollers and a pair of left and right rollers installed on guide rails of the frame of the vehicle, a hydraulic motor rotated in a regular direction and a reverse direction, and a power transmission unit, and reciprocates in the longitudinal direction of the loading table of the vehicle; and the power transmission unit reduces power transmitted from the hydraulic motor with a reducer, and transmits the power to both chains installed in a longitudinal direction of the loading table to achieve the reciprocating motion of the transfer cart.

48. The storage container loading/unloading and transporting apparatus according to claim 30, wherein projectable and retractable cylinders are operated simultaneously or individually to adjust centering of the at least one storage container.

49. The storage container loading/unloading and transporting apparatus according to claim 30, wherein a plurality of holes is formed through the fork arms at designated intervals in a longitudinal direction of the fork arms, and a plurality of forks installed on the fork arms is connected to the plurality of holes such that positions of the forks are changeable, and is provided with fixing units to fix the positions of the forks after a change of the positions of the forks.

50. The storage container loading/unloading and transporting apparatus according to claim 49, wherein each of the fixing units includes a spring installed on an upper part of each of the forks, and a fixture elastically supported by the spring.

51. The storage container loading/unloading and transporting apparatus according to claim 30, wherein auxiliary forks of a detachable type are respectively connected to front ends of forks of the fork arms to clamp a storage container having a narrow width.

52. The storage container loading/unloading and transporting apparatus according to claim 30, wherein each of binding units of the at least one storage container includes a ratchet installed on the frame of the vehicle, a wire wound on the ratchet, and a hook-type fastener fixed to a tip of the wire.

53. The storage container loading/unloading and transporting apparatus according to claim 30, wherein the horizontal moving unit is configured such that fixed bodies having a designated length and a designated size are installed at both sides of an upper plate of the transfer cart installed on the vehicle, the moving bodies having a designated length and a designated size are respectively connected to openings formed on an outer side of the fixed bodies, the cylinders are fixed to inner walls of the fixed bodies, ends of rods of the cylinders are respectively fixed to inner walls of the moving bodies through openings formed through the moving bodies, support members are vertically installed at outer walls of the moving bodies, fixing plates having designated dimensions are horizontally fixed to outer lower ends of the support members to install the ascending and descending unit, and lower parts of the fixing plates are supported by a plurality of brackets.

* * * * *